(12) United States Patent
Kimura et al.

(10) Patent No.: US 7,797,160 B2
(45) Date of Patent: Sep. 14, 2010

(54) SIGNAL COMPRESSION METHOD, DEVICE, PROGRAM, AND RECORDING MEDIUM; AND SIGNAL RETRIEVAL METHOD, DEVICE, PROGRAM, AND RECORDING MEDIUM

(75) Inventors: Akisato Kimura, Atsugi (JP); Kunio Kashino, Tokyo (JP); Takayuki Kurozumi, Zama (JP); Hiroshi Murase, Nagoya (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1361 days.

(21) Appl. No.: 10/727,338

(22) Filed: Dec. 3, 2003

(65) Prior Publication Data

US 2004/0167785 A1 Aug. 26, 2004

(30) Foreign Application Priority Data

Dec. 6, 2002 (JP) ............................. 2002-355444
Dec. 2, 2003 (JP) ............................. 2003-403634

(51) Int. Cl.
*G10L 19/00* (2006.01)
(52) U.S. Cl. ...................................... 704/500; 382/232
(58) Field of Classification Search ......... 704/500–504, 704/270; 382/232
See application file for complete search history.

(56) References Cited

FOREIGN PATENT DOCUMENTS

| JP | 03-116100 | 5/1991 |
| JP | 06266393 | 9/1994 |
| JP | 2000-312343 | 11/2000 |
| JP | 2001-092486 | 4/2001 |
| JP | 2002-236496 | 8/2002 |
| JP | 2002278579 | 9/2002 |
| JP | 2003-242510 | 8/2003 |

OTHER PUBLICATIONS

Kashino et al., "A Quick search Algorithm for Acoustic Signals Using Histogram Features—Time Series Active Search," Institute of Electronics Information and Communication Engineers of Japan, vol. J82-D, No. 9, pp. 1365-1373, Sep. 1999.*

(Continued)

*Primary Examiner*—Angela A Armstrong
(74) *Attorney, Agent, or Firm*—Harness, Dickey & Pierce, PLC

(57) ABSTRACT

There are included: an initial sub-signal creation section which creates, from an original signal, sub-signals of shorter length than the original signal; a created sub-signal selection section which, for the sub-signals produced by the initial sub-signal creation section, prunes the created sub-signal candidates to those for which the amount of data is less than for the original signal; a sub-signal re-creation section which determines a created sub-signal which is actually to be used, using the created sub-signal candidates produced by the created sub-signal selection section; a compression mapping determination section which determines, from the sub-signals produced by the sub-signal re-creation section, a mapping for calculation of a compressed signal; and a signal compression section which calculates a compressed signal corresponding to the sub-signals obtained by the sub-signal re-creation section, based upon the mapping obtained by the compression mapping determination section.

30 Claims, 46 Drawing Sheets

OTHER PUBLICATIONS

Kimura et al, ("Very Quick Audio-Searching: Introducing Global Pruning to the Time-Series Active Search," Proc. of International Conference on Acoustics, Speech and Signal Processing (ICASSP2001), vol. 3, pp. 1429-1432, Salt Lake City, Utah, USA, May 2001.*

"A Quick Search Method for Video Signals Based on Piecewise Linear Maps", Akisato Kimura, et al., Technical Report of IEICE, The Institute of Electronics, Information and Communication Engineers, Feb. 2002, vol. 101, No. 653, pp. 75-80.

"Locally Adaptive Dimensionality Reduction for Indexing Large Time Series Databases", E. Keogh, et al., Proc. of ACM SIGMOD Conference, pp. 151-162, 2001.

"Supporting Content-Based Searched on Time Series Via Approximation", C. Wang, et al., Proc. of International Conference on Scientific and Statistical Database Management (SSDBM2000), pp. 69-81, 2000.

A. Kimura et al., "Dynamic-segmentation-based feature dimension reduction for quick audio/video searching", Proc. of International Conference on Multimedia and Expo (ICME2003), vol. 2, pp. 389-392, Jul. 2003.

A. Kimura et al., "Very quick audio searching: Introducing global pruning to the Time-Series Active Search", Proc. of International Conference on Acoustics, Speech and Signal Processing (ICASSP2001), vol. 3, pp. 1429-1432, Salt Lake City, Uta, USA, May 2001.

A. Kimura et al., "Very quick audio searching", pp. 1-11, May 12, 2001, presentation material for International Conference on Acoustics, Speech and Signal Processing, May 2001.

A. Kimura et al., "A quick search method for audio signals based on a piecewise linear representation of feature trajectories" to appear in IEEE Transactions on Audio, Speech and Language Processing. Feb. 2008.

A. Kimura et al., "A quick search method for multimedia signals using global pruning". IEICE (The Institute of Electronics, Information, and Communication Engineers) Transactions. vol. J85-D-II. No. 10, pp. 1552-1562. Oct. 2002.

A. Kimura et al., "A quick search method for multimedia signals using global pruning". Systems and Computers in Japan. vol. 34. No. 13. pp. 47-58. Nov. 2003.

"A Quick Search Algorithm for Acoustic Signals Using Histogram Features—Time-Series Active Search", Kashino, et al., Institute of Electronics Information and Communication Engineers of Japan, D-II vol. J82-D-II, No. 9, pp. 1365-1373. Sep. 1999.

Kikuchi, Tomonori, Notice of Reasons for Rejection, Oct. 20, 2009, pp. 1-4, Japanese Patent Office, Application No. 2006-271323.

* cited by examiner

SIGNAL DETECTION RE-DECISION PROCEDURE

Q : QUERY FEATURE
$C_1$ : CENTROID OF THE INITIAL CLUSTER
$C_2$ : CENTROID OF A CLUSTER TO BE PRUNNED

SIGNAL COMPRESSION METHOD, DEVICE, PROGRAM, AND RECORDING MEDIUM; AND SIGNAL RETRIEVAL METHOD, DEVICE, PROGRAM, AND RECORDING MEDIUM

BACKGROUND OF THE INVENTION

1. Field of the Invention

The present invention relates to a signal compression method which is suitable for representing an enormous signal sequence with a small amount of information, to a device, to a program and to a recording medium. The present invention also relates to a signal retrieval method which, along with utilizing the signal compression method, is suitable for finding out the position of a signal which is similar to a signal which has been registered in advance from among an enormous signal sequence, to a device, to a program, and to a recording medium.

2. Description of Related Art

In the past, as signal retrieval methods for finding a position of a signal within a colossal signal sequence which is similar to a signal which has been inputted, there have been proposed several per se known high speed signal retrieval methods which find at high speed a position in a similar signal; for example, Japanese Patent 3,065,314 (Patent Reference #1), and Japanese Unexamined Patent Application, First Publication No. 2001-092486 (Patent Reference #2).

Furthermore, with regard to the above described type of signal retrieval method, as a method which reduces the cost of calculation for matching features one at a time by performing feature compression of the signal, there have been proposed methods for reducing the dimensions of the features in an effective manner (for example, Non-Patent Reference #3, specified below) by piecewise linear mapping which takes advantage of the continuity of a time series signal. These methods create mapping by segmenting a signal evenly into equal segments regardless of the properties of the signal. Furthermore, it is per se known to vary the length of the segments according to the properties of the signal (for example, see Non-Patent Reference #1: E. Keogh, K. Chakrabarti, S. Mehrotra, and M. Pazzani, "Locally adaptive dimensionality reduction for indexing large time series databases", Proc. of ACM SIGMOD Conference, pp. 151-162, 2001; or Non-Patent Reference #2: C. Wang and S. Wang, "Supporting content-based searches on time series via approximation", Proc. of International Conference on Scientific and Statistical Database Management (SSDBM2000), pp. 69-81, 2000).

Furthermore, in the above type of signal retrieval method, as a method for locally eliminating matching procedures which are not required, there is a per se known time series active search method in which the lower limit value of the distance is calculated in advance of matching by taking advantage of the properties of the histograms which are the features utilized for matching, and matching procedures are eliminated insofar as that a threshold which has been decided upon in advance is not exceeded; for example, see Patent Reference #1: Japanese Patent 3,065,314, and Patent Reference #2: Japanese Unexamined Patent Application, First Publication No. 2001-092486.

Furthermore, as a technique for signal compression which is utilized in the above kind of signal retrieval method, there is a per se known signal compression method which can retain feature sequences with a small memory capacity and can perform decisions relating to similarity between signals at high speed by reducing the dimensions of feature sequences which have been extracted from an audio signal. This signal compression technique is utilized in the above described signal retrieval method for finding out the position from among a signal sequence of a signal which is similar to another signal which has been registered in advance, such as when detecting the instant during a broadcast audio signal at which a specified tune has been played, or the like, and it is capable of being executed at high speed. In connection with the concrete signal compression methods which are used for such a technique, there are per se known signal compression methods for segmenting and compressing an original signal which has been provided in advance; for example, see Non-Patent Reference #3: "A Quick Search Method for Video Signals Based on Piecewise Linear Maps" by Akisato Kimura and three others, Technical Report of IEICE, The Institute of Electronics, Information and Communication Engineers, February 2002, Vol. 101, No. 653, pp. 75-80.

Here, with the high speed signal retrieval methods of the above described Patent Reference #1 and Patent Reference #2, for an absolutely colossal signal sequence, there may be a problem that it is not possible to find a similar signal within a sufficiently short time period, and there is a problem that it is not possible to deal with features other than histograms.

Furthermore, with a signal compression method such as described in the above Non-Patent Reference #1 or Non-Patent Reference #2, it has become possible to perform signal compression at higher compression ratios than heretofore, there is the problem that a colossal amount of processing is required for determining the most suitable method of signal division.

Yet further, with a signal compression method such as described in the above Non-Patent Reference #3, although the sub-signal may be built up by segmenting the original signal evenly and equally regardless of the properties of that signal, alternatively, it is also possible to vary the length of the segments according to the properties of the signal. Accordingly, it has become possible to perform signal compression at better compression ratios than heretofore, with this method, there is the problem that a colossal amount of processing has become necessary for determining the function for performing compression.

SUMMARY OF THE INVENTION

The present invention has been conceived in the light of the above described problems, and its objective is, while avoiding a colossal amount of preprocessing labor, and along with performing the step of signal compression with a signal compression method which is better adapted to the properties of the object signal than conventional signal compression methods, to provide a signal compression method, device, program therefor, and recording medium, and a signal retrieval method, device, program therefor, and recording medium which utilize the signal compression method, which are able to represent signal sequences with a smaller amount of information, with which the efficiency of calculation is higher than in the conventional techniques, which ensure uniform retrieval results, with which the amount of temporary storage which is required for the retrieval is not enormously increased, and with which it is possible to perform signal retrieval at higher speed.

The present invention has been conceived in order to solve the above described problems, and the present invention is a signal compression method for compressing an original signal which has been provided in advance to convert the original signal into a compressed signal, comprising: an initial sub-signal creation step of creating, from the original signal, sub-signals of shorter length than the original signal; a created sub-signal selection step of, for each of the sub-signals which have been produced by the initial sub-signal creation step, pruning the created sub-signal candidates to those for which the amount of data is less than for the original signal; a sub-signal re-creation step of determining upon a created sub-signal which is actually to be used, using the created sub-signal candidates which have been produced by the created sub-signal selection step; a compression mapping determination step of determining, from the respective sub-signals which have been produced by the sub-signal re-creation step, a mapping for calculation of a compressed signal; and a signal compression step of calculating a compressed signal which corresponds to each of the sub-signals which have been obtained by the sub-signal re-creation step, based upon the mapping which has been obtained by the compression mapping determination step.

In addition, in the present invention, the signal compression step comprises: a signal mapping step of mapping each of the sub-signals which have been obtained by the sub-signal re-creation step by the mapping which has been obtained by the compression mapping determination step; a projection distance calculation step of calculating, for the sub-signal after the mapping which has been obtained by the signal mapping step, the distance from the sub-signal which has been obtained by the sub-signal re-creation step; and a compressed feature creation step of creating a compressed signal, based upon the respective sub-signals after mapping which have been produced by the signal mapping step and the projection distance which has been produced by the projection distance calculation step.

In addition, in the present invention, the initial sub-signal creation step segments the original signal from the top of the original signal, and takes the sub-signal after the segmentation as its resulting sub-signal.

In addition, in the present invention, the created sub-signal selection step and the sub-signal re-creation step determine segmentation boundaries in order from the top of the original signal.

In addition, in the present invention, the created sub-signal selection step and the sub-signal re-creation step set a segmentation boundary shiftable width which is determined in advance, and, taking the segmentation boundary which has been obtained by the initial sub-signal creation step as a reference, determine segmentation boundaries which are to be actually utilized within a segmentation boundary shiftable range having the segmentation boundary shiftable width on both sides of the center thereof.

In addition, in the present invention, the created sub-signal selection step shifts the segmentation boundaries to some locations and calculates compression ratios, and, based upon the results thereof, selects a range in which the segmentation boundaries which are to be actually utilized can exist.

In addition, in the present invention, the created sub-signal selection step automatically determines the number of times for calculation of compression ratio in the created sub-signal selection step, so as to reduce the number of times of calculation of compression ratio in the created sub-signal selection step and the sub-signal re-creation step.

In addition, in the present invention, the initial sub-signal creation step extracts features from the original signal, and uses the extracted features, represented as a sequence of multi-dimensional vectors, as a new original signal.

In addition, the present invention is a signal retrieval method for, at any location within a stored signal, which is an original signal which is registered in advance, calculating the distance from a reference signal, which is a signal which is taken as an object, and finding a location from the stored signal which is similar to the reference signal, comprising: the steps which are comprised in the signal compression method as described above; a reference feature extraction step in which a feature is produced from the reference signal; a stored feature extraction step in which a window upon which attention is focused is set within the stored signal, and in which a feature is produced from the stored signal within the window upon which attention is focused; a reference feature compression step in which a reference feature which has been produced by the reference feature extraction step is compressed, based upon the mapping which has been produced by the compression mapping determination step; a feature matching step in which the distance is calculated between a reference compressed signal which has been produced by the reference feature compression step and a stored compressed signal which has been produced from the signal compression step by newly using the feature sequence which has been produced by repeatedly performing the processing of the stored feature extraction step while shifting the window upon which attention is focused; and a signal detection decision step in which, by comparing together the distance which has been produced by the feature matching step and a search threshold, which is a threshold which corresponds to the distance, it is decided whether or not the reference signal is present at the location within the stored signal, wherein the processing of the feature matching step and the processing of the signal detection decision step are repeated while shifting the window upon which attention is focused.

In addition, in the above-described signal retrieval method, the present invention further comprising: a distance re-calculation step in which, for the location in the database signal at which it has been decided by the signal detection decision step that the query signal is present, the distance between the feature sequence which has been produced by the reference feature extraction step and the feature sequence which has been produced by the stored feature extraction step is calculated; and a signal detection re-decision step in which, by comparing together the distance which has been produced by the distance re-calculation step and the search threshold, it is re-decided whether or not the query signal is present at the location of the database signal, wherein the processing of the feature matching step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

In addition, in the above-described signal retrieval method, the present invention, further comprising a skip width calculation step in which, based upon the distance which has been calculated by the feature matching step, a skip width for the window upon which attention is focused is calculated, and the window upon which attention is focused is shifted by the skip width, wherein the processing of the feature matching step, the signal detection decision step, and the skip width calculation step is repeated while shifting the window upon which attention is focused; for some locations within the database signal, the distance from the query signal is calculated; and it is determined whether or not the query signal is present at the locations within the database signal.

In addition, the present invention is a signal compression device which compresses an original signal which is provided in advance to convert the original signal into a compressed signal, comprising: an initial sub-signal creation section which creates, from the original signal, sub-signals of shorter length than the original signal; a created sub-signal selection section which, for each of the sub-signals which has been produced by the initial sub-signal creation section, prunes the created sub-signal candidates to those for which the amount of data is less than for the original signal; a sub-signal re-creation section which, using the created sub-signal candidates which have been produced by the created sub-signal selection section, determines upon a created sub-signal which is actually to be used; a compression mapping determination section which determines upon a mapping for calculation of a compressed signal from the respective sub-signals which has been obtained by the sub-signal re-creation section; and a signal compression section which calculates a compressed signal which corresponds to each of the sub-signals which have been obtained by the sub-signal re-creation section, based upon the mapping which has been obtained by the compression mapping determination section.

In addition, the present invention is a signal retrieval device for, at any location within a stored signal, which is an original signal which is registered in advance, calculating the distance from a reference signal, which is a signal which is taken as an object, and finding a location from the stored signal which is similar to the reference signal, comprising: the sections which are comprised in the signal compression device as described above; a reference feature extraction section which produces a feature from the reference signal; a stored feature extraction section which sets a window upon which attention is focused within the stored signal, and which produces a feature from the stored signal within the window upon which attention is focused; a reference feature compression section which compresses a reference feature which has been produced by the reference feature extraction section, based upon the mapping which has been produced by the compression mapping determination section; a feature matching section which calculates the distance between a reference compressed signal which has been produced by the reference feature compression section and a stored compressed signal which has been produced from the signal compression section by newly using the feature sequence which has been produced by repeatedly performing the processing by the stored feature extraction section while shifting the window upon which attention is focused; and a signal detection decision section which, by comparing together the distance which has been produced by the feature matching section and a search threshold, which is a threshold which corresponds to the distance, decides whether or not the reference signal is present at the location within the stored signal, wherein the operation of the feature matching section and the operation of the signal detection decision section are repeated while shifting the window upon which attention is focused.

In addition, in the above-described signal retrieval device, the present invention further comprising: a distance re-calculation section which, for the location in the database signal at which it has been decided by the signal detection decision section that the query signal is present, calculates the distance between the feature sequence which has been produced by the reference feature extraction section and the feature sequence which has been produced by the stored feature extraction section; and a signal detection re-decision section which, by comparing together the distance which has been produced by the distance re-calculation section and the search threshold, re-decides whether or not the query signal is present at the location of the database signal, wherein the processing of the feature matching section, the signal detection decision section, the distance re-calculation section, and the signal detection re-decision section is repeated while shifting the window upon which attention is focused; for some locations within the database signal, the distance from the query signal is calculated; and it is determined whether or not the query signal is present at the locations within the database signal.

In addition, in the above-described signal retrieval device, the present invention further comprising a skip width calculation section which, based upon the distance which has been calculated by the feature matching section, calculates a skip width for the window upon which attention is focused, and shifts the window upon which attention is focused by the skip width, and wherein the processing of the feature matching section, the signal detection decision section, and the skip width calculation section is repeated while shifting the window upon which attention is focused; for some locations within the database signal, the distance from the query signal is calculated; and it is determined whether or not the query signal is present at the locations within the database signal.

In addition, the present invention is a signal compression program which compresses an original signal which has been provided in advance to convert the original signal into a compressed signal, for causing a computer to execute: an initial sub-signal creation step of creating, from the original signal, sub-signals of shorter length than the original signal; a created sub-signal selection step of, for each of the sub-signals which have been produced by the initial sub-signal creation step, pruning the created sub-signal candidates to those for which the amount of data is less than for the original signal; a sub-signal re-creation step of determining upon a created sub-signal which is actually to be used, using the created sub-signal candidates which have been produced by the created sub-signal selection step; a compression mapping determination step of determining, from each of the sub-signals which have been produced by the sub-signal re-creation step, a mapping for calculation of a compressed signal; and a signal compression step of calculating a compressed signal which corresponds to each of the sub-signals which have been obtained by the sub-signal re-creation step, based upon the mapping which has been obtained by the compression mapping determination step.

In addition, the present invention is a signal retrieval program for, at any location within a stored signal, which is an original signal which is registered in advance, calculating the distance from a reference signal, which is a signal which is taken as an object, and finding a location from the stored signal which is similar to the reference signal, for causing a computer to execute: the steps which are comprised in the signal compression program as described above; a reference feature extraction step in which a feature is produced from the reference signal; a stored feature extraction step in which a window upon which attention is focused is set within the stored signal, and in which a feature is produced from the stored signal within the window upon which attention is focused; a reference feature compression step in which a reference feature which has been produced by the reference feature extraction step is compressed, based upon the mapping which has been produced by the compression mapping determination step; a feature matching step in which the distance is calculated between a reference compressed signal which has been produced by the reference feature compression step and a stored compressed signal which has been produced from the signal compression step by newly using the feature sequence which has been produced by repeatedly performing the processing of the stored feature extraction step while shifting the window upon which attention is focused; a signal detection decision step in which, by comparing together the distance which has been produced by the feature matching step and a search threshold, which is a threshold which corresponds to the distance, it is decided whether or not the reference signal is present at the location within the stored signal; and a step of repeatedly executing the feature matching step and the signal detection decision step while shifting the window upon which attention is focused.

In addition, in the above-described signal retrieval program, the present invention further comprising: a distance re-calculation step in which, for the location in the database signal at which it has been decided by the signal detection decision step that the query signal is present, the distance between the feature sequence which has been produced by the reference feature extraction step and the feature sequence which has been produced by the stored feature extraction step is calculated; and a signal detection re-decision step in which, by comparing together the distance which has been produced by the distance re-calculation step and the search threshold, it is re-decided whether or not the query signal is present at the location of the database signal, and wherein a step is performed in which the processing of the feature matching step, the signal detection decision step, the distance re-calculation step, and the signal detection re-decision step is repeated while shifting the window upon which attention is focused, for some locations within the database signal, the distance from the query signal is calculated; and it is determined whether or not the query signal is present at the locations within the database signal.

In addition, in the above-described signal retrieval program, the present invention further comprising a skip width calculation step in which, based upon the distance which has been calculated by the feature matching step, a skip width for the window upon which attention is focused is calculated, and the window upon which attention is focused is shifted by the skip width, and wherein a step is performed in which the processing of the feature matching step, the signal detection decision step, and the skip width calculation step is repeated while shifting the window upon which attention is focused, for some locations within the database signal, the distance from the query signal is calculated; and it is determined whether or not the query signal is present at the locations within the database signal.

In addition, the present invention is a recording medium capable of being read by a computer, upon which is recorded a signal compression program which compresses an original signal which has been provided in advance to convert the original signal into a compressed signal, for causing a computer to execute: an initial sub-signal creation step of creating, from the original signal, sub-signals of shorter length than the original signal; a created sub-signal selection step of, for each of the sub-signals which have been produced by the initial sub-signal creation step, pruning the created sub-signal candidates to those for which the amount of data is less than for the original signal; a sub-signal re-creation step of determining upon a created sub-signal which is actually to be used, using the created sub-signal candidates which have been produced by the created sub-signal selection step; a compression mapping determination step of determining, from each of the sub-signals which have been produced by the sub-signal re-creation step, a mapping for calculation of a compressed signal; and a signal compression step of calculating a compressed signal which corresponds to each of the sub-signals which have been obtained by the sub-signal re-creation step, based upon the mapping which has been obtained by the compression mapping determination step.

In addition, the present invention is a recording medium capable of being read by a computer, upon which is recorded a signal retrieval program for, at any location within a stored signal, which is an original signal which is registered in advance, calculating the distance from a reference signal, which is a signal which is taken as an object, and finding a location from the stored signal which is similar to the reference signal, for causing a computer to execute: the steps which are comprised in the signal compression program as described above; a reference feature extraction step in which a feature is produced from the reference signal; a stored feature extraction step in which a window upon which attention is focused is set within the stored signal, and in which a feature is produced from the stored signal within the window upon which attention is focused; a reference feature compression step in which a reference feature which has been produced by the reference feature extraction step is compressed, based upon a mapping which has been produced by the compression mapping determination step; a feature matching step in which the distance is calculated between a reference compressed signal which has been produced by the reference feature compression step and a stored compressed signal which has been produced from the signal compression step by newly using the feature sequence which has been produced by repeatedly performing the processing of the stored feature extraction step while shifting the window upon which attention is focused; a signal detection decision step in which, by comparing together the distance which has been produced by the feature matching step and a search threshold, which is a threshold which corresponds to the distance, it is decided whether or not the reference signal is present at the location within the stored signal; and a step of repeatedly executing the feature matching step and the signal detection decision step while shifting the window upon which attention is focused.

In addition, in the recording medium according to the present invention, the signal retrieval program further comprising: a distance re-calculation step in which, for the location in the database signal at which it has been decided by the signal detection decision step that the query signal is present, the distance between the feature sequence which has been produced by the reference feature extraction step and the feature sequence which has been produced by the stored feature extraction step is calculated; and a signal detection re-decision step in which, by comparing together the distance which has been produced by the distance re-calculation step and the search threshold, it is re-decided whether or not the query signal is present at the location of the database signal, and wherein a step is performed in which the processing of the feature matching step, the signal detection decision step, the distance re-calculation step, and the signal detection re-decision step is repeated while shifting the window upon which attention is focused, for some locations within the database signal, the distance from the query signal is calculated; and it is determined whether or not the query signal is present at the locations within the database signal.

In addition, in the recording medium according to the present invention, the signal retrieval program further comprising a skip width calculation step in which, based upon the distance which has been calculated by the feature matching step, a skip width for the window upon which attention is focused is calculated, and the window upon which attention is focused is shifted by the skip width, and wherein a step is performed in which the processing of the feature matching step, the signal detection decision step, and the skip width calculation step is repeated while shifting the window upon which attention is focused, for some locations within the database signal, the distance from the query signal is calculated, and it is determined whether or not the query signal is present at the locations within the database signal.

According to the present invention, by utilizing a novel signal compression method or a novel signal compression device which comprises a sub-signal creation step and a sub-signal re-creation step, and by adaptively varying the length of the sub-signals according to the properties of the signal while avoiding a colossal amount of pre-processing labor, thus compressing the original signal which has been provided in advance further than in the conventional techniques, it is possible to represent the signal sequences with a smaller amount of information than heretofore.

Furthermore, by applying this signal compression method or signal compression device to a signal retrieval method or a signal retrieval device which finds out, from a stored signal which has been registered in advance, portions which are similar to a reference signal which constitutes an objective, it is possible to perform information compression of the feature information, and accordingly it is also possible to obtain the beneficial results that, along with being able to anticipate great increase in the speed of retrieval, it is also possible to reduce the amount of stored information.

In addition, the present invention is a signal retrieval method which finds out portions from a database signal which has been registered in advance which are similar to a query signal which is taken as an object, comprising: a query feature extraction step in which a feature is produced from the query signal; a database feature extraction step in which a window upon which attention is focused is set within the database signal, and in which a feature is produced from the database signal within the window upon which attention is focused; a database feature partitioning step in which a feature sequence which has been produced by repeatedly performing the database feature extraction step while shifting the window upon which attention is focused is partitioned; a database feature pruning step in which a representative feature is extracted from the feature sequence which has been obtained after partitioning by the database feature partitioning step, and a representative feature sequence is produced which consists of a smaller number of features; a feature region extraction step in which a region is produced in which a feature which is included in the partition which has been produced by the database feature partitioning step is present; a feature matching step in which a distance is calculated between a feature sequence which has been produced by the query feature extraction step and a representative feature sequence which has been produced by the database feature pruning step; a distance compensation step in which the distance which has been calculated by the feature matching step is compensated using the region which has been produced by the feature region extraction step; and a signal detection decision step in which, by comparing together the distance which has been produced after compensation by the distance compensation step and a search threshold, which is a threshold which corresponds to the distance, it is decided whether or not the query signal is present at the location within the database signal, and wherein the processing of the feature-matching step through the signal detection decision step is repeated while shifting the window upon which attention is focused, for some locations within the database signal, the distance from the query signal is calculated, and it is determined whether or not the query signal is present at the locations within the database signal.

According to the present invention, in comparison with conventional signal retrieval methods, it is possible to guarantee identical retrieval results, and moreover it is possible to perform the retrieval at a higher speed by locally eliminating matches which are not required, with almost no increase in the memory capacity which is required for the retrieval step.

In addition, in the above-described signal retrieval method according to the present invention, in the database feature pruning step, any single feature in the partition is taken as a representative feature.

In addition, in the above-described signal retrieval method according to the present invention, in the database feature pruning step, the centroid of the features in the partition is taken as a representative feature.

In addition, in the above-described signal retrieval method according to the present invention, in the database feature partitioning step, the feature sequence which has been produced by repeatedly performing the processing of the database feature extraction step while shifting the window upon which attention is focused is segmented equally into lengths which have been specified in advance.

In addition, in the above-described signal retrieval method according to the present invention, in the database feature partitioning step, the feature sequence which has been produced by repeatedly performing the processing of the database feature extraction step while shifting the window upon which attention is focused is segmented so that the region in which a feature is present which is produced by the feature region extraction step becomes smaller than a maximum region which has been specified in advance.

In addition, in the above-described signal retrieval method, the present invention further comprising: a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which have been obtained by the segment extraction step, a mapping is determined for calculation of a feature of less dimensions than the feature; a database feature compression step in which a feature which corresponds to a segment which has been obtained by the segment extraction step and which is of less dimensions than the feature is calculated based upon the mapping which has been obtained by the compression mapping determination step; and a query feature compression step in which a feature which corresponds to a feature which has been obtained by the query feature extraction step and which is of less dimensions than the feature is calculated based upon the mapping which has been obtained by the compression mapping determination step, and wherein, in the database feature pruning step, a representative feature sequence is produced by taking the compressed feature sequence which has been produced by the database feature compression step as a new feature sequence, and, in the feature matching step, a matching is performed of the compressed feature which has been produced by the query feature compression step as a new feature, the processing of the feature matching step through the signal detection decision step is repeated while shifting the window upon which attention is focused, for some locations within the database signal, the distance from the query signal is calculated; and it is determined whether or not the query signal is present at the locations within the database signal.

According to the present invention, by greatly reducing the number of features to which the indices are assigned, it is possible to perform the retrieval with a reduced amount of storage.

In addition, in the above-described signal retrieval method according to the present invention, the database feature compression step comprises: a database feature mapping step in which a segment which has been obtained by the segment extraction step is mapped according to the mapping which has been obtained by the compression mapping determination step; a database projection distance calculation step in which, for the compressed feature sequence which has been produced by the database feature mapping step, the distance from the feature sequence which has been produced by the database feature extraction step is calculated; and a database compressed feature creation step in which a new compressed feature sequence is created from the compressed feature sequence which has been produced by the database feature mapping step and the projection distance which has been produced by the database projection distance calculation step, and wherein the query feature compression step comprises: a query feature mapping step in which the feature which has been obtained by the query feature extraction step is mapped according to the mapping which has been obtained by the compression mapping determination step; a query projection distance calculation step in which, for the compressed feature which has been produced by the query feature mapping step, the distance from the feature which has been produced by the query feature extraction step is calculated; and a query compression feature creation step in which a new compressed feature is created from the compressed feature which has been produced by the query feature mapping step and the projection distance which has been produced by the query projection distance calculation step.

In addition, in the above-described signal retrieval method according to the present invention, the compression mapping determination step extracts a representative feature by a Karhunen-Loeve transform.

In addition, in the above-described signal compression method, the present invention further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; and a signal detection re-decision step in which, by comparing together the distance which has been produced by the distance re-calculation step and the search threshold, it is again decided whether or not the query signal is present at the location of the database signal, and wherein the processing of the feature matching step, the signal compensation step, the signal detection decision step, the distance re-calculation step, and the signal detection re-decision step is repeated while shifting the window upon which attention is focused, for some locations within the database signal, the distance from the query signal is calculated; and it is determined whether or not the query signal is present at the locations within the database signal.

In addition, in the above-described signal retrieval method, the present invention further comprising: a database feature classification step in which the respective features which have been produced by repeatedly performing the database feature extraction step while shifting the window upon which attention is focused are classified based upon a distance which has been defined in advance, and a representative feature of the classification is determined upon; a selection threshold setting step in which a selection threshold for the distance which has been defined by the database feature classification step is calculated from a search threshold which has been defined in advance; and a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step.

According to the present invention, it becomes possible further to prune the mappings which are used upon the signal which it is desired to search for, by reducing the extent of the range which it is required to search. Due to this, it is possible to reduce the cost of calculation.

In addition, in the above-described signal retrieval method according to the present invention, the database feature classification step classifies the features based upon a vector quantization algorithm, using Euclid distance as a distance measure.

In addition, in the above-described signal retrieval method according to the present invention, the feature matching step calculates the distance based upon Manhattan distance or Euclid distance.

In addition, in the above-described signal retrieval method according to the present invention, the database projection distance calculation step calculates the distance based upon Manhattan distance or Euclid distance.

In addition, in the above-described signal retrieval method according to the present invention, the distance re-calculation step calculates the distance based upon Manhattan distance or Euclid distance.

In addition, in the above-described signal retrieval method according to the present invention, the query feature extraction step and the database feature extraction step classify the features by a method which is determined in advance, create a histogram which is a frequency distribution table for each classification, and output the histogram as a new feature.

In addition, in the above-described signal retrieval method, the present invention further comprising a skip width calculation step in which, based upon the distance which has been calculated by the distance compensation step, a skip width for the window upon which attention is focused is calculated, and the window upon which attention is focused is shifted by the skip width, and wherein the processing of the feature matching step, the distance compensation step, the signal detection decision step, and the skip width calculation step is repeated while shifting the window upon which attention is focused, for some locations within the database signal, the distance from the query signal is calculated, and it is determined whether or not the query signal is present at the locations within the database signal.

In addition, the present invention is a signal retrieval method which finds out portions from a database signal which has been registered in advance which are similar to a query signal which is taken as an object, comprising: a query feature extraction step in which a feature is produced from a query signal; a database feature extraction step in which a window upon which attention is focused is set within the database signal, and in which a feature is produced from the database signal within the window upon which attention is focused; a database feature classification step in which the respective features which have been produced by repeatedly performing the database feature extraction step while shifting the window upon which attention is focused are classified based upon a distance which has been defined in advance, and a representative feature of the classification is determined upon; a selection threshold setting step in which a selection threshold for the distance which has been defined by the database feature classification step is calculated from a search threshold which has been defined in advance; a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step; a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which have been obtained by the segment extraction step, a mapping is determined for calculation of a feature of less dimensions than the feature; a database feature compression step in which a feature which corresponds to a segment which has been obtained by the segment extraction step and which is of less dimensions than the feature is calculated based upon the mapping which has been obtained by the compression mapping determination step; a query feature compression step in which a feature which corresponds to a feature which has been obtained by the query feature extraction step and which is of less dimensions than the feature is calculated based upon the mapping which has been obtained by the compression mapping determination step; a feature matching step in which a distance is calculated between a compressed feature sequence which has been produced by the database feature compression step and a compressed feature which has been produced by the query feature extraction step; and a signal detection decision step in which, by comparing together the distance which has been calculated by the feature matching step and a search threshold, which is a threshold which corresponds to the distance, it is decided whether or not the query signal is present at the location within the database signal, and wherein the processing of the feature matching step and the signal detection decision step is repeated while shifting the window upon which attention is focused, for some locations within the database signal, the distance from the query signal is calculated; and it is determined whether or not the query signal is present at the locations within the database signal.

According to the present invention, by reducing the range over which the search must be performed, it becomes possible further to prune the mappings which are used upon the signal which it is desired to search for. Due to this, it is possible to reduce the cost of calculation.

In addition, in the above-described signal retrieval method, the present invention further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; and a signal detection re-decision step in which, by comparing together the distance which has been produced by the distance re-calculation step and the search threshold, it is again decided whether or not the query signal is present at the location of the database signal, and wherein the processing of the feature matching step, the signal detection decision step, the distance re-calculation step, and the signal detection re-decision step is repeated while shifting the window upon which attention is focused, for some locations within the database signal, the distance from the query signal is calculated; and it is determined whether or not the query signal is present at the locations within the database signal.

In addition, in the above-described signal retrieval method, the present invention further comprising a skip width calculation step in which, based upon the distance which has been calculated by the feature matching step, a skip width for the window upon which attention is focused is calculated, and the window upon which attention is focused is shifted by the skip width, and wherein the processing of the feature matching step, the signal detection decision step, and the skip width calculation step is repeated while shifting the window upon which attention is focused, for some locations-within the database signal, the distance from the query signal is calculated; and it is determined whether or not the query signal is present at the locations within the database signal.

In addition, the present invention is a signal retrieval device which finds out portions from a database signal which has been registered in advance which are similar to a query signal which is taken as an object, comprising: a query feature extraction section which produces a feature from the query signal; a database feature extraction section which sets a window upon which attention is focused is set within the database signal, and which produces a feature from the database signal within the window upon which attention is focused; a database feature partitioning section which partitions a feature sequence which has been produced by repeatedly performing the processing of the database feature extraction section while shifting the window upon which attention is focused; a database feature pruning section which extracts a representative feature from the feature sequence which has been obtained after partitioning by the database feature partitioning section, and which produces a representative feature sequence which consists of a smaller number of features; a feature region extraction section which produces a region in which a feature which is included in the partition which has been produced by the database feature partitioning section is present; a feature matching section which calculates a distance between a feature sequence which has been produced by the query feature extraction section and a representative feature sequence which has been produced by the database feature pruning section; a distance compensation section in which the distance which has been calculated by the feature matching section is compensated using the region which has been produced by the feature region extraction section; and a signal detection decision section in which, by comparing together the distance which has been produced after compensation by the distance compensation section and a search threshold, which is a threshold which corresponds to the distance, it is decided whether or not the query signal is present at the location within the database signal, and wherein the processing of the feature matching section through the signal detection decision section is repeated while shifting the window upon which attention is focused; for some locations within the database signal, the distance from the query signal is calculated; and it is determined whether or not the query signal is present at the locations within the database signal.

In addition, in the above-described signal retrieval device, the present invention further comprising: a segment extraction section which extracts segments, which are sub-sequences, by segmenting a feature sequence which has been produced by repeatedly performing the processing of the database feature extraction section while shifting the window upon which attention is focused; a compression mapping determination section which, from each of the segments which have been obtained by the segment extraction section, determines a mapping for calculation of a feature of less dimensions than the feature; a database feature compression section which calculates a feature which corresponds to a segment which has been obtained by the segment extraction section and which is of less dimensions than the feature based upon a mapping which has been obtained by the compression mapping determination section; and a query feature compression section which calculates a feature which corresponds to a feature which has been obtained by the query feature extraction section and which is of less dimensions than the feature based upon a mapping which has been obtained by the compression mapping determination section, and wherein, by the database feature pruning section, a representative feature sequence is produced by using a compressed feature sequence which has been produced by the database feature compression section is produced as a new feature sequence; by the feature matching section, matching is performed using a compressed feature which has been produced by the query feature compression section as a new feature; and further: the processing of the feature matching section through the signal detection decision section is repeated while shifting the window upon which attention is focused, for some locations within the database signal, the distance from the query signal is calculated; and it is determined whether or not the query signal is present at the locations within the database signal.

In addition, in the above-described signal retrieval device, the present invention further comprising: a distance re-calculation section which, for the location in the database signal at which it has been decided by the signal detection decision section that the query signal is present, calculates the distance between the feature sequence which has been produced by the query feature extraction section and the feature sequence which has been produced by the database feature extraction section; and a signal detection re-decision section which, by comparing together the distance which has been produced by the distance re-calculation section and the search threshold, again decides whether or not the query signal is present at the location of the database signal, and wherein the processing of the feature matching section, the distance compensation section, the signal detection decision section, the distance re-calculation section, and the signal detection re-decision section is repeated while shifting the window upon which attention is focused, for some locations within the database signal, the distance from the query signal is calculated; and it is determined whether or not the query signal is present at the locations within the database signal.

In addition, in the above-described signal retrieval device, the present invention further comprising: a database feature classification section which classifies the respective features which have been produced by repeatedly performing the processing of the database feature extraction section while shifting the window upon which attention is focused based upon a distance which has been determined in advance, and determines upon a representative feature of the classification; a selection threshold setting section which calculates a selection threshold for the distance which has been defined by the database feature classification section from a search threshold which has been defined in advance; and a database feature selection section which, for the classification which has been produced by the database feature classification section, selects a feature which is included in the classification which contains a representative feature such that the distance from the feature which has been produced by the query feature extraction section satisfies a condition which is produced from the selection threshold which has been calculated by the selection threshold setting section.

In addition, in the above-described signal retrieval device, the present invention further comprising a skip width calculation section which, based upon the distance which has been calculated by the distance compensation section, calculates a skip width for the window upon which attention is focused, and shifts the window upon which attention is focused by the skip width, and wherein the processing of the feature matching section, the distance compensation section, the signal detection decision section, and the skip width calculation section is repeated while shifting the window upon which attention is focused, for some locations within the database signal, the distance from the query signal is calculated; and it is determined whether or not the query signal is present at the locations within the database signal.

In addition, the present invention is a signal retrieval device which finds out portions from a database signal which has been registered in advance which are similar to a query signal which is taken as an object, comprising: a query feature extraction section which produces a feature from a query signal; a database feature extraction section which sets a window upon which attention is focused within the database signal, and which produces a feature from the database signal within the window upon which attention is focused; a database feature classification section which classifies the respective features which have been produced by repeatedly performing the processing of the database feature extraction section while shifting the window upon which attention is focused based upon a distance which has been determined in advance, and determines upon a representative feature of the classification; a selection threshold setting section which calculates a selection threshold for the distance which has been defined by the database feature classification section from a search threshold which has been defined in advance; a database feature selection section which, among the classification which has been produced by the database feature classification section, selects a feature which is included in the classification which contains a representative feature such that the distance from the feature which has been produced by the query feature extraction section satisfies a condition which is produced from the selection threshold which has been calculated by the selection threshold setting section; a segment extraction section which extracts segments, which are subsequences, by segmenting a feature sequence which has been produced by repeatedly performing the processing of the database feature extraction section while shifting the window upon which attention is focused; a compression mapping determination section which, from each of the segments which have been obtained by the segment extraction section, determines a mapping for calculation of a feature of less dimensions than the feature; a database feature compression section which calculates a feature which corresponds to a segment which has been obtained by the segment extraction section and which is of less dimensions than the feature based upon a mapping which has been obtained by the compression mapping determination section; a query feature compression section which calculates a feature which corresponds to a feature which has been obtained by the query feature extraction section and which is of less dimensions than the feature based upon the mapping which has been obtained by the compression mapping determination section; a feature matching section which calculates a distance between a compressed feature sequence which has been produced by the database feature compression section and a compressed feature which has been produced by the query feature extraction section; and a signal detection decision section which, by comparing together the distance which has been calculated by the feature matching section and a search threshold, which is a threshold which corresponds to the distance, decides whether or not the query signal is present at the location within the database signal, and wherein the processing of the feature matching section through the signal detection decision section is repeated while shifting the window upon which attention is focused, for some locations within the database signal, the distance from the query signal is calculated; and it is determined whether or not the query signal is present at the locations within the database signal.

In addition, in the above-described signal retrieval device, the present invention further comprising: a distance re-calculation section which, for the location in the database signal at which it has been decided by the signal detection decision section that the query signal is present, calculates the distance between the feature sequence which has been produced by the query feature extraction section and the feature sequence which has been produced by the database feature extraction section; and a signal detection re-decision section which, by comparing together the distance which has been produced by the distance re-calculation section and the search threshold, again decides whether or not the query signal is present at the location of the database signal and wherein the processing of the feature matching section, the signal detection decision section, the distance re-calculation section, and the signal detection re-decision section is repeated while shifting the window upon which attention is focused, for some locations within the database signal, the distance from the query signal is calculated; and it is determined whether or not the query signal is present at the locations within the database signal.

In addition, in the above-described signal retrieval device, the present invention further comprising a skip width calculation section which, based upon the distance which has been calculated by the feature matching section, calculates a skip width for the window upon which attention is focused, and shifts the window upon which attention is focused by the skip width and wherein the processing of the feature matching section, the signal detection decision section, and the skip width calculation section is repeated while shifting the window upon which attention is focused; for some locations within the database signal, the distance from the query signal is calculated; and it is determined whether or not the query signal is present at the locations within the database signal.

In addition, the present invention is a program for execution by a computer of a signal retrieval device which finds out portions from a database signal which has been registered in advance which are similar to a query signal which is taken as an object, comprising: a query feature extraction step in which a feature is produced from the query signal; a database feature extraction step in which a window upon which attention is focused is set within the database signal, and in which a feature is produced from the database signal within the window upon which attention is focused; a database feature partitioning step in which a feature sequence which has been produced by repeatedly performing the database feature extraction step while shifting the window upon which attention is focused is partitioned; a database feature pruning step in which a representative feature is extracted from the feature sequence which has been obtained after partitioning by the database feature partitioning step, and a representative feature sequence is produced which consists of a smaller number of features; a feature region extraction step in which a region is produced in which a feature which is included in the partition which has been produced by the database feature partitioning step is present; a feature matching step in which a distance is calculated between a feature which has been produced by the query feature extraction step and a representative feature sequence which has been produced by the database feature pruning step; a distance compensation step in which the distance which has been calculated by the feature matching step is compensated using the region which has been produced by the feature region extraction step; a signal detection decision step in which, by comparing together the distance which has been produced after compensation by the distance compensation step and a search threshold, which is a threshold which corresponds to the distance, it is decided whether or not the query signal is present at the location within the database signal; and a step of: repeating the processing of the feature matching step through the signal detection decision step while shifting the window upon which attention is focused, for some locations within the database signal, calculating the distance from the query signal; and determining whether or not the query signal is present at the locations within the database signal.

In addition, in the above-described program, the present invention further comprising: a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which have been obtained by the segment extraction step, a mapping is determined for calculation of a feature of less dimensions than the feature; a database feature compression step in which a feature which corresponds to a segment which has been obtained by the segment extraction step and which is of less dimensions than the feature is calculated based upon the mapping which has been obtained by the compression mapping determination step; a query feature compression step in which a feature which corresponds to a feature which has been obtained by the query feature extraction step and which is of less dimensions than the feature is calculated based upon the mapping which has been obtained by the compression mapping determination step; and a step in which, in the database feature pruning step, a representative feature sequence is produced by taking the compressed feature sequence which has been produced by the database feature compression step as a new feature sequence, and, in the feature matching step, a matching is performed of the compressed feature which has been produced by the query feature compression step as a new feature; the processing of the feature matching step through the signal detection decision step is repeated while shifting the window upon which attention is focused; for some locations within the database signal, the distance from the query signal is calculated; and it is determined whether or not the query signal is present at the locations within the database signal.

In addition, in the above-described program, the present invention further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; a signal detection re-decision step in which, by comparing together the distance which has been produced by the distance re-calculation step and the search threshold, it is again decided whether or not the query signal is present at the location of the database signal; and a step in which: the processing of the feature matching step, the distance compensation step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

In addition, in the above-described program, the present invention further comprising: a database feature classification step in which the respective features which have been produced by repeatedly performing the database feature extraction step while shifting the window upon which attention is focused are classified based upon a distance which has been determined in advance, and a representative feature of the classification is determined upon; a selection threshold setting step in which a selection threshold for the distance which has been defined by the database feature classification step is calculated from a search threshold which has been defined in advance; and a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step.

In addition, in the above-described program, the present invention further comprising: a skip width calculation step in which, based upon the distance which has been calculated by the distance compensation step, a skip width for the window upon which attention is focused is calculated, and the window upon which attention is focused is shifted by the skip width; and a step in which: the processing of the feature matching step, the distance compensation step, the signal detection decision step, and the skip width calculation step is repeated while shifting the window upon which attention is focused; for some locations within the database signal, the distance from the query signal is calculated; and it is determined whether or not the query signal is present at the locations within the database signal.

In addition, the present invention is a program for execution by a computer of a signal retrieval device which finds out portions from a database signal which has been registered in advance which are similar to a query signal which is taken as an object, comprising: a query feature extraction step in which a feature is produced from the query signal; a database feature extraction step in which a window upon which attention is focused is set within the database signal, and in which a feature is produced from the database signal within the window upon which attention is focused; a database feature classification step in which the respective features which have been produced by repeatedly performing the database feature extraction step while shifting the window upon which attention is focused are classified based upon a distance which has been determined in advance, and a representative feature of the classification is determined upon; a selection threshold setting step in which a selection threshold for the distance which has been defined by the database feature classification step is calculated from a search threshold which has been defined in advance; a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step; a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which have been obtained by the segment extraction step, a mapping is determined for calculation of a feature of less dimensions than the feature; a database feature compression step in which a feature which corresponds to a segment which has been obtained by the segment extraction step and which is of less dimensions than the feature is calculated based upon the mapping which has been obtained by the compression mapping determination step; a query feature compression step in which a feature which corresponds to a feature which has been obtained by the query feature extraction step and which is of less dimensions than the feature is calculated based upon the mapping which has been obtained by the compression mapping determination step; a feature matching step in which a distance is calculated between a compressed feature sequence which has been produced by the database feature compression step and a compressed feature which has been produced by the query feature extraction step; a signal detection decision step in which, by comparing together the distance which has been calculated by the feature matching step and a search threshold, which is a threshold which corresponds to the distance, it is decided whether or not the query signal is present at the location within the database signal; and a step in which: the processing of the feature matching step and the signal detection decision step is repeated while shifting the window upon which attention is focused; for some locations within the database signal, the distance from the query signal is calculated; and it is determined whether or not the query signal is present at the locations within the database signal.

In addition, in the above-described program, the present invention further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; a signal detection re-decision step in which, by comparing together the distance which has been produced by the distance re-calculation step and the search threshold, it is again decided whether or not the query signal is present at the location of the database signal; and a step in which: the processing of the feature matching step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

In addition, in the above-described program, the present invention further comprising: a skip width calculation step in which, based upon the distance which has been calculated by the feature matching step, a skip width for the window upon which attention is focused is calculated, and the window upon which attention is focused is shifted by the skip width; and a step in which: the processing of the feature matching step, the signal detection decision step, and the skip width calculation step is repeated while shifting the window upon which attention is focused; for some locations within the database signal, the distance from the query signal is calculated; and it is determined whether or not the query signal is present at the locations within the database signal.

In addition, the present invention is a recording medium capable of being read by a computer, upon which is recorded a program for causing a computer of a signal retrieval device which finds out portions from a database signal which has been registered in advance which are similar to a query signal which is taken as an object to execute: a query feature extraction step in which a feature is produced from the query signal; a database feature extraction step in which a window upon which attention is focused is set within the database signal, and in which a feature is produced from the database signal within the window upon which attention is focused; a database feature partitioning step in which a feature sequence which has been produced by repeatedly performing the database feature extraction step while shifting the window upon which attention is focused is partitioned; a database feature pruning step in which a representative feature is extracted from the feature sequence which has been obtained after partitioning by the database feature partitioning step, and a representative feature sequence is produced which consists of a smaller number of features; a feature region extraction step in which a region is produced in which a feature which is included in the partition which has been produced by the database feature partitioning step is present; a feature matching step in which a distance is calculated between a feature which has been produced by the query feature extraction step and a representative feature sequence which has been produced by the database feature pruning step; a distance compensation step in which the distance which has been calculated by the feature matching step is compensated using the region which has been produced by the feature region extraction step; a signal detection decision step in which, by comparing together the distance which has been produced after compensation by the distance compensation step and a search threshold, which is a threshold which corresponds to the distance, it is decided whether or not the query signal is present at the location within the database signal; and a step of: repeating the processing of the feature matching step through the signal detection decision step while shifting the window upon which attention is focused; for some locations within the database signal, calculating the distance from the query signal; and determining whether or not the query signal is present at the locations within the database signal.

In addition, in the above-described recording medium according to the present invention, the above-described program further comprising: a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which haves been obtained by the segment extraction step, a mapping is determined for calculation of a feature of less dimensions than the feature; a database feature compression step in which a feature which corresponds to a segment which has been obtained by the segment extraction step and which is of less dimensions than the feature is calculated based upon the mapping which has been obtained by the compression mapping determination step; a query feature compression step in which a feature which corresponds to a feature which has been obtained by the query feature extraction step and which is of less dimensions than the feature is calculated based upon the mapping which has been obtained by the compression mapping determination step; and a step in which, in the database feature pruning step, a representative feature sequence is produced by taking the compressed feature sequence which has been produced by the database feature compression step as a new feature sequence, and, in the feature matching step, a matching is performed of the compressed feature which has been produced by the query feature compression step as a new feature; the processing of the feature matching step through the signal detection decision step is repeated while shifting the window upon which attention is focused; for some locations within the database signal, the distance from the query signal is calculated; and it is determined whether or not the query signal is present at the locations within the database signal.

In addition, in the above-described recording medium according to the present invention, the above-described program further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; a signal detection re-decision step in which, by comparing together the distance which has been produced by the distance re-calculation step and the search threshold, it is again decided whether or not the query signal is present at the location of the database signal; and a step in which: the processing of the feature matching step, the distance compensation step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

In addition, in the above-described recording medium according to the present invention, the above-described program further comprising: a database feature classification step in which the respective features which have been produced by repeatedly performing the database feature extraction step while shifting the window upon which attention is focused are classified based upon a distance which has been determined in advance, and a representative feature of the classification is determined upon; a selection threshold setting step in which a selection threshold for the distance which has been defined by the database feature classification step is calculated from a search threshold which has been defined in advance; and a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step.

In addition, in the above-described recording medium according to the present invention, the above-described program further comprising: a skip width calculation step in which, based upon the distance which has been calculated by the distance compensation step, a skip width for the window upon which attention is focused is calculated, and the window upon which attention is focused is shifted by the skip width; and a step in which: the processing of the feature matching step, the distance compensation step, the signal detection decision step, and the skip width calculation step is repeated while shifting the window upon which attention is focused; for some locations within the database signal, the distance from the query signal is calculated; and it is determined whether or not the query signal is present at the locations within the database signal.

In addition, the present invention is a recording medium capable of being read by a computer, upon which is recorded a program for causing a computer of a signal retrieval device which finds out portions from a database signal which has been registered in advance which are similar to a query signal which is taken as an object to execute: a query feature extraction step in which a feature is produced from the query signal; a database feature extraction step in which a window upon which attention is focused is set within the database signal, and in which a feature is produced from the database signal within the window upon which attention is focused; a database feature classification step in which the respective features which have been produced by repeatedly performing the database feature extraction step while shifting the window upon which attention is focused are classified based upon a distance which has been determined in advance, and a representative feature of the classification is determined upon; a selection threshold setting step in which a selection threshold for the distance which has been defined by the database feature classification step is calculated from a search threshold which has been defined in advance; a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step; a segment extraction step in which segments, which are sub-sequences, are extracted by segmenting a feature sequence which has been produced by repeatedly performing the database feature extraction step while shifting the window upon which attention is focused; a compression mapping determination step in which, from each of the segments which have been obtained by the segment extraction step, a mapping is determined for calculation of a feature of less dimensions than the feature; a database feature compression step in which a feature which corresponds to the segment which has been obtained by the segment extraction step and which is of less dimensions than the feature is calculated based upon the mapping which has been obtained by the compression mapping determination step; a query feature compression step in which a feature which corresponds to a feature which has been obtained by the query feature extraction step and which is of less dimensions than the feature is calculated based upon the mapping which has been obtained by the compression mapping determination step; a feature matching step in which a distance is calculated between a compressed feature sequence which has been produced by the database feature compression step and a compressed feature which has been produced by the query feature extraction step; a signal detection decision step in which, by comparing together the distance which has been calculated by the feature matching step and a search threshold, which is a threshold which corresponds to the distance, it is decided whether or not the query signal is present at the location within the database signal; and a step in which: the processing of the feature matching step and the signal detection decision step is repeated while shifting the window upon which attention is focused; for some locations within the database signal, the distance from the query signal is calculated; and it is determined whether or not the query signal is present at the locations within the database signal.

In addition, in the above-described recording medium according to the present invention, the above-described program further comprising: a distance re-calculation step in which, for the location in the database signal at which it has been decided by the signal detection decision step that the query signal is present, the distance between the feature which has been produced by the query feature extraction step and the feature sequence which has been produced by the database feature extraction step is calculated; a signal detection re-decision step in which, by comparing together the distance which has been produced by the distance re-calculation step and the search threshold, it is again decided whether or not the query signal is present at the location of the database signal; and a step in which: the processing of the feature matching step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

In addition, in the above-described recording medium according to the present invention, the above-described program further comprising: a skip width calculation step in which, based upon the distance which has been calculated by the feature matching step, a skip width for the window upon which attention is focused is calculated, and the window upon which attention is focused is shifted by the skip width; and a step in which: the processing of the feature matching step, the signal detection decision-step, and the skip width calculation step is repeated while shifting the window upon which attention is focused; for some locations within the database signal, the distance from the query signal is calculated; and it is determined whether or not the query signal is present at the locations within the database signal.

DETAILED DESCRIPTION OF THE INVENTION

In the following signal compression devices according to various preferred embodiments of the present invention will be described with reference to the appended drawings. While the present invention can be applied to various types of signals which are to be the objects of processing, as the example which will be employed in this specification, along with the object signal which is to be subjected to the processing (the original signal) being built up from a video signal, it will be supposed that it employs a histogram sequence which is an example of a multi-dimensional vector. Note that a histogram is a frequency distribution table which has been obtained for each of certain classifications by, for example, extracting certain features from the video signal, and by classifying these features with a method which has been set in advance. Furthermore, if it is possible to extract the features of the original signal as a multi-dimensional vector sequence, it will be acceptable for the original signal to utilize this multi-dimensional vector sequence, without limitation to a histogram.

The First Preferred Embodiment

Figure 1:
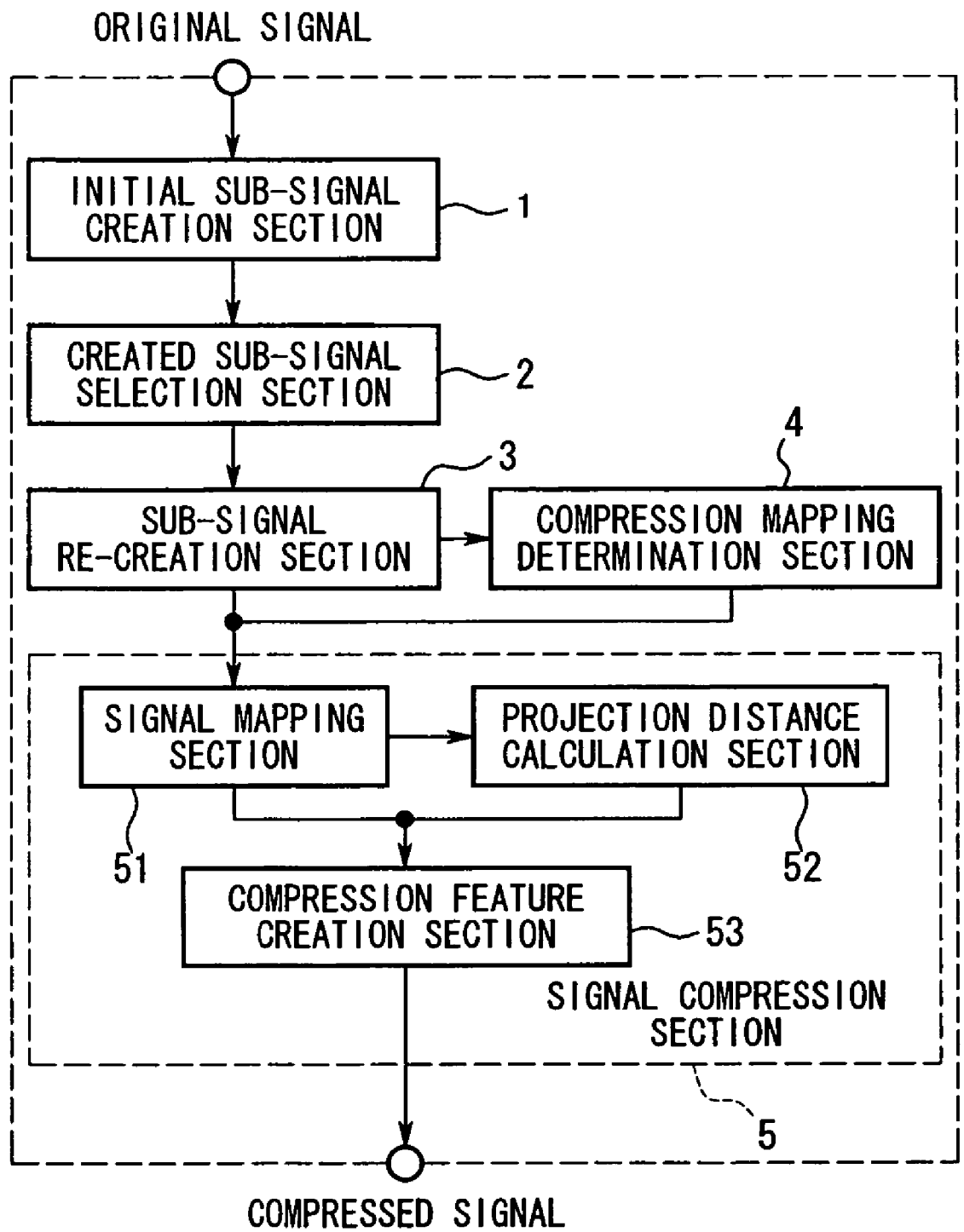
FIG. 1 is a block diagram showing the structure of a first preferred embodiment of the present invention.

FIG. 1 is a block diagram showing the structure of the first preferred embodiment of the present invention. In this figure, the reference symbol 1 denotes an initial sub-signal creation section which creates, from the original signal, various sub-signals whose lengths are shorter than that of the original signal. The reference symbol 2 denotes a created sub-signal selection section which, for each sub-signal which is outputted from the initial sub-signal creation section 1, reduces the candidates for creation of sub-signals to those for which the amount of data is smaller than that of the original signal. The reference symbol 3 denotes a sub-signal re-creation section which, by using the candidates for created sub-signal which have been outputted by the created sub-signal selection section 2, determines which created sub-signal should actually be used. The reference symbol 4 denotes a compression mapping determination section which, from each sub-signal which has been outputted from the sub-signal re-creation section 3, determines upon a mapping for calculation of a compressed signal. The reference symbol 5 denotes a signal compression section which calculates the compressed signals which correspond to each sub-signal which has been outputted from the sub-signal re-creation section 3, based upon the mappings which have been outputted from the compression mapping determination section 4.

Note that this signal compression section 5 comprises: a signal mapping section 51 which, using the sub-signals which have been outputted from the sub-signal re-creation section 3 and the set of linear mappings which have been outputted from the compression mapping determination section 4, projects the histogram within each of the sub-signals into a subspace which has been created from its sub-signal; a projection distance calculation section 52 which, using the sub-signals which are outputted from the sub-signal re-creation section 3, the sets of linear mappings which are outputted from the compression mapping determination section 4, and the sets of compression histogram sequence which are outputted from the signal mapping section 51, calculates the distance between each histogram and the compression histogram which corresponds thereto; and a compression feature creation section 53 which, using the set of compression histogram sequence which has been outputted from the signal mapping section 51 and the projection distances which have been outputted from the projection distance calculation section 52, calculates the sequence of compression features.

The signal compression device which is shown in FIG. 1 is one which takes as its input a histogram sequence which has been extracted from the original signal, in other words from a video signal which it is desired to compress, and which outputs a compressed signal, in other words a compression histogram sequence resulting from compression of the histogram sequence extracted from the video signal.

Next, the operation of the signal compression device which is shown in FIG. 1 will be explained while referring to FIGS. 5 through 15. First, the overall operational flow of the signal compression device according to the first preferred embodiment of the present invention will be explained while referring to the flow chart which shows the processing operation of the signal compression device shown in FIG. 5. The detailed of each procedure which the overall flow includes will be explained hereinafter.

Figure 5:
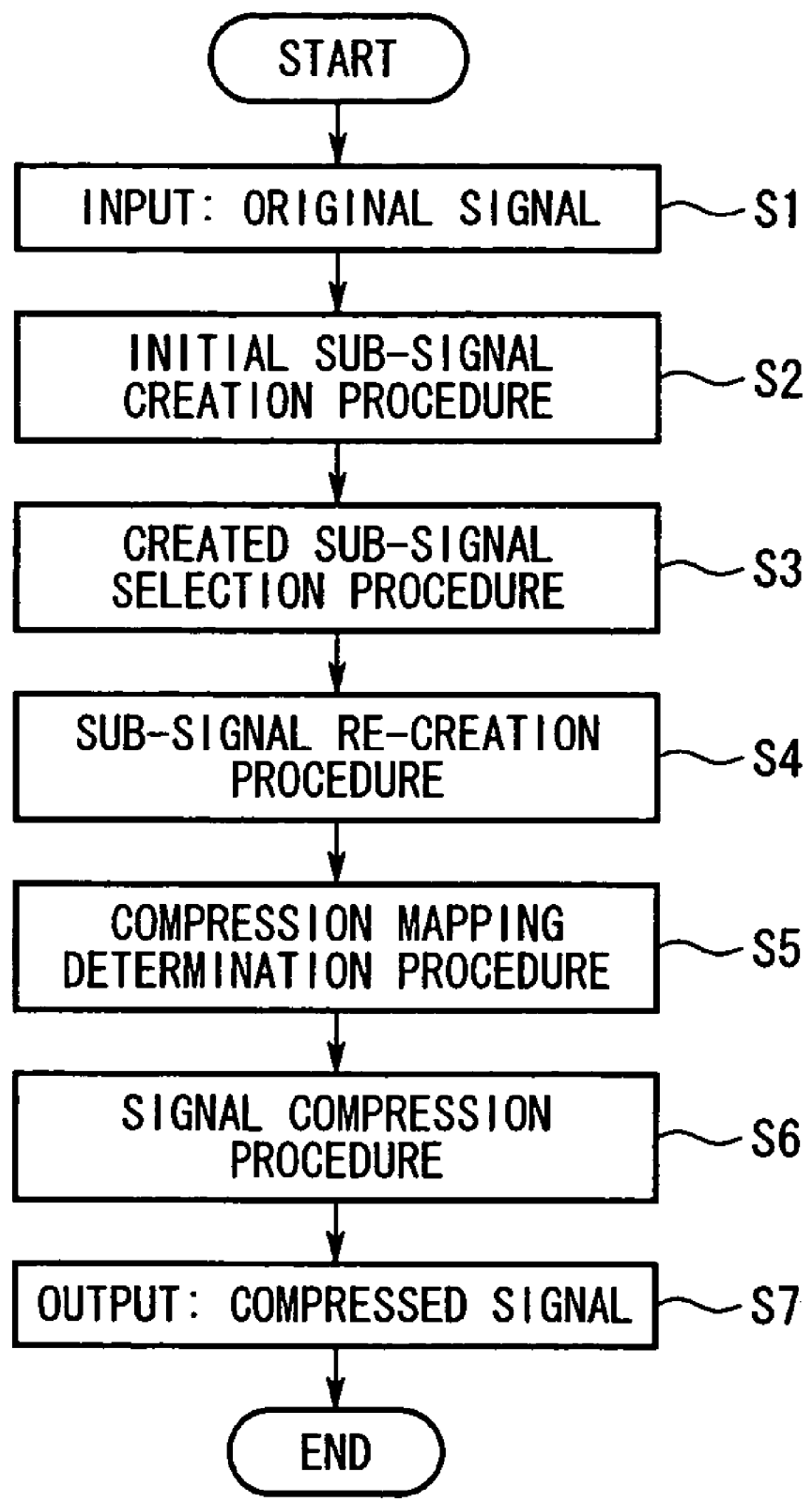
FIG. 5 is a flow chart showing the processing operation of the signal compression device according to the first preferred embodiment of the present invention shown in FIG. 1.

In FIG. 5, first, the initial sub-signal creation section 1 reads in the original signal which has been supplied (in a step S1). Next, the initial sub-signal creation section 1 performs an initial sub-signal creation procedure (in a step S2). Next, the created sub-signal selection section 2 performs a created sub-signal selection procedure (in a step S3). Next, the sub-signal re-creation section 3 performs a sub-signal re-creation procedure (in a step S4). Next, the compression mapping determination section 4 performs a compression mapping determination procedure (in a step S5). Furthermore, the signal compression section 5 performs a signal compression procedure (in a step S6). The signal compression section 5 outputs the final compressed signal, which corresponds to the original signal (in a step S7).

Figure 6:
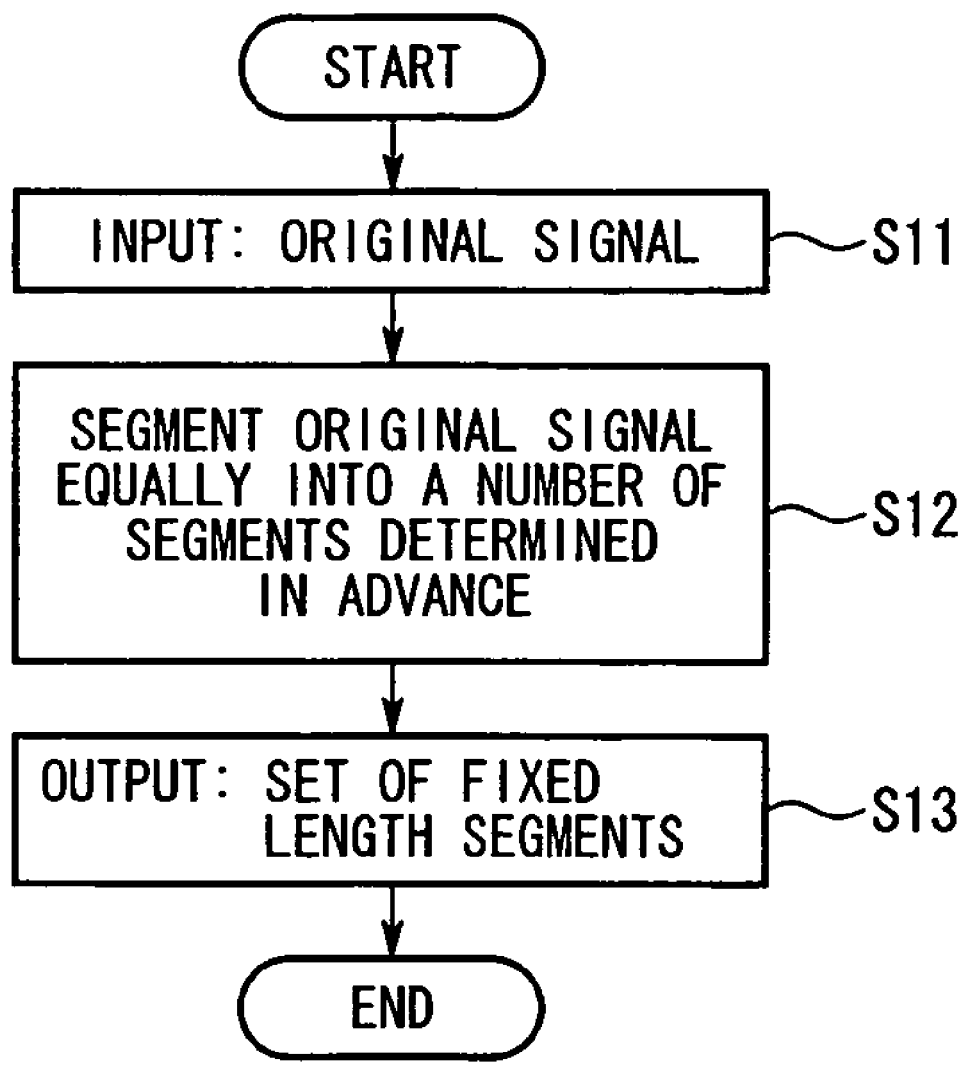
FIG. 6 is a flow chart showing the operation of an initial sub-signal creation section 1 shown in FIG. 1.

Next, the details of the initial sub-signal creation procedure (the step S2) which is shown in FIG. 5 will be explained while referring to FIG. 6. FIG. 6 is a flow chart showing the operation of the initial sub-signal creation section 1.

First, the initial sub-signal creation section 1 reads in the sequence of histograms which is the original signal (in a step S11). Next, the initial sub-signal creation section 1 segments the histogram sequence which has been read in into equal segments, according to a number of segments which has been provided in advance (in a step S12). The initial sub-signal creation section 1 outputs the set of segments resulting from this division, which is a histogram sequence (in a step S13).

Figure 7:
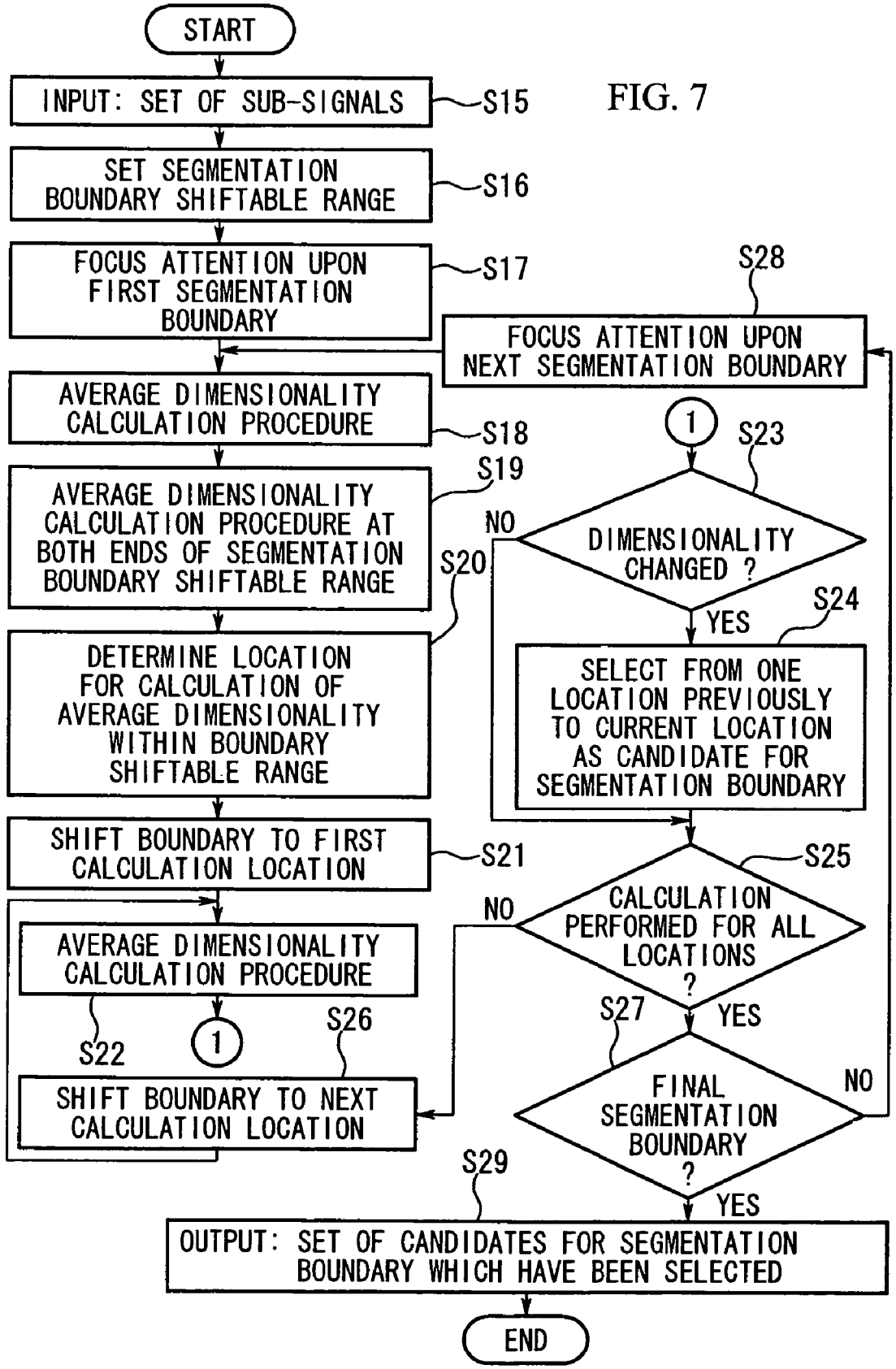
FIG. 7 is a flow chart showing the operation of a created sub-signal selection section 2 which is shown in FIG. 1.

Next, the details of the created sub-signal selection procedure (the step S3) shown in FIG. 5 will be explained with reference to FIG. 7. FIG. 7 is a flow chart showing the operation of the created sub-signal selection section 2.

In FIG. 7, first, the created sub-signal selection section 2 reads in the set of fixed length segments (sub-signals) which is outputted from the initial sub-signal creation section 1 (in a step S15). Next, a segmentation boundary shiftable width, which is the width over which the segmentation boundary can be shifted from the current position, is set in advance, and, for each segmentation boundary, a range having the segmentation boundary shiftable width on both sides of the current position of the segmentation boundary is set as a segmentation boundary shiftable range (in a step S16). Next, among the segmentation boundaries of the segments, attention is paid (in a step S117) to the first segmentation boundary. For two segments which have a segmentation boundary in common, the dimensionality of the compressed signal when the segmentation boundary is at the current position is calculated, and the average value with these normalized by segment length is calculated (in a step S18).

Next, for two segments which have a segmentation boundary in common, the dimensionality of the compressed signal which the segmentation boundary is at one of the both ends of the segmentation boundary shiftable range is calculated, and the average values with these normalized by segment length are calculated (in a step S19).

Furthermore, the average value of the dimensionality for several locations within the segmentation boundary shiftable range is calculated in the same manner. The number of times to perform this calculation is obtained from the average value of the dimensionality at the segmentation boundary at the above described three locations. Next, the average value of the dimensionality is calculated in order from the top of the segmentation boundary shiftable range so as to be spaced at equal intervals within the segmentation boundary shiftable range, based upon the number of times for calculation which has thus been obtained (in steps S20, S21, and S22).

It is then determined whether or not change in the dimensionality is present for any among the histogram sequence which have the segmentation boundary in common (in a step S23), and, when a change has occurred in the dimensionality for any among the histogram sequence which have the segmentation boundary in common (YES in the step S23), then all the positions in the range from the present calculation location to the calculation location one before are retained as candidates for the most suitable segmentation boundary (in a step S24). Note that the details of the method by which the average value of the dimensionality is calculated will be explained hereinafter with reference to the figures.

Furthermore, the number x of locations for performing the calculation at the one side of the segmentation boundary shiftable range is obtained in the following manner.

First, in the procedures which are performed by the created sub-signal selection section 2 and by the sub-signal re-creation section 3 which will be described hereinafter, the number of locations $f(x)$ for calculation of the average value of the dimensionality which is necessary for determining a single segmentation boundary is given by the following.

$$f(x) = \left\{ (2x+3) + \overline{K} \frac{\Delta}{x+1} \right\} \times 2,$$

$\overline{K}$ is obtained as follows:

$$\overline{K} = \begin{cases} C_{LR} - C_{LL} \\ \text{if } C_{LR} \leq C_{RR}, C_{LL} < C_{RL} \\ (C_{LC} - C_{LL}) + \min(C_{RC}, C_{LR}) - \min(C_{LC}, C_{RR}) \\ \text{if } C_{LR} > C_{RR}, C_{LL} < C_{RL}, C_{LC} \leq C_{RC} \\ (C_{RC} - C_{RR}) + \min(C_{LC}, C_{RL}) - \min(C_{RC}, C_{LL}) \\ \text{if } C_{LC} > C_{RR}, C_{LL} < C_{RL}, C_{LC} > C_{RC} \\ 0. \text{ Otherwise} \end{cases}$$

where $\Delta$ is the width of the segmentation boundary shiftable range, $C_{LL}$, $C_{LC}$, and $C_{LR}$ are the dimensionality of the segment of the top side, when the segmentation boundary is at respectively the front end, the initial position, and the rear end of the segmentation boundary shiftable range, and $C_{RL}$, $C_{RC}$, and $C_{RR}$ are the dimensionality of the segment of the end side, when the segmentation boundary is at respectively the front end, the initial position, and the rear end of the segmentation boundary shiftable range.

This function $f(x)$ takes its minimum value when $$x = \sqrt{\frac{1}{2}\overline{K}\Delta} - 1$$

The closest integer to this x is set as the number of locations for performing the calculation.

Since the number of times that the calculation is to be performed is obtained in this manner, if the calculation for all the calculation locations has not been completed (NO in the step S25), then the boundary is shifted to the next calculation location (in a step S26), and the operations in the steps S22 through S24 are repeated.

Furthermore, if the calculation for all the calculation locations has been completed (YES in the step S25), then a decision is made as to whether or not the operations have been completed for all of the segmentation boundaries (in a step S27), and, if the operations have in fact not been completed for all of the segmentation boundaries (NO in the step S27), then the segmentation boundary is changed to the next segmentation boundary (in a step S28), and the operations in the steps S18 through S26 are repeated. On the other hand, when the operations have in fact been completed for all of the segmentation boundaries (YES in the step S27), then the created sub-signal selection section 2 outputs the set of segmentation boundary candidates which have been retained (in a step S29).

Figure 8:
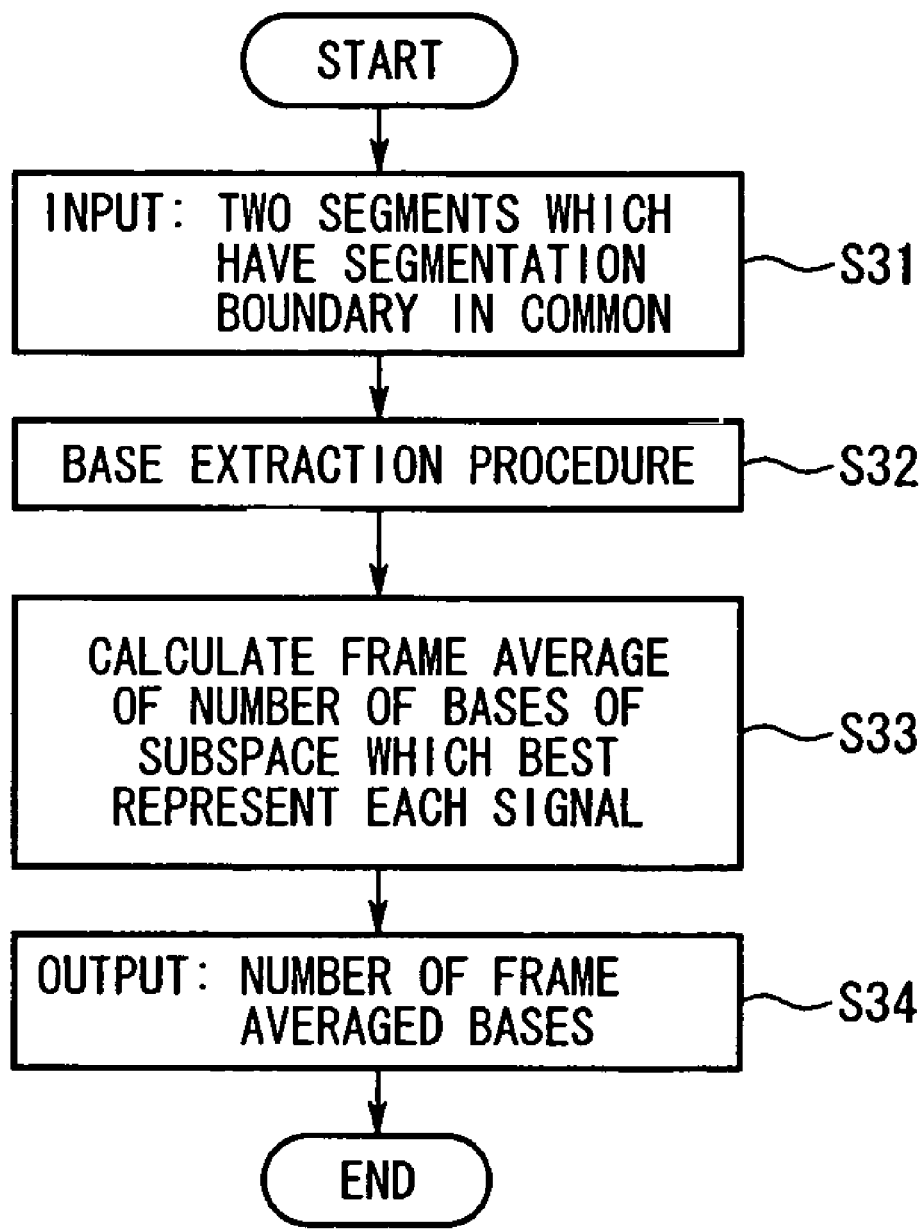
FIG. 8 is a flow chart showing the overall flow of an average dimensionality calculation procedure shown in FIG. 7.
Figure 9:
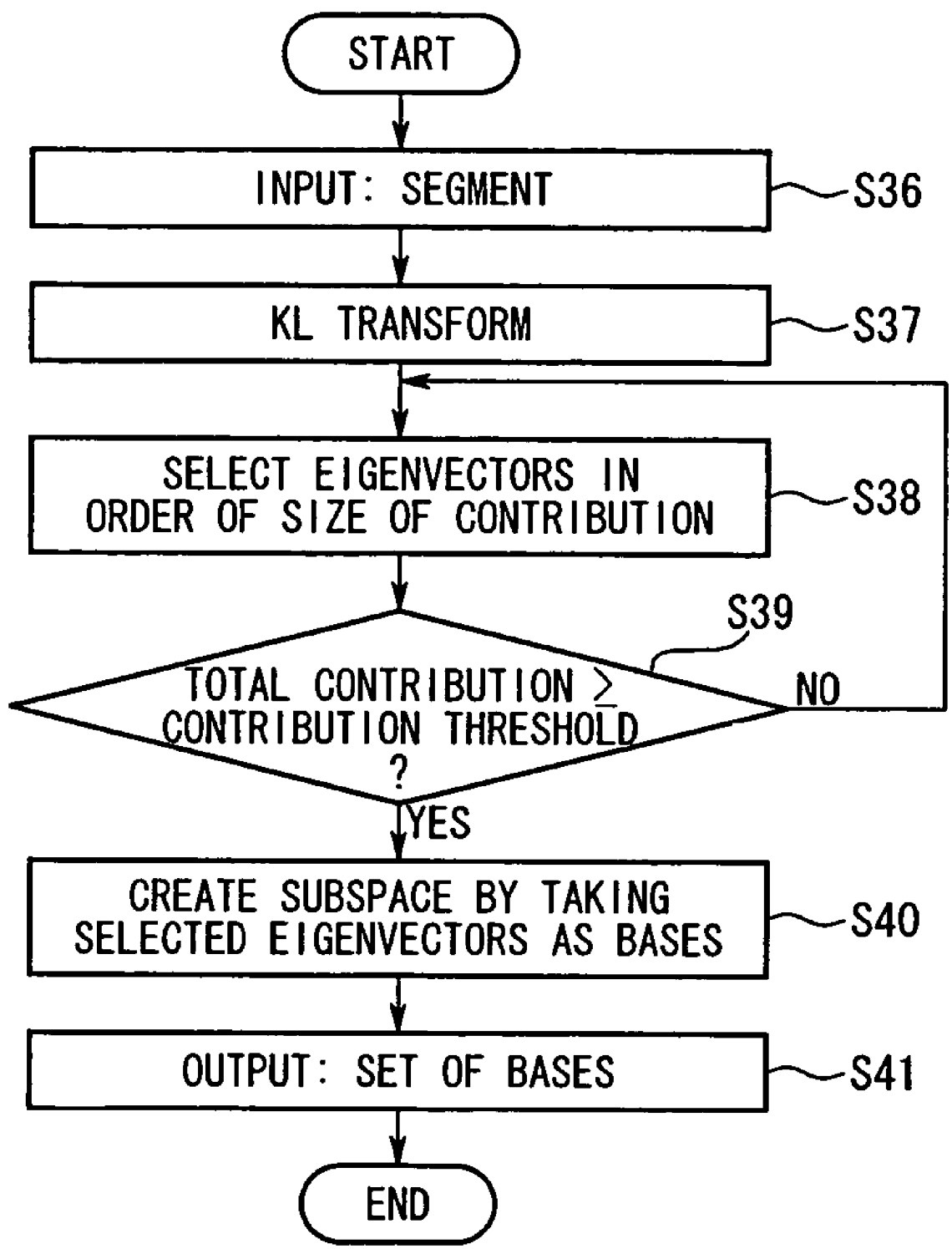
FIG. 9 is a flow chart showing the flow of a base extraction procedure which is used in the average dimensionality calculation procedure shown in FIG. 8.

Next the method by which the average values of the dimensionality above described are calculated will be explained while referring to FIGS. 8 and 9. FIG. 8 is a flow chart showing the overall flow of the average dimensionality calculation procedure, while FIG. 9 is a flow chart showing the flow of a base extraction procedure which is used in this average dimensionality calculation procedure. In concrete terms, the average value of the dimensionality is calculated as described below.

Referring to FIG. 8, first, two segments which have a segmentation boundary in common are read in (in a step S31). Next, from the two segments which have been presented, the base of a subspace which well represents the property of the original signal is extracted (in a step S32).

Note that, as will be described in the subsequent explanation of the extraction method for the base performed in the step S32 using FIG. 9, first, for each segment which has been presented (in a step S36), a KL (Karhunen-Loeve) transform is performed (in a step S37). In concrete terms, this KL transform is performed according to the steps described below. First, the average histogram of the histograms within the segment and the covariance matrix are calculated. For the j-th segment $X^{(j)} = [x_1^{(j)}, x_2^{(j)}, \ldots, x_{Lj}^{(j)}]$ ($j=1, 2, \ldots, M$) the covariance matrix $S^{(j)}$ is calculated in the following manner:

$$S^{(j)} = \sum_{i=1}^{L_j} \left( x_i^{(j)} - \overline{x}^{(j)} \right)\left( x_i^{(j)} - \overline{x}^{(j)} \right)^T$$

where M is the number of segments, Lj is the length of the j-th segment, $\overline{x}^{(j)}$ is the average histogram of $X^{(j)}$, and $(\bullet)^T$ is the transposed matrix.

Next, the eigenvalues and the eigenvectors of the covariance matrix $S^{(j)}$ (for j=1, 2, ... M) are obtained. The above are the steps for the KL transform.

Note that the value which is obtained by dividing the eigenvalue which corresponds to each eigenvector which has been obtained by the KL transform by the total value of the eigenvalues of all the eigenvectors is termed the contribution for that eigenvector. Next, the eigenvectors are rearranged in order of size of contribution, and the eigenvectors are selected in order until the total value of the contribution is greater than a contribution threshold which is given in advance (in steps S38 and S39), and, by taking the eigenvectors which have been selected as the bases of a subspace (in a step S40), a base set is obtained (in a step S41).

In a step S33 of FIG. 8, since the number $N_j$ of the bases (where j=1, 2, ... M) which has been extracted from each segment by doing the above is the dimensionality of the compressed signal, thus, as in the following, the average values $N_j'$(where j=1, 2, ... M-1) are calculated by normalizing them by the respective segment lengths (in the step S33).

$$N_j' = \frac{L_j}{L_j + L_{j+1}} N_j + \frac{L_{j+1}}{L_j + L_{j+1}} N_{j+1}$$

The frame average of the number of bases is outputted as the average value $N_j'$ of the dimensionality (in a step S34).

Figure 10:
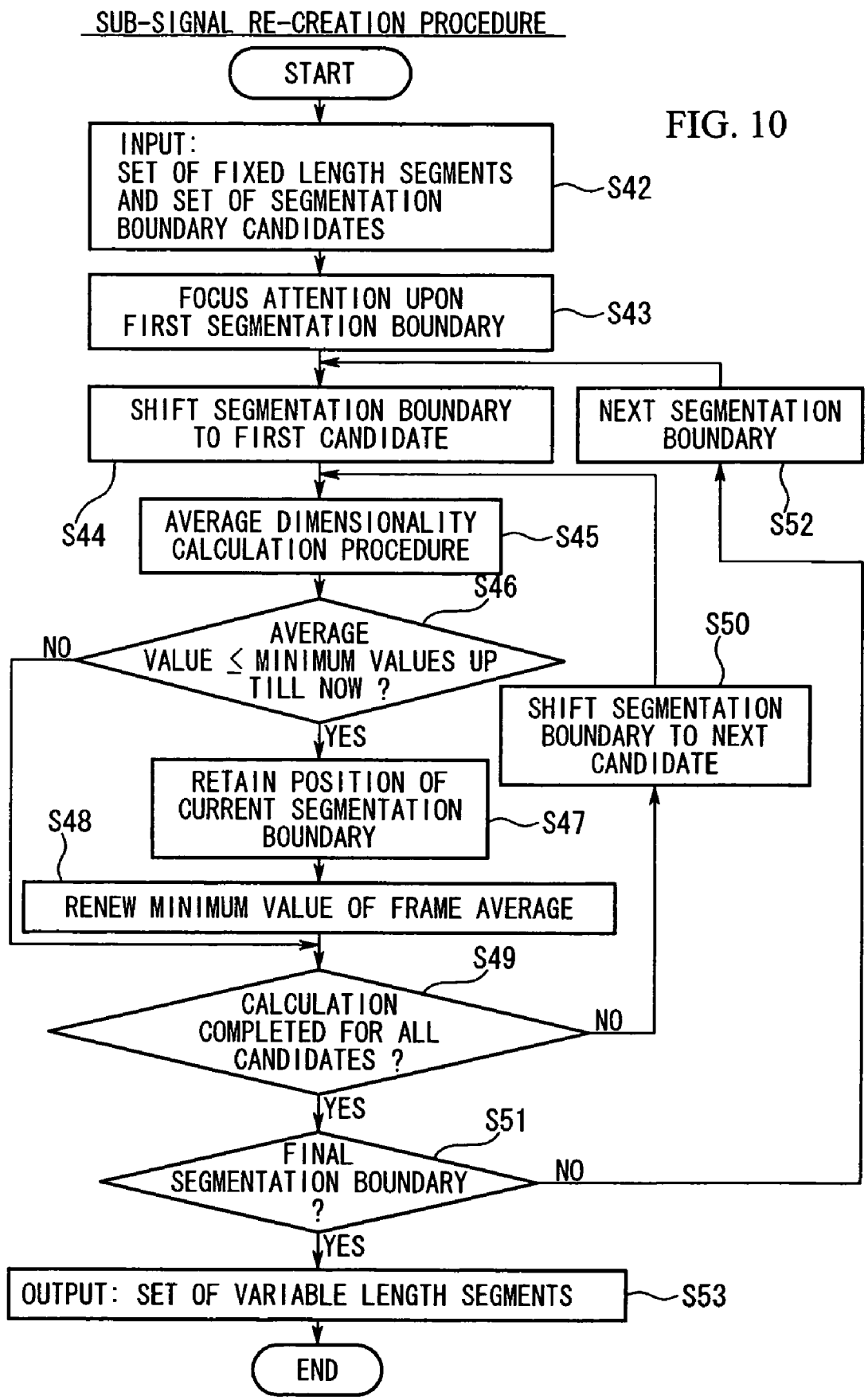
FIG. 10 is a flow chart showing the operation of a sub-signal re-creation section 3 shown in FIG. 1.

Next, the details of the sub-signal re-creation procedure (the step S4) shown in FIG. 5 will be explained with reference to FIG. 10. FIG. 10 is a flow chart showing the operation of the sub-signal re-creation section 3.

Referring to FIG. 10, first, the sub-signal re-creation section 3 reads in a set of fixed length segments which is outputted from the initial sub-signal creation section 1 and a set of candidates for segmentation boundary which is outputted from the created sub-signal selection section 2 (in a step S42). Next, among the segmentation boundaries of the segments, attention is focused upon the top segmentation boundary (in a step S43), and the segmentation boundary is shifted to the top position among the segmentation boundary candidates for this top segmentation boundary (in a step S44). Next, for two segments which have a segmentation boundary in common, the dimensionality of the compressed signal when the segmentation boundary is at the current position is calculated, and the average value with these being normalized by segment length is calculated (in a step S45). Note that, in the same manner as with the created sub-signal selection section 2, the average value of the dimensionality is calculated by the steps shown in FIGS. 8 and 9 and described above.

Next, if the average value of the dimensionality is the minimum value among those which have been calculated up till now for the segmentation boundary upon which attention is being focused (YES in a step S46), then this average value and the current position of the segmentation boundary are retained (in steps S47 and S48). If as yet the calculation has not been completed for all the candidates (NO in a step S49), then the segmentation boundary is shifted to the next candidate point (in a step S50) and the flow of control returns to the step S45, and the processes starting from the calculation of the average value of the dimensionality are repeated. When there are no further candidate points, the segmentation boundary upon which attention is being focused is shifted to the position of the segmentation boundary which corresponds to the minimum value of the average value of the dimensionality, and the segmentation boundary is definitely fixed upon.

If the calculation has not been completed for the final segmentation boundary (NO in a step S51), then the segmentation boundary upon which the attention is focused is changed to the next segmentation boundary (in a step S52), and the flow of control returns to the step S44, and the processes up to here are repeated. When the operations have been completed for all the segmentation boundaries (YES in the step S51), then the sub-signal re-creation section 3 outputs (in a step S53) the set of variable length segments which have been finally decided upon by shifting the segmentation boundary.

Figure 11:
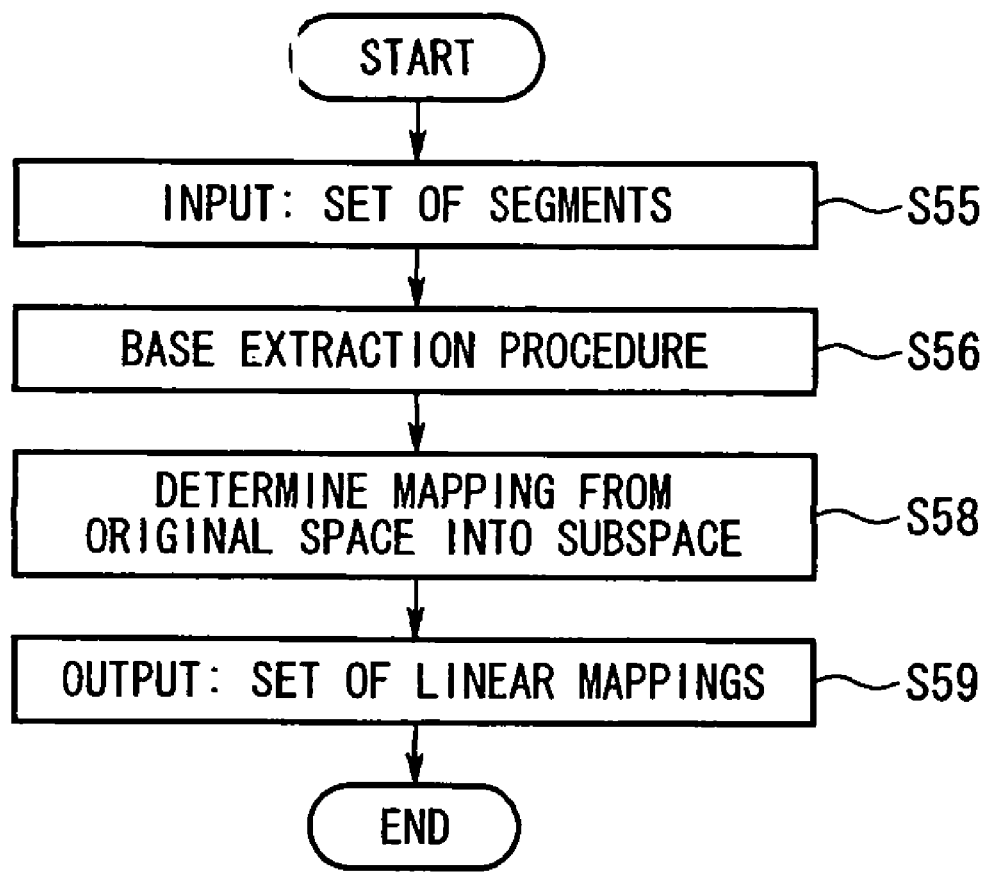
FIG. 11 is a flow chart showing the operation of a compression mapping determination section shown in FIG. 1.

Next, the details of the compression mapping determination procedure (the step S5) shown in FIG. 5 will be explained with reference to FIG. 11. FIG. 11 is a flow chart showing the operation of the compression mapping determination section 4.

Referring to FIG. 11, first, the compression mapping determination section 4 reads in the set of segments which has been outputted from the sub-signal re-creation section 3 (in a step S55). Next, it extracts the base of each segment (in a step S56). Note that this extraction of the bases is performed, in the same manner as was performed by the created sub-signal selection section 2, according to the calculation steps which have been shown in FIG. 9 and described above.

Next, the projection into the subspace is determined as the mapping for this segment (in a step S58). The compression mapping determination section 4 outputs the mapping which corresponds to each segment (in a step S59).

Figure 12:
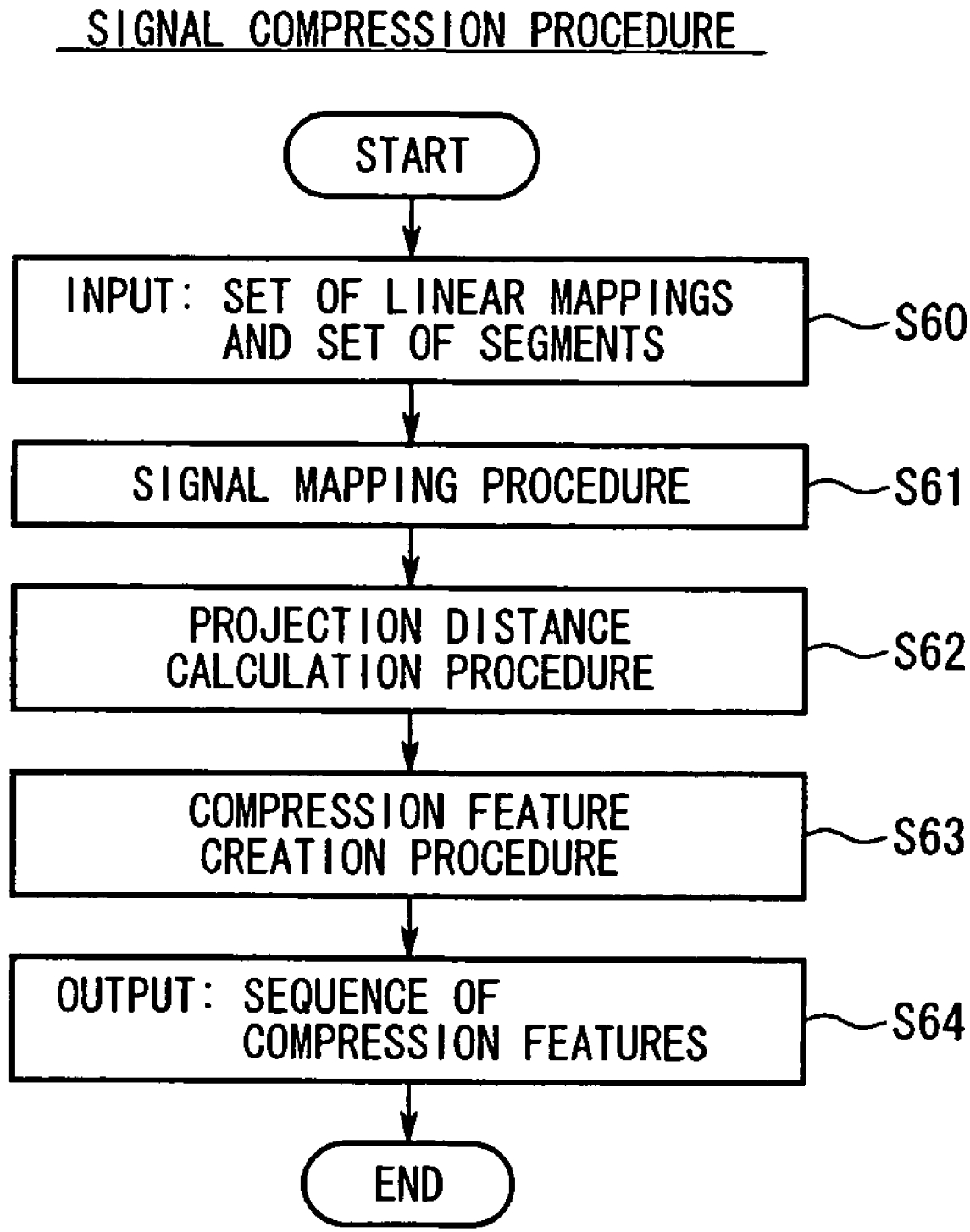
FIG. 12 is a flow chart showing the overall operation of a signal compression section 5 shown in FIG. 1.

Next, the details of the signal compression procedure (the step S6) shown in FIG. 5 will be explained with reference to FIGS. 12 through 15. FIG. 12 is a flow chart showing the overall operation of the signal compression section 5.

Referring to FIG. 12, first, the signal compression section 5 reads in the set of segments which has been outputted from the sub-signal re-creation section 3 and the set of linear mappings which has been outputted from the compression mapping determination section 4 (in a step S60). Next, using the set of sub-signals and the set of linear mappings which have been provided, a signal mapping procedure is performed (in a step S61) for projecting each of the histograms within the sub-signal into a subspace which has been created from that sub-signal.

Furthermore, using the sets of sub-signals and of linear mappings which have been provided, and the set of compression histogram sequences which has been obtained by the signal mapping procedure, a projection distance calculation procedure is performed for calculating the distance between each histogram and the compression histogram which corresponds to it (in a step S62). Furthermore, using the set of the sequence of compression histograms which has been obtained by the signal mapping procedure and the projection distance which has been obtained by the projection distance calculation procedure, a compression feature creation procedure is performed for calculating a sequence of compression features (in a step S63). The signal compression section 5 outputs the sequence of compression features which has been obtained by this compression feature creation procedure (in a step S64).

Figure 13:
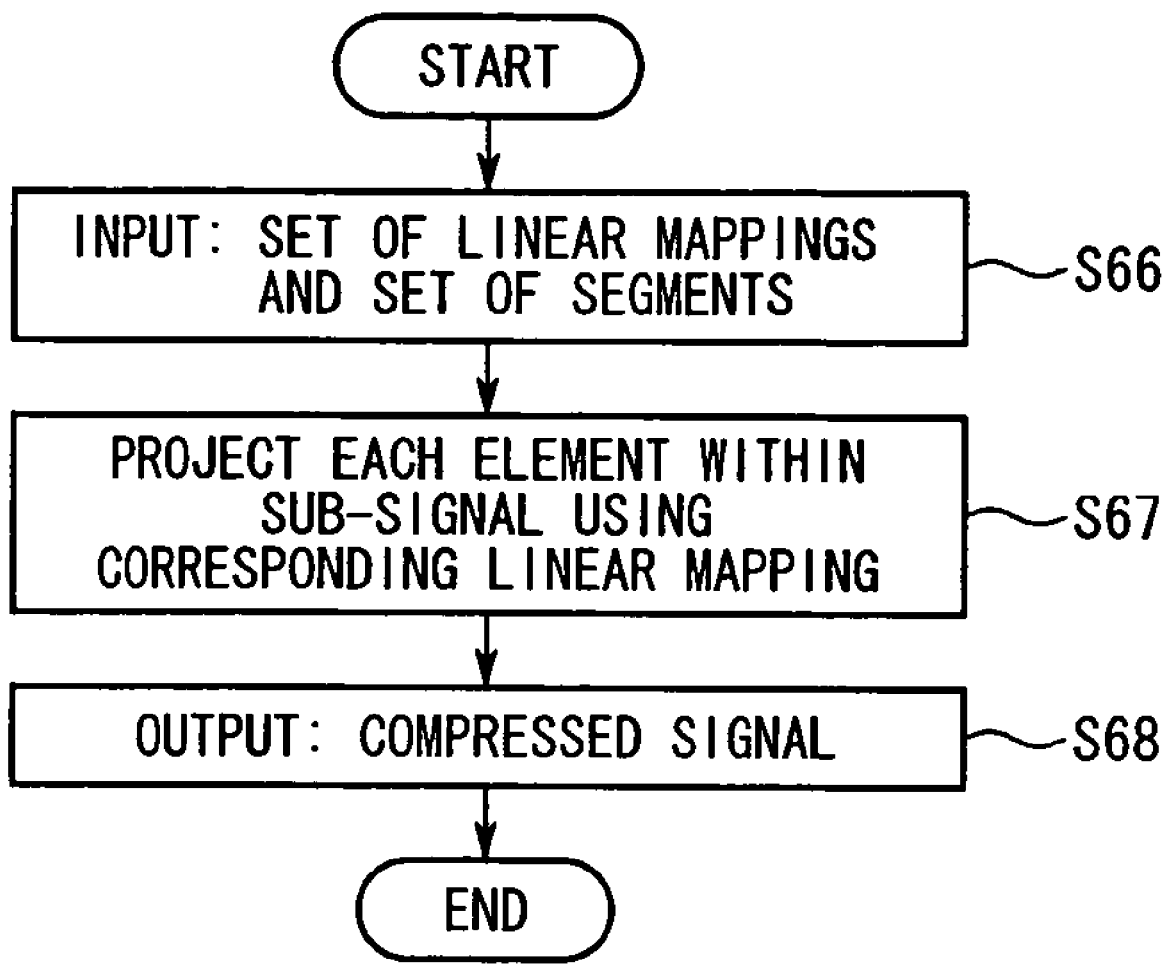
FIG. 13 is a flow chart showing the steps of a signal mapping procedure shown in FIG. 12.

FIG. 13 is a flow chart showing the steps which are involved in the signal mapping procedure shown in FIG. 12 (a step S61).

Referring to FIG. 13, the signal mapping section 51 which is incorporated in the signal compression section 5 first reads in the segment which is outputted from the sub-signal re-creation section 3 and the set of linear mappings which is outputted from the compression mapping determination section 4 (in a step S66). Next, it projects each histogram within the segment into the subspace which is created from this segment (in a step S67).

In concrete terms, if the set of bases of the subspace which has been obtained from the segment $X^{(j)}$ is taken as $A^{(j)}=[a_1^{(j)}, a_2^{(j)}, \ldots, a_{Nj}^{(j)}]^T$ (j=1,2, ..., M), then the compression histogram sequence $Y^{(j)}=[Y_1^{(j)}, Y_2^{(j)}, \ldots, Y_{Lj}^{(j)}]$ (j=1,2, ..., M) is calculated in the following manner.

$$Y^{(j)}=A^{(j)}(X^{(j)}-\overline{X}^{(j)})$$

Here, $N_j$ is the number of bases of the subspace which has been obtained from $X^{(j)}$, while $\overline{X}^{(j)}$ is a matrix which is obtained by arranging Lj column vectors $\overline{x}^{(j)}$, in other words $\overline{X}^{(j)}=[\overline{x}^{(j)}, \overline{x}^{(j)}, \ldots, \overline{x}^{(j)}]$ (j=1, 2, ..., M).

By doing this, the signal mapping section 51 outputs the set of compression histogram sequence $Y^{(1)}, Y^{(2)}, \ldots Y^{(M)}$ (in a step S68).

Figure 14:
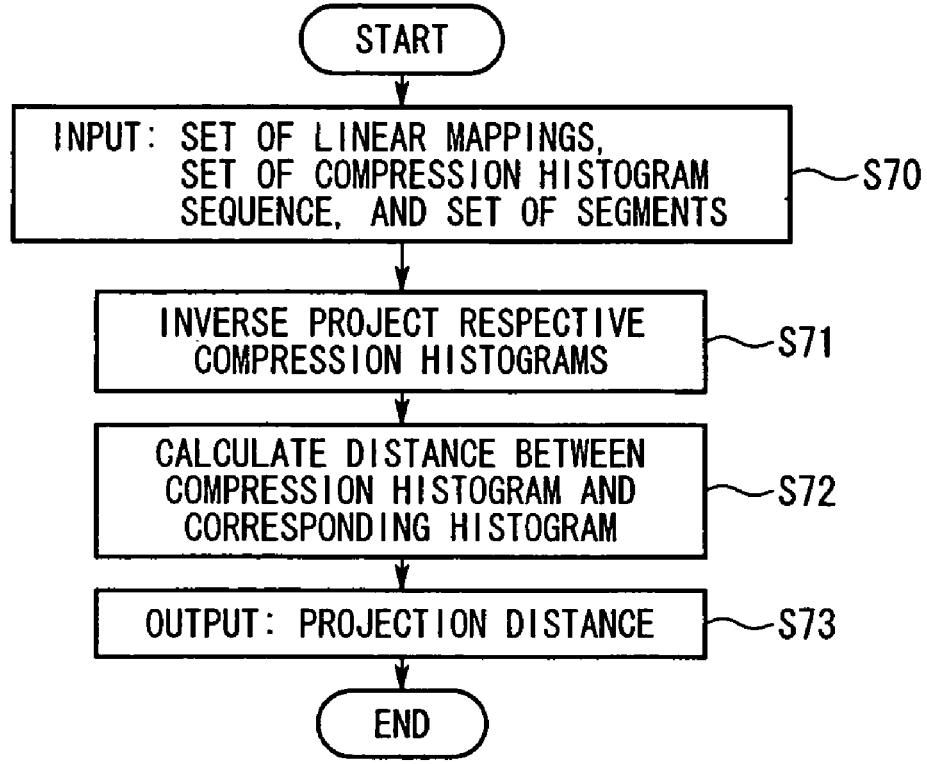
FIG. 14 is a flow chart showing the steps of a projection distance calculation procedure shown in FIG. 12.

FIG. 14 is a flow chart showing the steps which are involved in the projection distance calculation procedure shown in FIG. 12 (in a step S62).

Referring to FIG. 14, the projection distance calculation section 52 which is incorporated in the signal compression section 5 first reads in the segment which is outputted from the sub-signal re-creation section 3, the set of linear mappings which is outputted from the compression mapping determination section 4, and the set of compression histogram sequence which is outputted from the signal mapping section 51 (in a step S70). Next, since the position of the compression histogram in the space in which the original histogram exists is obtained as described below, by inversely projecting the compression histogram (in a step S71), it calculates the distance between each histogram and the compression histogram which corresponds to it (in a step S72).

In concrete terms, $$\tilde{X}^{(j)}=A^{(j)T}Y^{(j)}+\overline{X}^{(j)} \text{ where } \tilde{X}^{(j)}=[\tilde{x}_1^{(j)}, \tilde{x}_2^{(j)}, \ldots \tilde{x}_{Lj}^{(j)}]$$
$$(j=1, 2, \ldots, M)$$

while each $\tilde{x}_i^{(j)}$ (i=1,2, ..., $L_j$) gives the position in the original histogram space of the compression histogram $y_i^{(j)}$.

Furthermore, the distance between $x_i^{(j)}$ and $\tilde{x}_i^{(j)}$ is defined as the distance between the histogram and the compression histogram, and this is termed the projection distance of the histogram $x_i^{(j)}$. In other words, the projection distance of x is defined utilizing the Euclid distance as shown below.

$$d(x, \tilde{x}) \stackrel{def}{=} \sqrt{\sum_{i=1}^{n} (x_i - \tilde{x}_i)^2} \quad (1)$$

where n is the dimensionality of the histogram, $x=(x_1, x_2, \ldots, x_n)$, $\tilde{x}=(\tilde{x}_1, \tilde{x}_2, \ldots \tilde{x}_n)$ By doing this, the projection distance calculation section 52 outputs the projection distance which corresponds to each histogram (in a step S73).

Figure 15:
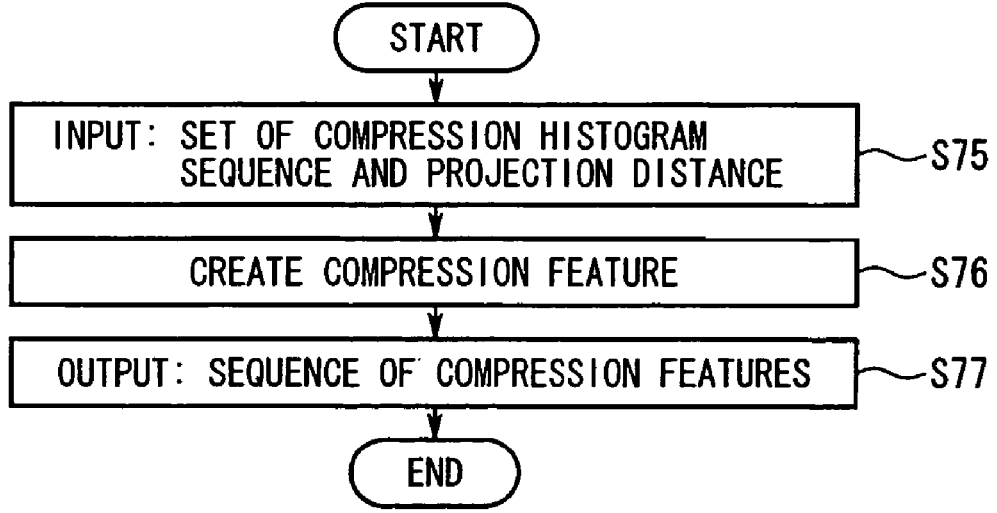
FIG. 15 is a flow chart showing the steps of a compression feature creation procedure shown in FIG. 12.

FIG. 15 is a flow chart showing the steps involved in the compression feature creation procedure (the step S63) shown in FIG. 12.

Referring to FIG. 15, the compression feature creation section 53 which is incorporated in the signal compression section 5 first reads in the set of compression histogram sequence which has been outputted from the signal mapping section 51 and the projection distance which has been outputted from the projection distance calculation section 52 (in a step S75). Next, from the compression histogram $y=(y_1, y_2, \ldots y_k)$ and the projection distance $d(x,\tilde{x})$ which has been calculated in correspondence thereto, it creates a compression feature y* in the following manner (in a step S76):

$$y^* = (y_1, y_2, \ldots, y_N, d(x,\tilde{x}))$$

where N is the dimensionality of the compression histogram y.

By doing this, the compression feature creation section 53 outputs a sequence of compression features (in a step S77).

The Second Preferred Embodiment

Figure 2:
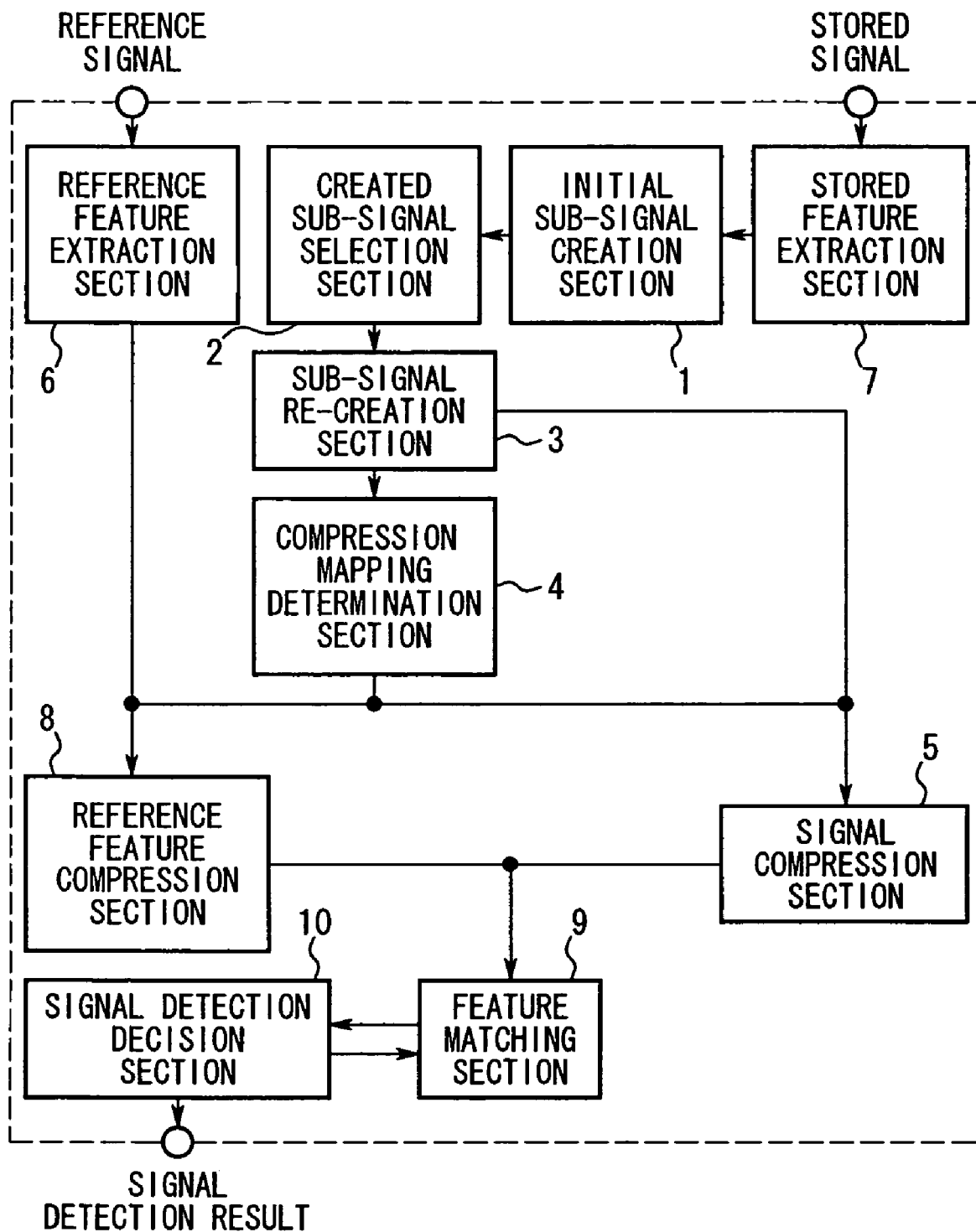
FIG. 2 is a block diagram showing the structure of a second preferred embodiment of the present invention.

FIG. 2 is a block diagram showing the structure of the second preferred embodiment of the present invention. For this second preferred embodiment, an application to a signal retrieval device to which the signal compression device which was explained in the first preferred embodiment will be explained. In FIG. 2, structural elements to which the same reference symbols as those in the signal compression device of the first preferred embodiment which have been explained with reference to FIG. 1, function in the same manner as in the first preferred embodiment, and thus the explanation thereof will be curtailed.

Referring to FIG. 2, the reference symbol 6 denotes a reference feature extraction section which calculates a sequence of features from a reference signal, which is the signal to be retrieved. The reference symbol 7 denotes a stored feature extraction section which sets a window upon which attention is focused in a stored signal, which is an original signal which has been registered in advance, and which calculates a feature sequence from the signal within this window upon which attention is focused. The reference symbol 8 is a reference feature compression section which, based upon a mapping which has been outputted from the compression mapping determination section 4, compresses a reference feature sequence which has been outputted from the reference feature extraction section 6. The reference symbol 9 is a feature matching section which calculates the distance between the reference compressed signal which has been outputted from the reference feature compression section 8 and a stored compressed signal which has been outputted from the signal compression section 5 by newly using the feature sequence which has been outputted from the stored feature extraction section 7. The reference symbol 10 denotes a signal detection decision section which decides whether or not the reference signal is present in the location of the stored signal, by comparing the distance which has been outputted from the feature matching section 9 with a search threshold, which is a value corresponding to the distance.

The signal retrieval device shown in FIG. 2 takes as its input a reference signal, in other words a video signal which it is desired to retrieve for serving as a pattern or sample, and a stored signal, in other words a video signal which is retrieved, and outputs the location within the stored signal for which the distance from the reference signal is less than a value $\theta_1$ which been set in advance (this is termed the search threshold).

Next, the operation of the signal retrieval device shown in FIG. 2 will be explained with reference to FIGS. 16 through 24. First, the overall operational flow of the signal retrieval device according to this second preferred embodiment of the present invention will be explained with reference to the flow chart shown in FIG. 16, which shows the overall processing operation of this signal retrieval device. The detailed operation of each procedure will be explained hereinafter.

Figure 16:
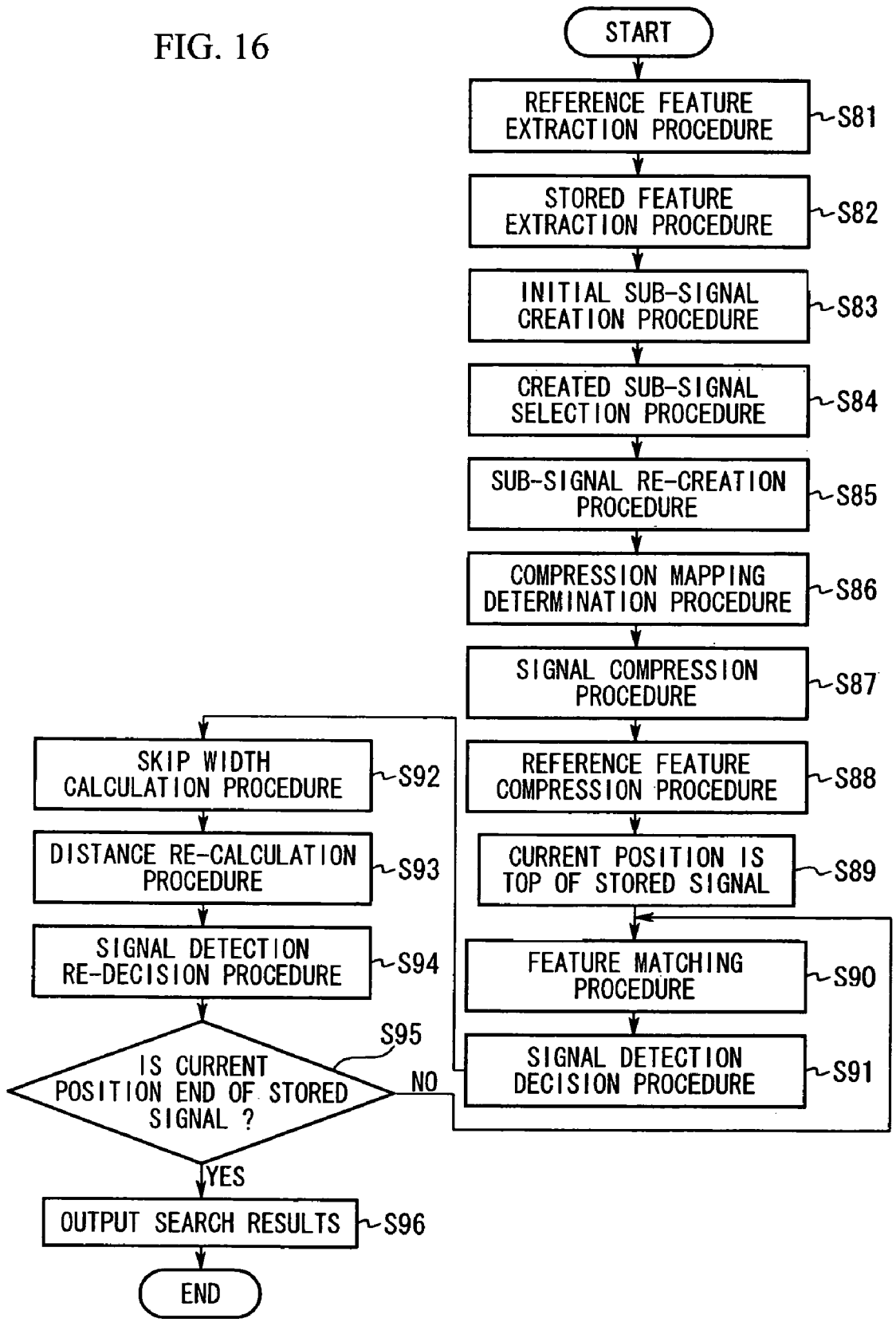
FIG. 16 is a flow chart showing the processing operation of signal retrieval devices according to the second, the third, and the fourth preferred embodiments of the present invention.

Referring to FIG. 16, first, the reference feature extraction section 6 performs a reference feature extraction procedure (in a step S81). Next, the stored feature extraction section 7 performs a stored feature extraction procedure (in a step S82). Next, the initial sub-signal creation section 1 performs an initial sub-signal creation procedure (in a step S83). Next, the created sub-signal selection section 2 performs a created sub-signal selection procedure (in a step S84). Next, the sub-signal re-creation section 3 performs a sub-signal re-creation procedure (in a step S85). Next, the compression mapping determination section 4 performs a compression mapping determination procedure (in a step S86). Next, the signal compression section 5 performs a signal compression procedure (in a step S87). Finally, the reference feature compression section 8 performs a reference feature compression procedure (in a step S88).

Then, a window upon which attention is focused which is to be set for the stored compressed feature sequence which is outputted from the signal compression section 5 is set to the top of the stored signal (in a step S89). Next, the feature matching section 9 performs a feature matching procedure (in a step S90). Furthermore, a signal detection decision section 10 performs a signal detection decision procedure (in a step S91). When performing this signal detection decision procedure, a decision is made (in a step S95) as to whether or not the current position of the window upon which attention is focused is at the end the stored signal; and, if the current position of the window upon which attention is focused is not at the end of the stored signal (NO in the step S95), then the window upon which attention is focused is shifted and the flow of control returns to the step S90 and the above described procedure is repeated. On the other hand, if the current position of the window upon which attention is focused is in fact at the end of the stored signal (YES in the step S95), then the search result for the signal is outputted (in a step S96).

Note that the skip width calculation procedure of the step S92 which is shown in FIG. 16 is not necessary in this second preferred embodiment, but will be explained in the third preferred embodiment, as described hereinafter. In the same manner, the distance re-calculation procedure of the step S93 and the signal detection re-decision procedure of the step S94, which are shown in FIG. 16, are not necessary in this second preferred embodiment, but will be explained in the fourth preferred embodiment, as described hereinafter.

Furthermore, since the above described initial sub-signal creation procedure (the step S83), the created sub-signal selection procedure (the step S84), the sub-signal re-creation procedure (the step S85), the compression mapping determination procedure (the step S86), and the signal compression procedure (the step S87), are the same as the procedures which were executed by the signal compression device of the first preferred embodiment of the present invention shown in FIG. 6 through FIG. 15, accordingly the description thereof will be curtailed. However, the initial sub-signal creation procedure (the step S83) takes, as its input, the stored feature sequence which is outputted from the stored feature extraction procedure (the step S82).

Figure 17:
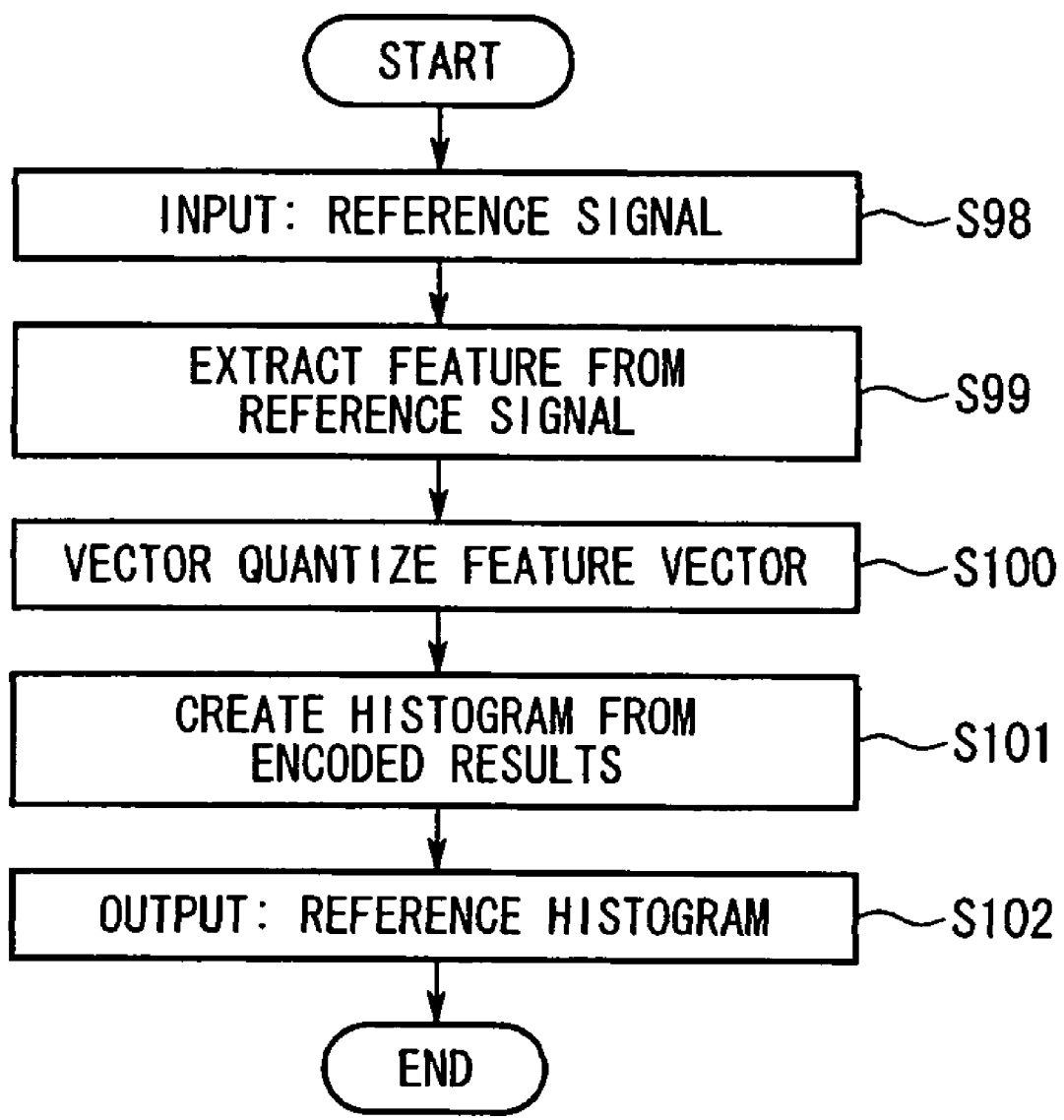
FIG. 17 is a flow chart showing the operation of a reference feature extraction section 6 shown in FIG. 2.

Next, the details of the reference feature extraction procedure (the step S81) shown in FIG. 16 will be explained with reference to FIG. 17. FIG. 17 is a flow chart showing the operation of the reference feature extraction section 6.

Referring to FIG. 17, first, the reference feature extraction section 6 reads in the reference signal which is provided (in a step S98). Next, the reference feature extraction section 6 performs feature extraction upon the reference signal which has been read in (in a step S99).

Here, spectral features are utilized as the features which are to be extracted if the signal in question is an audio signal. For an audio signal, extraction of spectral features can be performed by band-pass filters. For example, if it is desired to retrieve an audio signal of about 15 seconds in length from a broadcast audio signal such as a television signal or a radio signal or the like, a good result may be obtained by ensuring that the concrete settings for feature extraction are as follows. Namely, if seven band-pass filters are utilized, and their central frequencies are set at equal intervals upon a logarithmic scale, and the average value of the square of the output of each band pass filter within the analysis window is calculated while shifting the analysis window of about 60 milliseconds in length by 10 milliseconds at a time, then the seven values which are obtained, when considered as a set, constitute a seven dimensional feature vector. In this case, a feature vector is obtained every 10 milliseconds.

On the other hand, in the case of a video signal, color features are employed as the features. For example, if it is desired to retrieve a video signal of about 15 seconds in length from a broadcast signal such as a television signal or the like, a good result can be obtained by ensuring that the concrete settings for feature extraction are as follows. Namely, each of the images which constitute videos is segmented into two vertically and into three horizontally, and the RGB values are calculated for each segment, so that, when the three RGB values which have been obtained for each segment are grouped into a total of 18 values, they constitute an 18 dimensional feature vector. If the videos are built up from 30 frame images per second, then a single feature vector is obtained every 1/30th of a second.

Next, by encoding the feature vectors using vector quantization (in a step S100), a histogram of the feature vectors is created from the time series of feature vectors (in a step S101). For example, if the number of codewords in the vector quantization is 512, the number of bins (partitions) in the entire histogram becomes 512, and each feature vector comes to be classified into one or the other of these 512 bins. Note that, in the following explanation, the histogram which is created from the reference signal will be termed the reference histogram. The reference feature extraction section 6 outputs the reference histogram which has been obtained (in a step S102).

Figure 18:
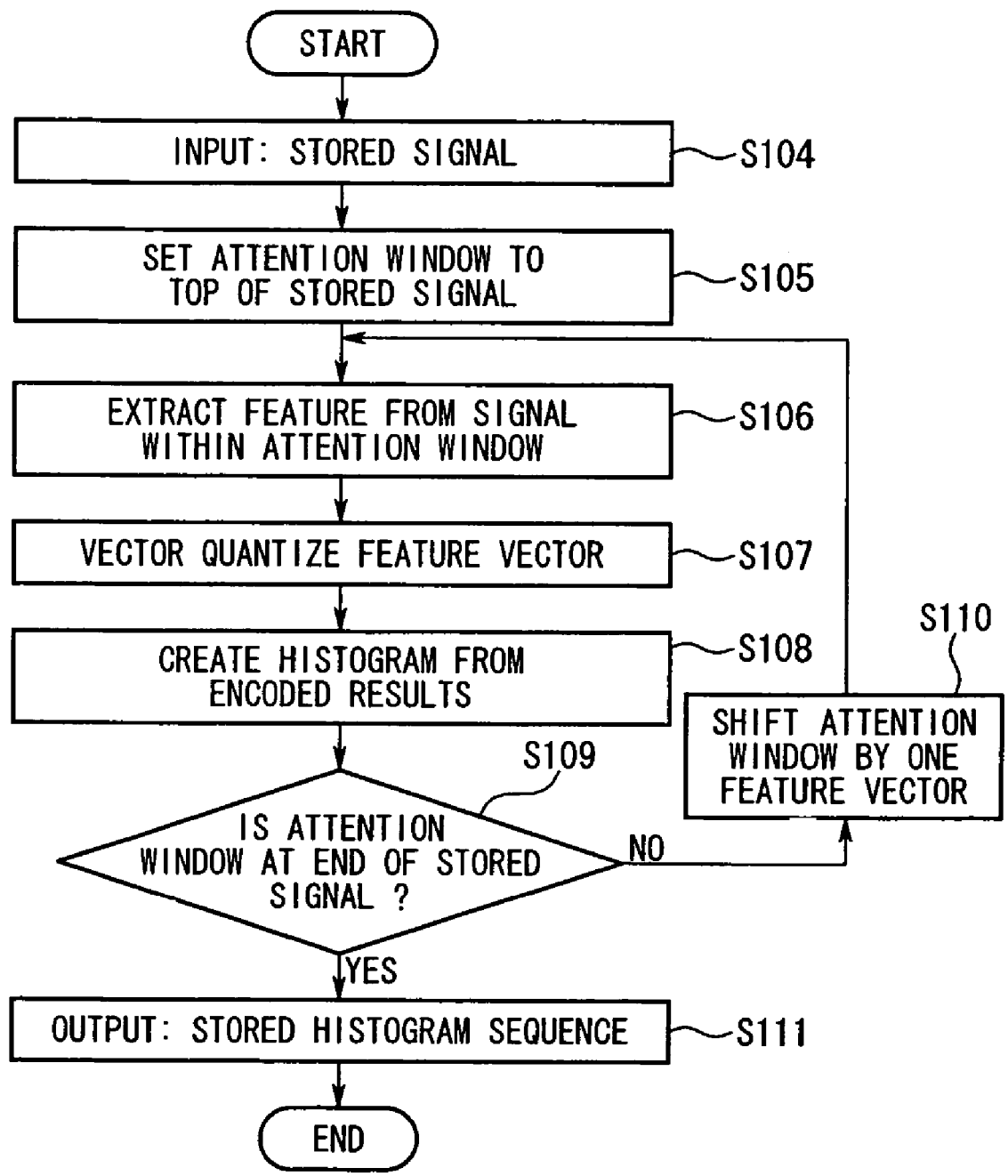
FIG. 18 is a flow chart showing the operation of a stored feature extraction section 7 shown in FIG. 2.

Next, the details of the stored feature extraction procedure (the step S82) shown in FIG. 16 will be explained with reference to FIG. 18. FIG. 18 is a flow chart showing the operation of the stored feature extraction section 7.

Referring to FIG. 18, first, the stored feature extraction section 7 reads in the stored signal (in a step S104). Next, for the stored signal which has been read in, the stored feature extraction section 7 sets (in a step S105) the window upon which attention is focused to the top of the stored signal. Here, the window upon which attention is focused is set to be of the same length as that of the reference signal which has been provided to the reference feature extraction section 6.

Next, feature extraction is performed upon the stored signal within the window upon which attention is focused (in a step S106). Note that this feature extraction is performed by the same procedure as that which was performed by the reference feature extraction section 6. Furthermore, a histogram of the feature vector is created from the time series of the feature vector within the window upon which attention is focused (in steps S107 and S108). The way in which the histogram is created is the same as the method which was performed by the reference feature extraction section 6. The stored feature extraction section 7 repeatedly executes (in steps S109 and S110) the procedures from the step S106 to the step S108, while shifting the window upon which attention is focused (which was set to the top of the stored signal when starting the procedure) by one feature vector in order, until the end of the stored signal. Note that, in the following explanation, the histograms which have been created from the stored signal will be termed the stored histograms. Finally, the stored feature extraction section 7 outputs the stored histogram sequence which it has obtained (in a step S111).

Figure 19:
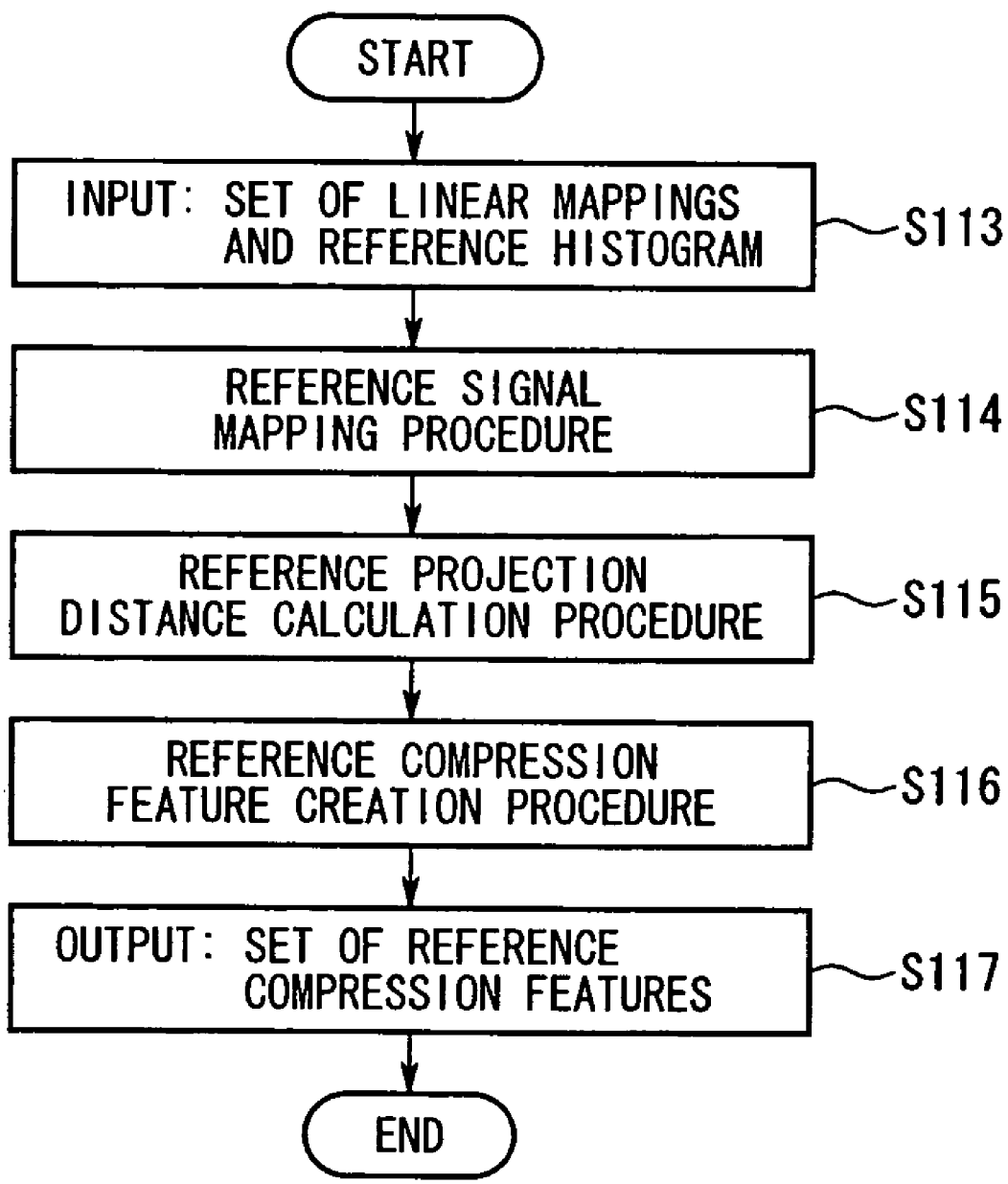
FIG. 19 is a flow chart showing the operation of a reference feature compression section 8 shown in FIG. 2.

Next, the details of the reference feature compression procedure (the step S88) shown in FIG. 16 will be explained with reference to FIGS. 19 through 22. FIG. 19 is a flow chart showing the operation of the reference feature compression section 8.

Referring to FIG. 19, first, the reference feature compression section 8 reads in (in a step S113) the reference histogram which is outputted from the reference feature extraction section 6 and the set of linear mappings which is outputted from the compression mapping determination section 4. Next, using each of the linear mappings, the reference feature compression section 8 performs a reference signal mapping procedure of projecting the reference histogram into the subspaces which corresponds thereto (in a step S114). This projection is performed by the same procedure as was performed by the signal compression section 5 and has been explained with reference to the first preferred embodiment of the present invention. For example, if the number of segments M is 1000, then 1000 compression histograms are created.

Next, a reference projection distance calculation procedure is performed (in a step S115) of calculating the distance between the histogram and each compression histogram, in other words the projection distances of the histogram. This calculation is performed by the same procedure as was performed by the signal compression section 5. Finally, a reference compression feature creation procedure is performed (in a step S116) of creating compression features from the compression histograms and the projection distances which correspond thereto. This creation of compression features is performed by the same procedure as was performed by the signal compression section 5. The reference feature compression section 8 outputs (in a step S117) the set of reference compression features.

Figure 20:
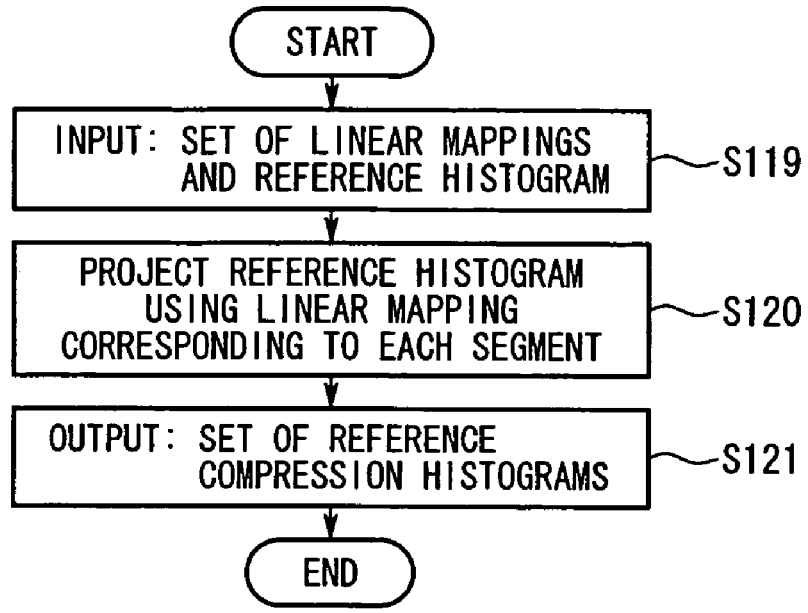
FIG. 20 is a flow chart showing the steps of a reference signal mapping procedure shown in FIG. 19.

FIG. 20 is a flow chart showing the steps involved in the reference signal mapping procedure shown in FIG. 19 (the step S114).

Referring to FIG. 20, a reference signal mapping section (not particularly shown in the figures) which is incorporated in the reference feature compression section 8 first (in a step S119) reads in the reference histogram which is outputted from the reference feature extraction section 6 and the set of linear mappings which is outputted from the compression mapping determination section 4. Next, the reference signal mapping section projects the reference histogram into a subspace according to the linear mapping which corresponds to each segment (in a step S120).

By doing this, the reference signal mapping section outputs a set of reference compression histograms (in the step S121).

Figure 21:
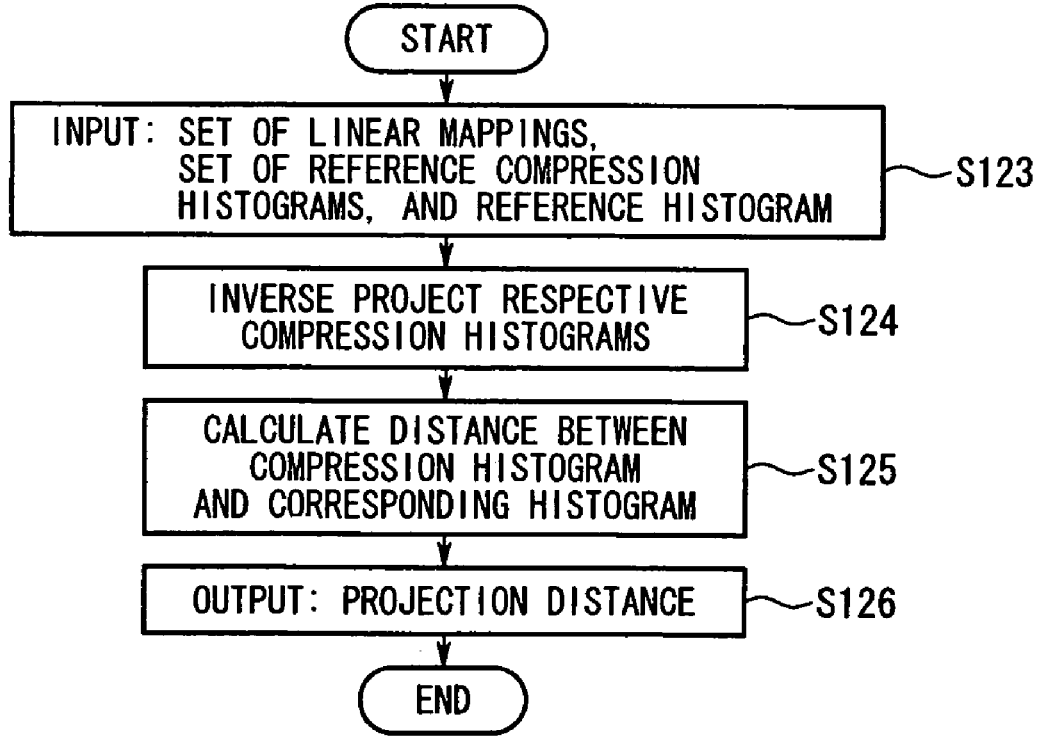
FIG. 21 is a flow chart showing the steps of a reference projection distance calculation procedure shown in FIG. 19.

FIG. 21 is a flow chart showing the steps involved in the reference projection distance calculation procedure shown in FIG. 19 (the step S115).

Referring to FIG. 21, a reference projection distance calculation section (not particularly shown in the figures) which is incorporated in the reference feature compression section 8 first (in a step S123) reads in the reference histogram which is outputted from the reference feature extraction section 6, the set of linear mappings which is outputted from the compression mapping determination section 4, and the set of reference compression histograms which is outputted from the reference signal mapping section. Next, by inversely projecting each compression histogram (in a step S124), the reference projection distance calculation section calculates the distance between each histogram and the compression histogram which corresponds thereto (in a step S125).

By doing this, the reference projection distance calculation section outputs the projection distance which corresponds to each histogram (in the step S126).

Figure 22:
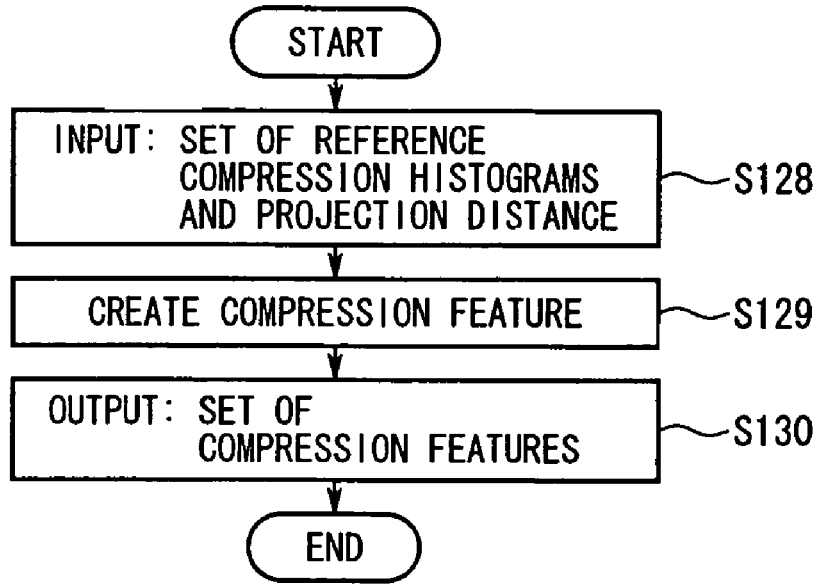
FIG. 22 is a flow chart showing the steps of a reference compression feature creation procedure shown in FIG. 19.

FIG. 22 is a flow chart showing the steps involved in the reference compression feature creation procedure shown in FIG. 19 (the step S116).

Referring to FIG. 22, a reference compression feature creation section (not particularly shown in the figures) which is incorporated in the reference feature compression section 8 first (in a step S128) reads in the set of reference compression histograms which has been outputted from the reference signal mapping section and the projection distance which has been outputted from the reference projection distance calculation section. Next, the reference compression feature creation section creates a compression feature from the compression histograms and the projection distance which has been calculated in correspondence therewith (in a step S129).

By doing this, the reference compression feature creation section outputs a set of compression features (in the step S130).

Figure 23:
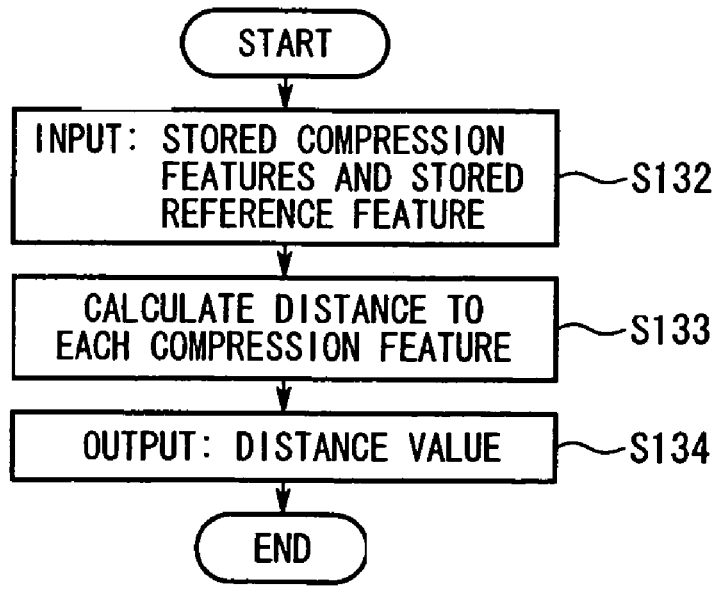
FIG. 23 is a flow chart showing the operation of a feature matching section 9 shown in FIG. 2.

Next, the details of the feature matching procedure (the step S90) shown in FIG. 16 will be explained with reference to FIG. 23. FIG. 23 is a flow chart showing the operation of the feature matching section 9.

Referring to FIG. 23, first, the feature matching section 9 reads in (in a step S132) the stored compressed feature sequence which is outputted from the signal compression section 5 and the set of reference compression features which is outputted from the reference feature compression section 8. Next, the feature matching section 9 calculates the distance between the reference compression feature $y^*_R$ and the stored compression feature $y^*_S$ (in a step S133).

In concrete terms, the distance $d(y^*_R, y^*_S)$ is defined as follows, using the Euclid distance.

$$d(y^*_R, y^*_S) \stackrel{def}{=} \sqrt{\sum_{i=1}^{K} (y^*_{Ri} - y^*_{Si})^2} \qquad (2)$$
$$= \sqrt{d(y_R, y_S)^2 + \{d(x_R, \tilde{x}_R) - d(x_S, \tilde{x}_S)\}^2}$$

where $x_R$ is the reference histogram, $x_S$ is the stored histogram, and $y_R$ and $y_S$ are the compression histograms which correspond to $x_R$ and $x_S$. $\tilde{x}_R$ and $\tilde{x}_S$ are the positions of $y_R$ and $y_S$ in the histogram space, while $y^*_{Ri}$ and $y^*_{Si}$ are the i-th dimension values of $y^*_R$ and $y^*_S$ respectively.

Here, due to the properties of the KL transform (the principal component analysis), the following Equation holds:

$$d(y_R, y_S) = d(\tilde{x}_R, \tilde{x}_S) \leq d(x_R, x_S) \qquad (3)$$

Furthermore, $d(y^*_R, y^*_S)$ has the following property:

$$d(\tilde{x}_R, \tilde{x}_S) \leq d(y_R, y_S) \leq d(y^*_R, y^*_S) = \min\{d(x_R, x_S)\} \leq d(x_R, x_S) \qquad (4)$$

The minimum values in Equation (4) are calculated for all the groups $(x_R, x_S)$ of the histogram when $y_R, y_S, d(x_R, \tilde{x}_R)$ and $d(x_S, \tilde{x}_S)$ are given.

Furthermore, as can be understood from Equation (4), due to the property expressed by Equation (3), the principal component analysis produces a unique result that the distance value between compression features becomes the lower limit value of the distances between the histograms. In addition, by further using the projection distance, it is possible to obtain a larger lower limit value $d(y^*_R, y^*_S)$ for the distance between the histograms, as compared to the case in which it is not used.

In this manner, the feature matching section 9 outputs the lower limit value of the distance which has been obtained (in a step S134).

Figure 24:
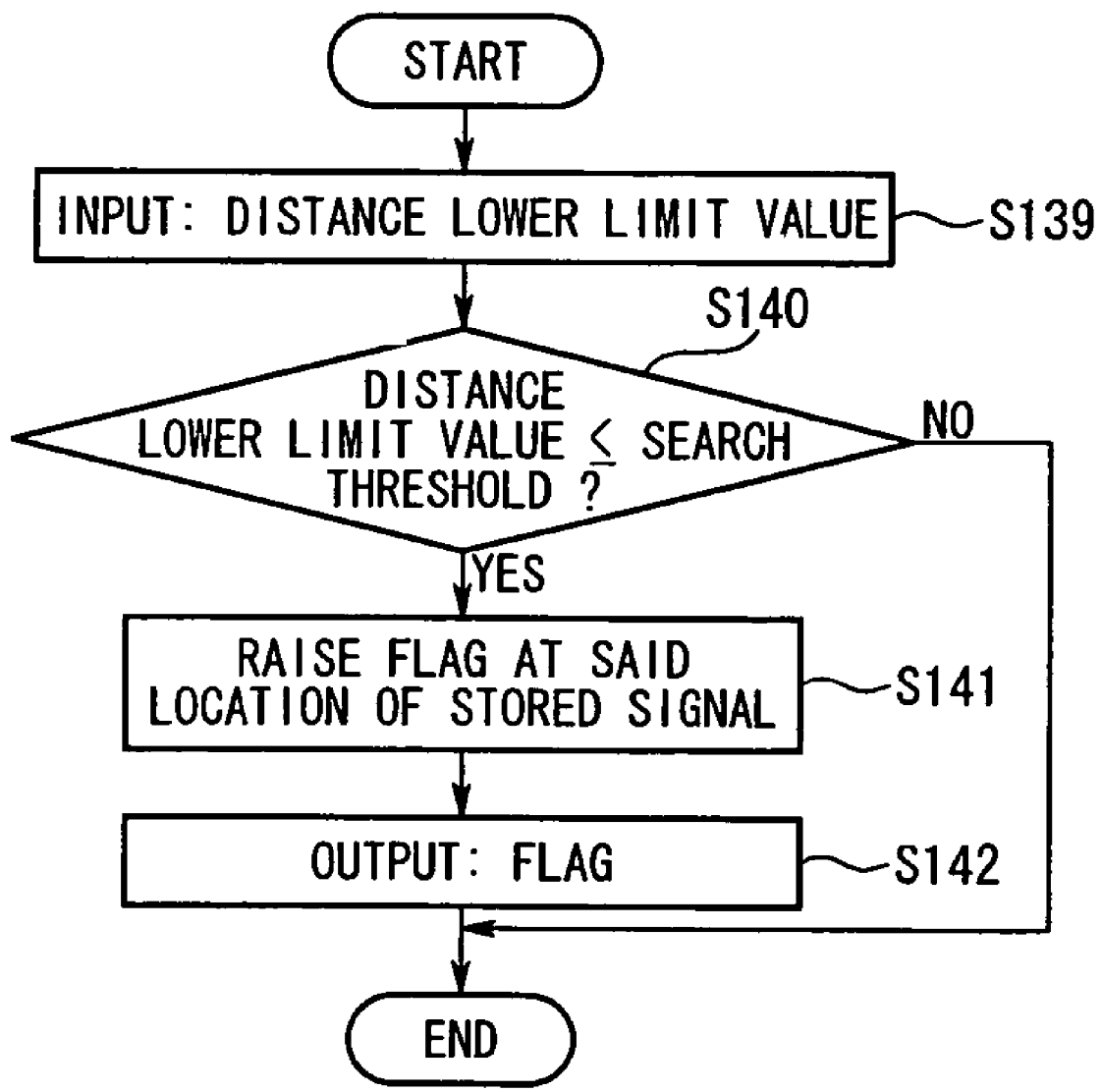
FIG. 24 is a flow chart showing the operation of a signal detection decision section 10 shown in FIG. 2.

Next, the details of the signal detection decision procedure (of the step S91) shown in FIG. 16 will be explained with reference to FIG. 24. FIG. 24 is a flow chart showing the operation of the signal detection decision section 10.

Referring to FIG. 24, first, the signal detection decision section 10 reads in the distance lower limit value which is outputted from the feature matching section 9 (in a step S139). Next, the signal detection decision section 10 compares together (in a step S140) the distance lower limit value and a search threshold which is a value which is determined in advance based upon the Euclid distance, which is the distance measure. If the distance value is less than the search threshold (i.e. if, when the window upon which attention is focused has been segmented in the time direction, it is detected that the distance value for all the time segments is less than the search threshold) (YES in the step S140), then it is decided (in a step S141) that the reference signal exists in the location of the stored signal, and the current position in time series with respect to the stored signal (a flag) is outputted (in a step S142) as the signal detection result.

The Third Preferred Embodiment

Figure 3:
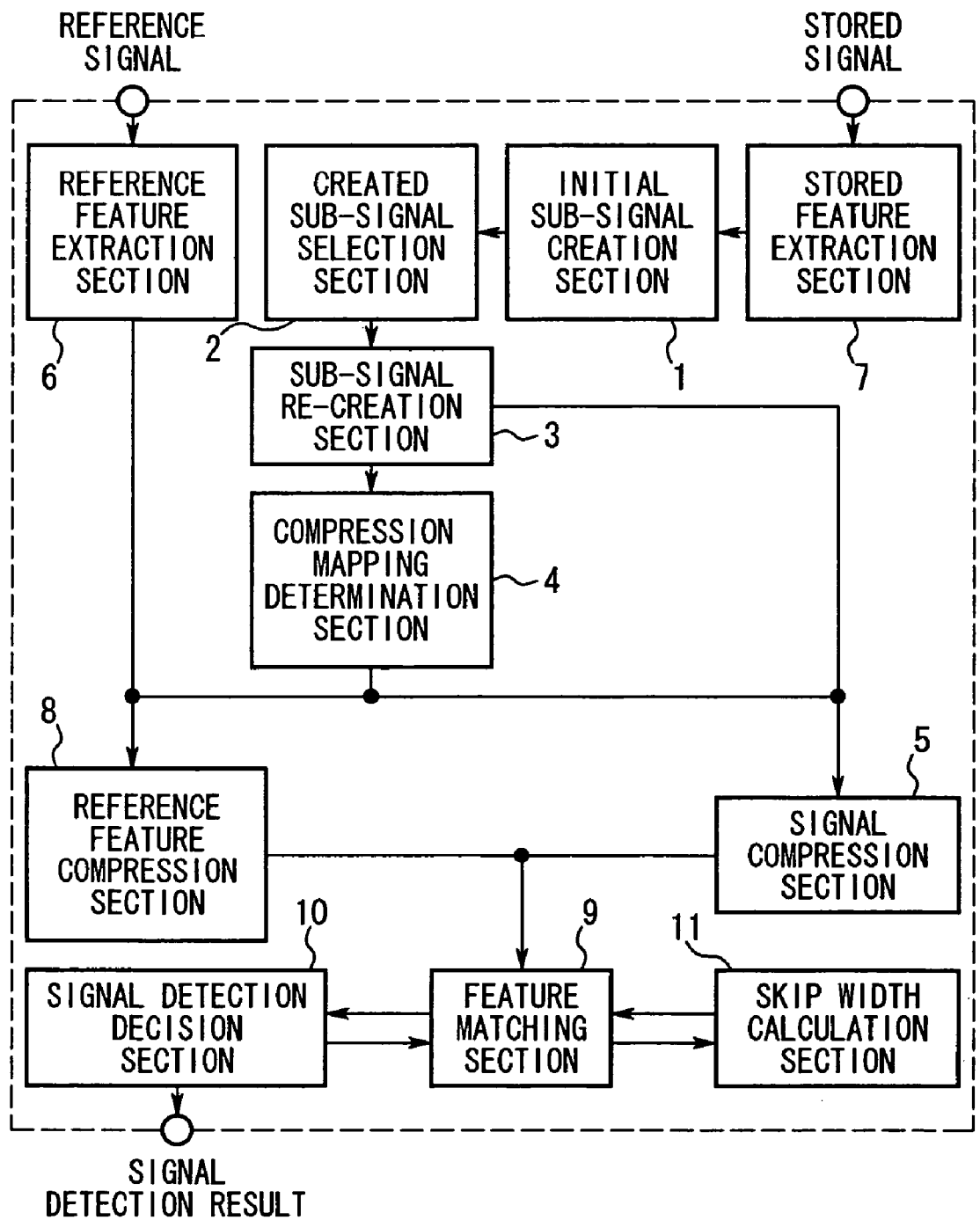
FIG. 3 is a block diagram showing the structure of a third preferred embodiment of the present invention.

FIG. 3 is a block diagram showing the structure of a third preferred embodiment of the present invention. In the description of this third preferred embodiment, a signal retrieval device will be explained, in which, to the signal retrieval device which has been explained in the description of the second preferred embodiment, there is newly provided a skip width calculation section 11 which, based upon the distance which has been outputted from the feature matching section 9, calculates the skip width of the window upon which attention is focused which is set with respect to the stored compressed feature sequence which is outputted from the signal compression section 5, and which shifts the window upon which attention is focused by that skip width. In this FIG. 3, since structural elements to which the same reference numerals as ones in the signal compression device of the first and second preferred embodiments which have been explained with reference to FIG. 1 and ones in the signal retrieval device which has been explained with reference to FIG. 2 are appended, function in the same manner as in the signal compression device of the first preferred embodiment or the signal retrieval device of the second preferred embodiment, and the explanation thereof will be curtailed.

Note that the signal retrieval device shown in FIG. 3 also takes as its input a reference signal, in other words a video signal which it is desired to retrieve for serving as a pattern or sample, and a stored signal, in other words a video signal which is retrieved, and outputs the location within the stored signal for which the distance from the reference signal is less than a value θ which been set in advance (this is termed the search threshold).

Next, referring to FIGS. 16 and 25, the operation of the signal retrieval device shown in FIG. 3 will be explained. First, to explain the overall operational flow of this signal retrieval device with reference to FIG. 16, a feature of the operation of the signal retrieval device of this third preferred embodiment of the present invention is that, by contrast to the flow of operation which was explained above in connection with the second preferred embodiment, between the "signal detection decision procedure" of the step S91 and the "procedure of determining whether or not the current position of the window upon which attention is focused is the end of the stored signal" of the step S95, a skip width calculation procedure is executed (in a step S92) in which the skip width is calculated of the window upon which attention is focused which is set for the stored compressed feature sequence which is outputted from the signal compression section 5, and the window upon which attention is focused is shifted by this skip width.

Next, the details of the skip width calculation procedure (the step S92) shown in FIG. 16 will be explained with reference to FIG. 25. FIG. 25 is a flow chart showing the operation of the skip width calculation section 11.

Figure 25:
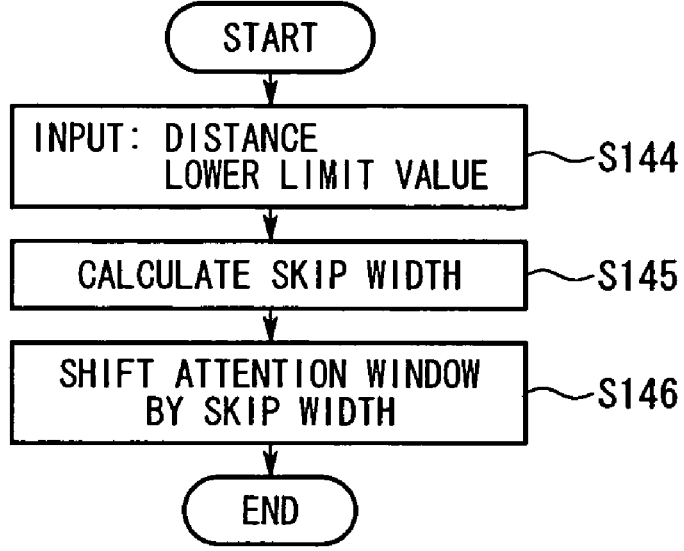
FIG. 25 is a flow chart showing the operation of a skip width calculation section 11 shown in FIG. 3.

Referring to FIG. 25, first, the skip width calculation section 11 reads in the distance lower limit value which is outputted from the feature matching section 9 (in a step S144). Next, the skip width calculation section 11 calculates (in a step S1145) the skip width over which it is possible to eliminate feature matching, in other words distance calculation while still ensuring that false dismissal does not occur.

The principle by which the skip width is determined will be explained hereinafter.

Since the histograms are ones which have been obtained by classifying time series of feature vectors and accumulating them, the distance value between histograms does not change abruptly in accompaniment with shifting of the time window with respect to the feature vector in the stored signal. The absolute value of the change ratio of the distance value with respect to shifting of the time window by one feature vector certainly does not exceed $\sqrt{2}$. In other words, if the distance value between the histograms when the top of the time window upon stored signal is the $m_1$-th feature vector is termed $d(x_R, x_S(m_1))$, then the lower limit of the distance value $\underline{d}(x_R, x_S(m_2))$ when the time window has been shifted to the $m_2$-th feature vector and when $m_1 < m_2 < (m_1 + D)$, is given by the following equation:

$$\underline{d}(x_R, x_S(m_2)) = d(x_R, x_S(m_1)) - \sqrt{2}(m_2 - m_1) \qquad (5)$$

where D is the width of the time window. Due to Equation (4) above, Equation (5) is changed as follows:

$$\underline{d}(x_R, x_S(m_2)) \geq d^*(y_R, y_S(m_1)) - \sqrt{2}(m_2 - m_1) \stackrel{def}{=} \underline{d}^* \qquad (6)$$

Since the distance value is not less than zero, when the lower limit value $\underline{d}^*$ given by Equation (6) is less than zero, then "0" becomes the lower limit value. By replacing the lower limit value with the search threshold $\theta_1$, and $m_2 - m_1$ with the skip width $\omega$, it is possible to obtain a skip width in the following manner:

$$\omega = \begin{cases} \text{floor}\left(\dfrac{(\underline{d}^* - \theta_1)}{\sqrt{2}}\right) + 1 & (\text{if } \underline{d}^* > \theta_1) \\ 1. & (\text{otherwise}) \end{cases}$$

where floor(x) is the largest integer which does not exceed x.

Although, when starting this procedure, the stored compression feature is extracted from the top of the compressed feature sequence, during the progress of the procedure, the procedure is continued while shifting the position from which the stored compression feature is extracted along the time domain in order (in a step S146). The amount by which such shifting along the time domain is performed is provided by the skip width calculation section 11.

The Fourth Preferred Embodiment

Figure 4:
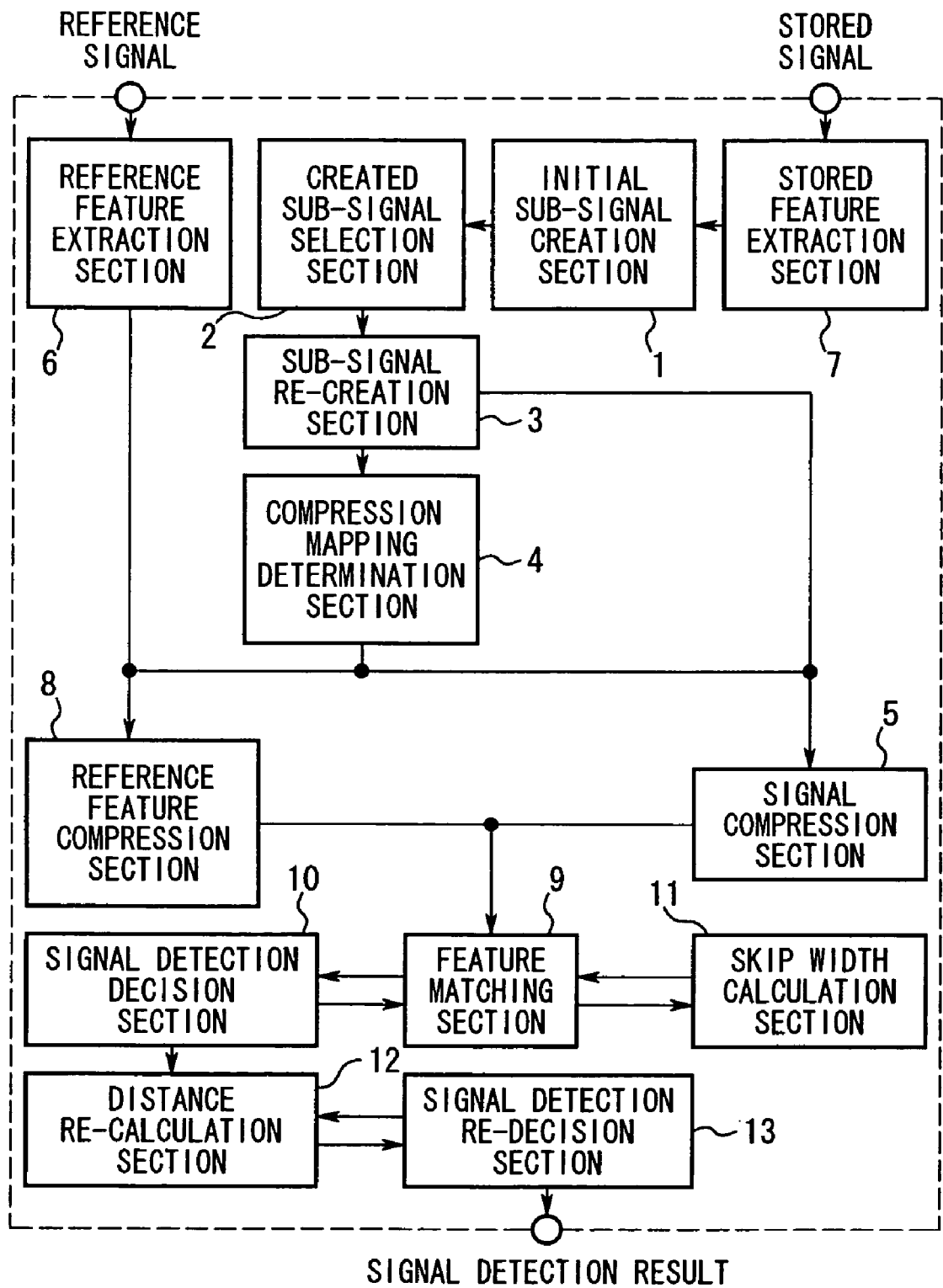
FIG. 4 is a block diagram showing the structure of a fourth preferred embodiment of the present invention.

FIG. 4 is a block diagram showing the structure of a fourth preferred embodiment of the present invention. In the description of this fourth preferred embodiment, a signal retrieval device will be explained, in which, to the signal retrieval device which has been explained in the description of the third preferred embodiment, there are newly provided a distance re-calculation section 12 which, for the place in the stored signal for which it has been decided by the signal detection decision section 10 that the reference signal is present, calculates the distance between the feature sequence which has been outputted from the reference feature extraction section 6, and the feature sequence which has been outputted from the stored feature extraction section 7, and a signal detection re-decision section 13 which, by comparing together the distance which has been outputted from the distance re-calculation section 12 and a search threshold, decides for a second time whether or not the reference signal is present at the location in the stored signal. In this FIG. 4, since structural elements to which the same reference symbols as ones in the signal compression devices or signal retrieval devices of the first through the third preferred embodiments and which have been explained with reference to FIGS. 1 through 3 are appended, function in the same manner as in these signal compression devices or signal retrieval devices, the explanation thereof will be curtailed.

Note that the signal retrieval device shown in FIG. 4 also takes as its input a reference signal, in other words a video signal which it is desired to retrieve for serving as a pattern or sample, and a stored signal, in other words a video signal which is retrieved, and outputs the location within the stored signal for which the distance from the reference signal is less than a value $\theta_1$ which been set in advance (this is termed the search threshold).

Next, the operation of the signal retrieval device which is shown in FIG. 4 will be explained with reference to FIGS. 16, 26, and 27. First, to explain the overall operational flow of this signal retrieval device with reference to FIG. 16, a feature of the operation of the signal retrieval device of this preferred embodiment of the present invention is that, by contrast to the flow of operation which was explained above in connection with the third preferred embodiment, between the "skip width calculation procedure" of the step S92 and the "procedure of determining whether or not the current position of the window upon which attention is focused is the end of the stored signal" of the step S95, there are executed a distance re-calculation procedure (in a step S93) in which, for the location in the stored signal for which it has been decided by the signal detection decision section 10 that the reference signal is present, the distance is calculated between the feature sequence which has been outputted from the reference feature extraction section 6 and the feature sequence which has been outputted from the stored feature extraction section 7, and a signal detection re-decision procedure (in a step S94) in which, by comparing together the distance which has been obtained by the above distance re-calculation procedure and the search threshold, a decision is again made as to whether or not the reference signal is present in the location in the stored signal.

Next, the details of the distance re-calculation procedure (of the step S93) shown in FIG. 16 will be explained with reference to FIG. 26. FIG. 26 is a flow chart showing the operation of the distance re-calculation section 12.

Figure 26:
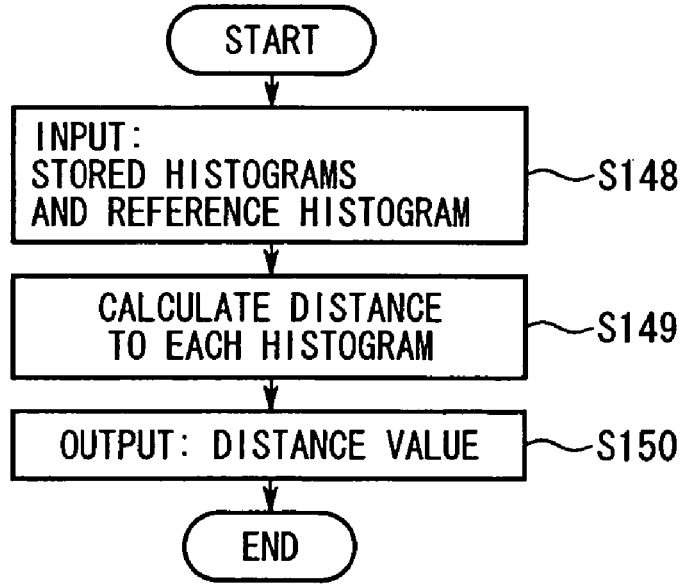
FIG. 26 is a flow chart showing the operation of a distance re-calculation section 12 shown in FIG. 4.

Referring to FIG. 26, first, the distance re-calculation section 12 reads in the reference histogram which is outputted from the reference feature extraction section 6, the stored histogram sequence which is outputted from the stored feature extraction section 7, and the detection result which is outputted from the signal detection decision section 10 (in a step S148). Next, the distance from the reference histogram is calculated for the stored histogram which corresponds to the location within the stored signal at which it has been decided that the reference signal is present (in a step S149). The distance between these histograms is defined in the same manner as in Equation (1) described previously, using the Euclid distance. The distance value which has been obtained is then outputted (in a step S150).

Next, the details of the signal detection re-decision procedure (the step S94) shown in FIG. 16 will be explained with reference to FIG. 27. FIG. 27 is a flow chart showing the operation of the signal detection re-decision section 13.

Figure 27:
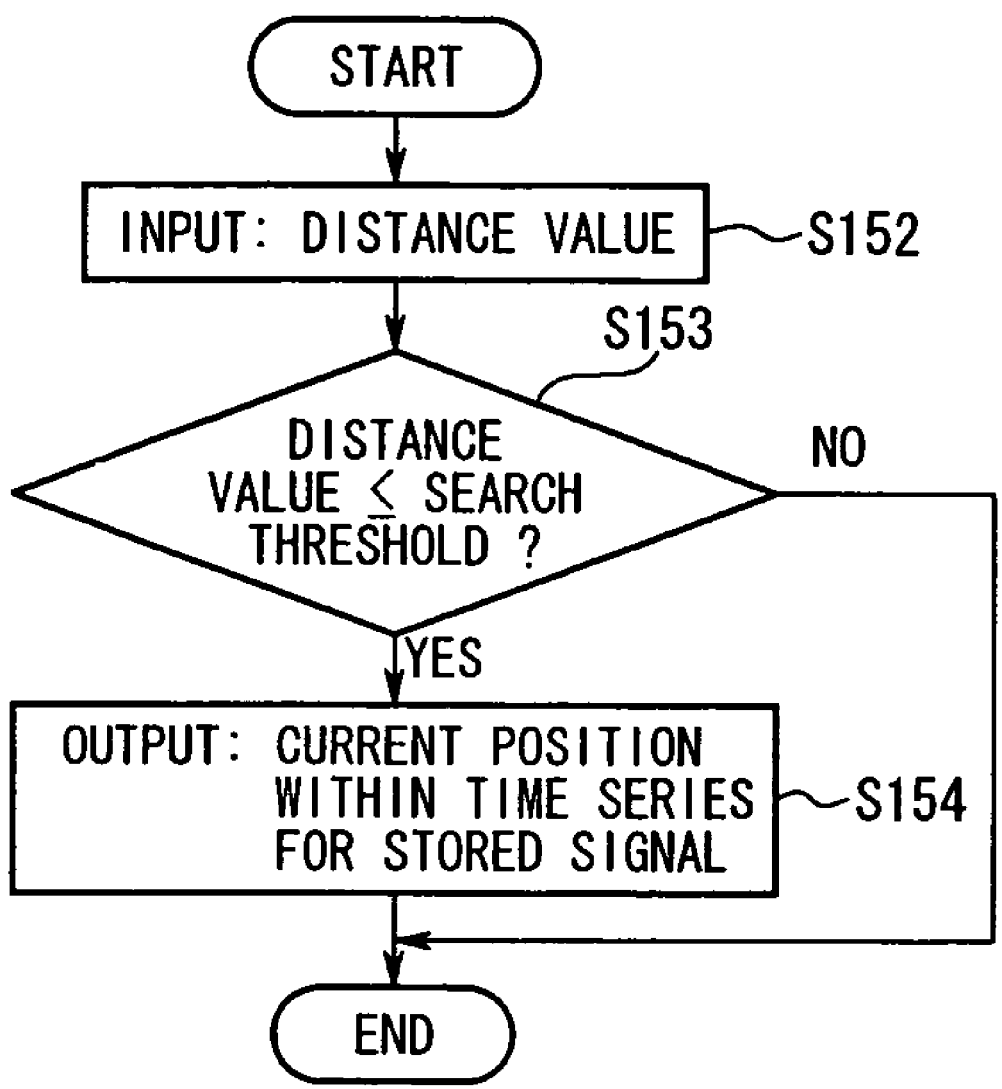
FIG. 27 is a flow chart showing the operation of a signal detection re-decision section 1 shown in FIG. 4.

Referring to FIG. 27, first, the signal detection re-decision section 13 reads in the distance value which is outputted from the distance re-calculation section 12 (in a step S152). Next, the signal detection re-decision section 13 compares together the distance value and the search threshold (in a step S153). If the result of this comparison is that the distance value is less than the search threshold (YES in the step S153), then, since this means that this reference signal is present within the stored signal, the signal detection re-decision section 13 outputs (in a step S154) the current position in time series with respect to the stored signal as the signal detection result.

Note that, according to requirements, the skip width calculation section 11 may, or may not, be included in the signal retrieval device shown in FIG. 4.

Results of Actual Experiments

Next, actual experimental results which were obtained during the operation of a signal retrieval device according to the present invention will be explained.

In order to check upon the beneficial effects of the present invention, as a first experiment, a histogram which was made from 24 hours of video signal was taken as a stored signal, and investigation was performed of change in the average dimensionality of a compression histogram which was normalized by segment length, when the number of segments and the contribution threshold were varied.

Note that the parameters of the compression were: sampling frequency=29.97 Hz; number of segments of the image=6 (two segments vertically and three segments horizontally); dimensionality of the histogram=256; and width of the time window=15 seconds. Furthermore, the segmentation boundary shiftable width Δ was varied from 1 up to 500 in the following manner: 1, 2, 5, 10, . . . .

Figure 28:
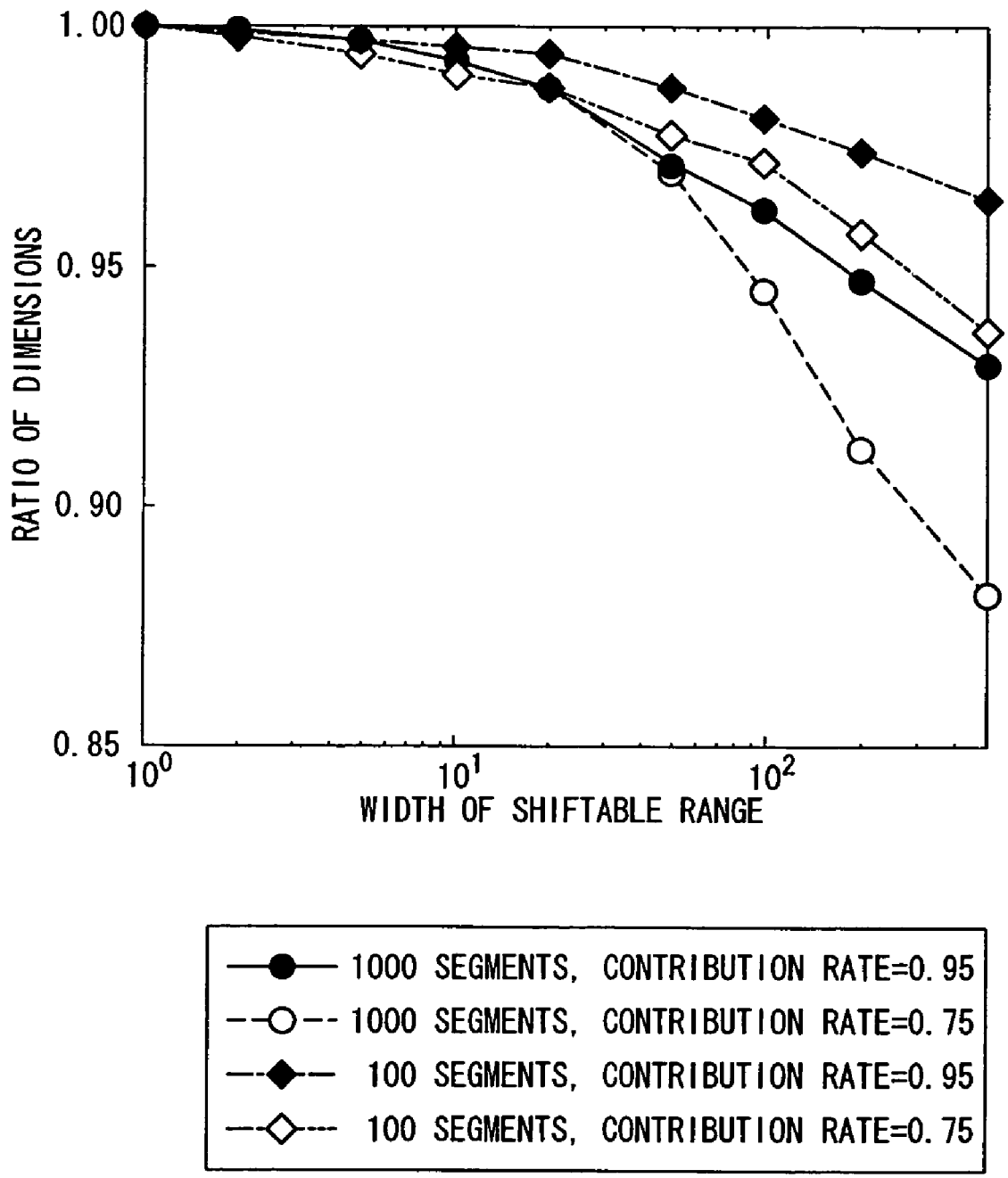
FIG. 28 is a first explanatory figure showing the results of certain experiments.

The results of this first experiment are shown in FIG. 28. The segmentation boundary shiftable width Δ (termed "Width of Shiftable Range" in FIG. 28) is shown along the horizontal axis of the graph, while the ratio of the average dimensionality to the average dimensionality when Δ=0 as a reference (termed "Ratio of Dimensions" in FIG. 28) is shown along its vertical axis. For example, for a segmentation boundary shiftable width Δ=500, number of segments M=1000 (segments), and contribution threshold (contribution rate) σ=0.75, the average dimensionality was 2.91; while when the segmentation boundary shiftable width Δ was equal to 0, the average dimensionality was 3.30 and the dimensionality reduction ratio was 0.882.

Next, as a second experiment, a histogram which was made from 24 hours of video signal was taken as an original signal, and investigation was performed of the number of times the average dimensionality was calculated by the created sub-signal selection section 2 and the sub-signal re-creation section 3. Note that the search parameters were the same as for the first experiment, and moreover the number of segments M was =1000 (segments) and the contribution threshold (contribution rate) σ was =0.75.

Figure 29:
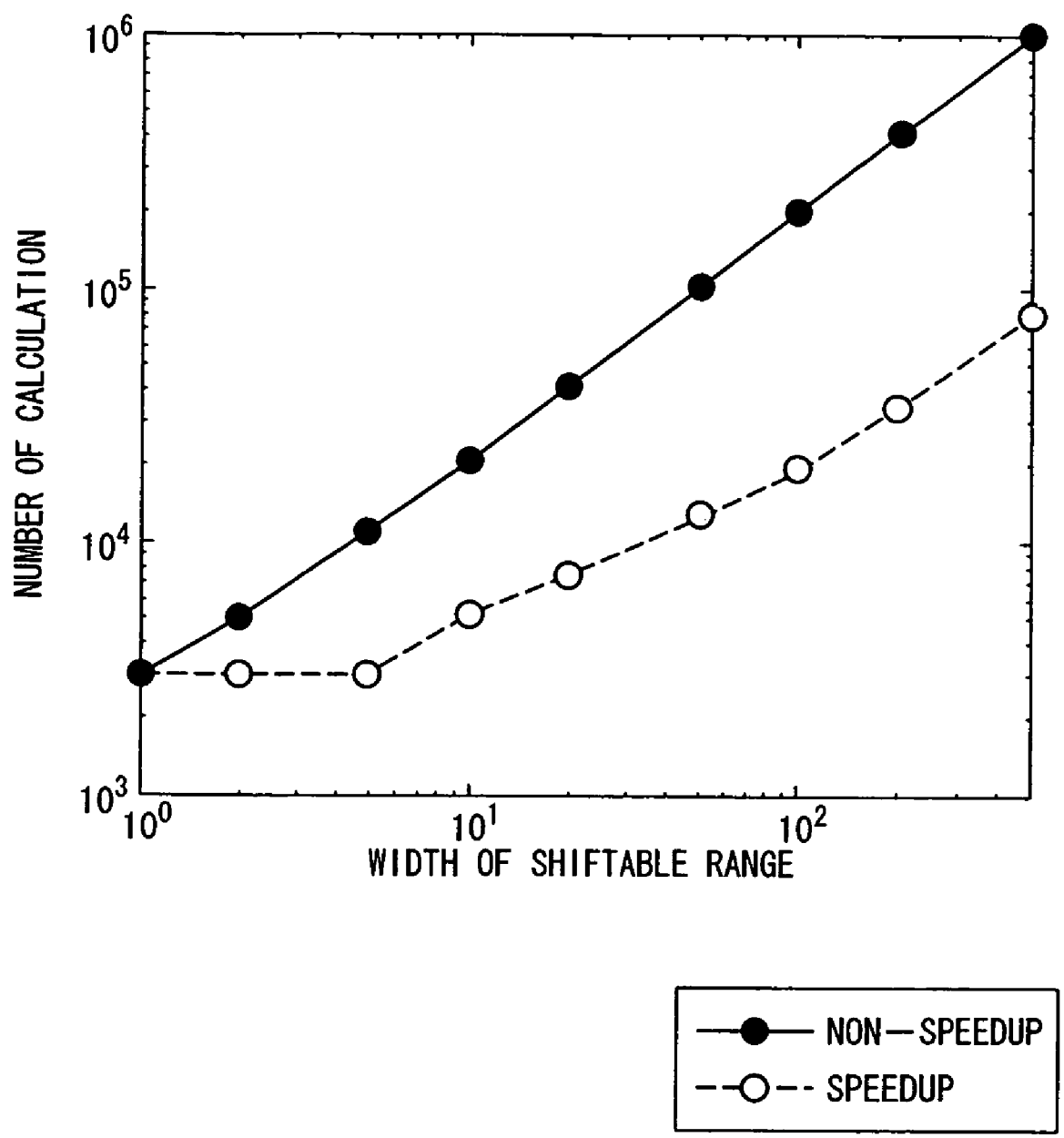
FIG. 29 is a second explanatory figure showing the results of certain experiments.

The results of this second experiment are shown in FIG. 29. The segmentation boundary shiftable width Δ (termed "Width of Shiftable Range" in FIG. 29) is shown along the horizontal axis of the graph, while the number of times the calculation was performed (termed "Number of Calculation" in FIG. 29) is shown along its vertical axis. For example, for a segmentation boundary shiftable width Δ=500, the number of times the calculation was performed with the method of the present invention (shown by "speedup" in the graph of FIG. 29) was about 80,000, while the number of times the calculation was performed with a method in which no created sub-signal selection section 2 was implemented (shown by "non-speedup" in the graph of FIG. 29) was about 1,000,000; so that the reduction ratio of calculation number attained by the practice of the present invention was about 12.5.

The Fifth Preferred Embodiment

Next, a fifth preferred embodiment of the present invention will be explained with reference to the figures.

In the description of this fifth preferred embodiment, an audio signal will be employed as an example of the object signal which is to be processed. Note that the concrete feature extraction method and method of creating the histograms will be explained hereinafter in the context of the processing which is performed by a query feature extraction section 101.

Figure 30:
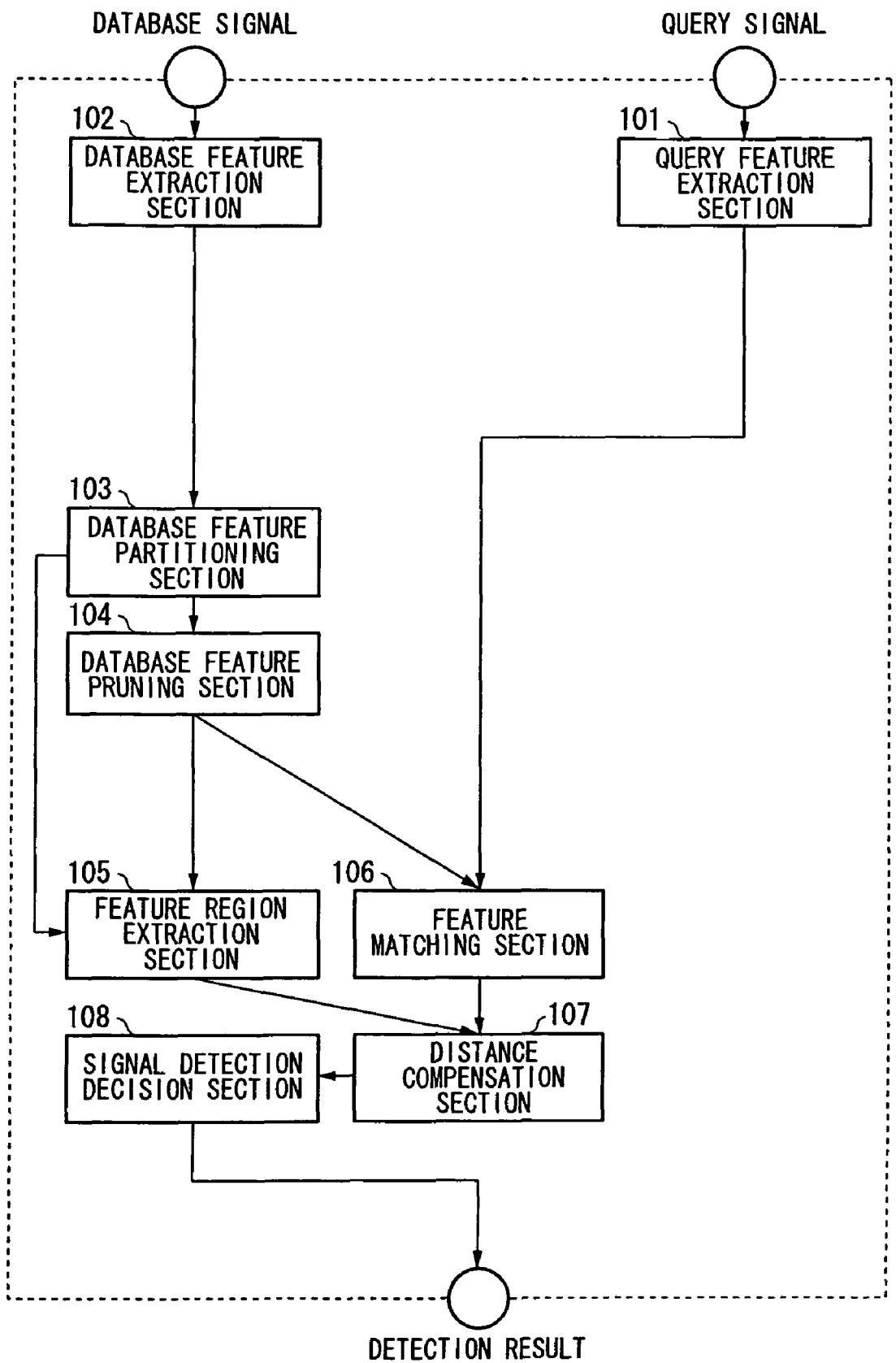
FIG. 30 is a figure showing a functional block of a signal retrieval device to which the method according to the fifth preferred embodiment of the present invention has been applied.

FIG. 30 is a functional block diagram showing the structure of a signal retrieval device to which the method of this fifth preferred embodiment of the present invention has been applied. Referring to FIG. 30, the signal retrieval device of this preferred embodiment comprises: a query feature extraction section (a reference feature extraction section) 101 which extracts features from a query signal (a reference signal); a database feature extraction section (a stored feature extraction section) 102 which sets a window upon which attention is focused in a database signal (a stored signal), and extracts features from that signal within the window upon which attention is focused; a database feature partitioning section 103 which partitions feature sequences which are outputted by repeatedly performing the processing of the database feature extraction section 102 while shifting the window upon which attention is focused; a database feature pruning section 104 which extracts representative features from the feature sequences after partitioning which have been outputted from the database feature partitioning section 103, and which produces representative feature sequences which are created with a smaller number of features; a feature region extraction section 105 which produces regions in which features are present which are included in the partitions which have been outputted from the database feature partitioning section 103; a feature matching section 106 which calculates the distance between the feature sequences which have been outputted from the query feature extraction section 101 and the representative feature sequences which have been outputted from the database feature pruning section 104; a distance compensation section 107 which compensates the distance which has been outputted from the feature matching section 106 by using the regions which have been outputted from the feature matching section 106; and a signal detection decision section 108 which, by comparing together the distance which has been outputted from the distance compensation section 107 and a search threshold, which is a threshold which corresponds to the distance, decides whether or not the query signal is present at the location within the database signal.

The signal retrieval device shown in FIG. 30 takes as its input a query signal, in other words an audio signal which it is desired to retrieve for serving as a pattern or sample, and a database signal, in other words an audio signal which is retrieved, and outputs the location within the database signal for which the distance from the query signal is less than a value $\theta_1$ which been set in advance (this is termed the search threshold).

Next, the operation of the signal retrieval device which is shown in FIG. 30 will be explained with reference to FIGS. 30 and 38 through 42. Note that the procedures which are performed by the query feature extraction section 101, the database feature extraction section 102, and the signal detection decision section 108 described above are the same as in the case of the second preferred embodiment which was described above with reference to FIGS. 16 through 24.

Figure 38:
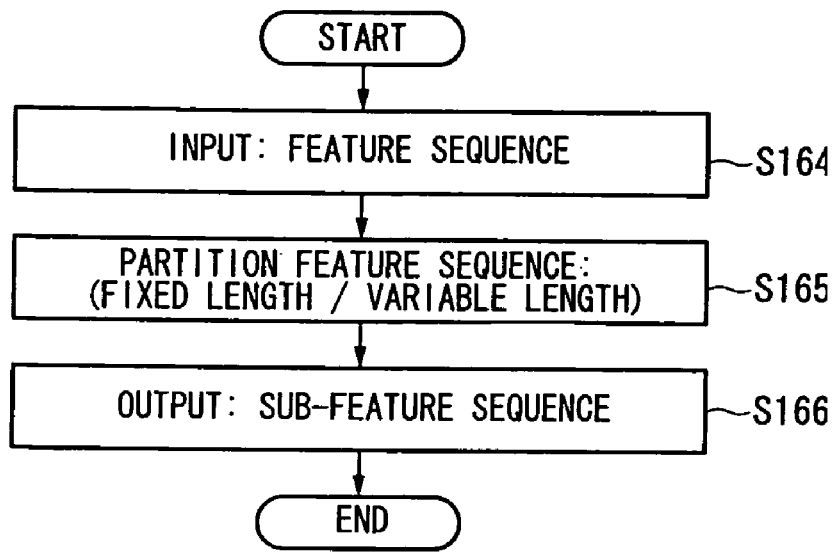
FIG. 38 is a flow chart showing the processing which is performed by a database feature partitioning section.

FIG. 38 is a flow chart showing the processing which is performed by the database feature partitioning section.

Next, referring to FIG. 38, the database feature partitioning section 103 reads in the sequence (the feature sequence) of the DB histogram (the stored histogram) which is outputted by repeating the processing of the database feature extraction section 102 while shifting the window upon which attention is focused (in a step S164). Next, the database feature partitioning section 103 partitions the histogram sequence (in a step S165). Although various types of method for this partitioning may be considered, here two such methods will be explained.

In the first such method, the histogram sequence is segmented equally according to a segmentation width which is specified in advance. For example, when the segmentation width is taken as 50, a large number of partial histogram sequences (partial feature sequences) are created, each of length 50 frames. In the second such method, the lengths of the partial histogram sequences are adjusted so that each histogram of the partial histogram sequence is present within a fixed distance from a histogram representing the partial histogram sequence, which is produced by the feature region extraction section 105 which will be described hereinafter. In concrete terms, the following procedure is performed. First, the partial histogram sequence is set to a certain length, and a representative histogram is extracted from among the sequence. The method for choosing the representative histogram is according to the procedures performed by the database feature pruning section 104. Next, the distance from the representative histogram is calculated for each histogram within the partial histogram sequence, and its maximum value is obtained. The above described operation is repeated while increasing the length of the partial histogram sequence one unit at a time, from a start length for the partial histogram sequence of 1 until the maximum value exceeds a region threshold which has been set in advance. The above is the second method for partitioning the histogram. The database feature partitioning section 103 then outputs (in a step S166) the set of partial histogram sequences which have thus been produced by segmentation.

Figure 39:
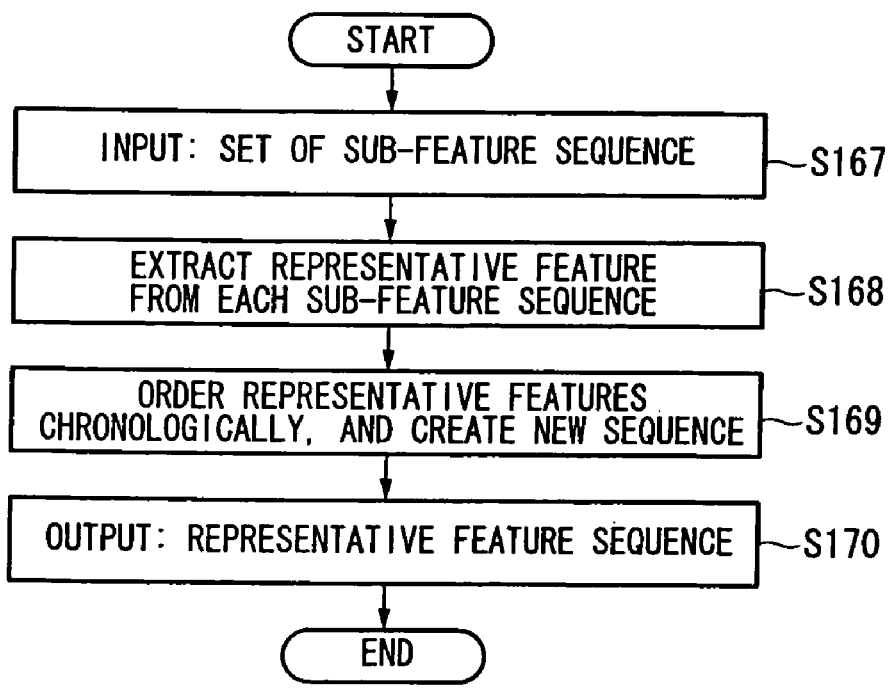
FIG. 39 is a flow chart showing the processing which is performed by a database feature pruning section.

FIG. 39 is a flow chart showing the procedure which is performed by the database feature pruning section 104. Referring to this FIG. 39, first, the database feature pruning section 104 reads in the set of partial histogram sequences which is outputted from the database feature partitioning section 103 (in a step S167). Next, the database feature pruning section 104 extracts a representative feature from each partial histogram sequence (in a step S168). Although various types of method may be considered for this extraction of representative features, in this specification, two such methods will be explained. In the first such method, some one of the histograms within the partial histogram sequence is taken as a representative feature thereof, just as it is. For example, the histogram at the top of the partial histogram sequence is taken as being representative thereof. In the second method, the centroid of the histograms (with reference to the Euclid distance space) within the partial histogram sequence is calculated, and this is taken as being representative thereof. Finally, the representative features are arranged in order of their original partial histogram sequences, and the result is taken as being a new sequence (in a step S169). The feature sequence which has been produced according to these steps is termed the representative feature sequence. Then, the database feature pruning section 104 outputs this representative feature sequence (in a step S170).

Figure 40:
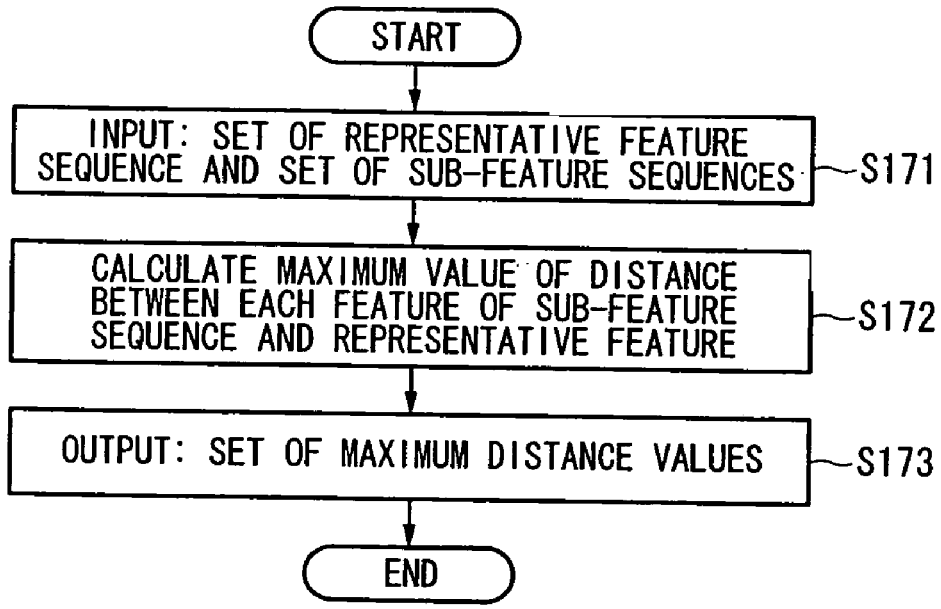
FIG. 40 is a flow chart showing the processing which is performed by a feature region extraction section.

FIG. 40 is a flow chart showing the processing which is performed by the feature region extraction section 105.

Next, referring to FIG. 40, the feature region extraction section 105 reads in the set of partial histogram sequences which is outputted from the database feature partitioning section 103 and the representative feature sequence which is outputted from the database feature pruning section 104 (in a step S171). Next, for each histogram within the partial histogram sequence, the feature region extraction section 105 calculates the distance from a representative feature, and calculates the maximum value dmax thereof (in a step S172). By the above described operation, it is possible to determine a range within the partial histogram sequence in which a histogram is present, and this comes within the range of the distance dmax from the representative feature. The feature region extraction section 105 then outputs a set of the dmax (in a step S173).

Figure 41:
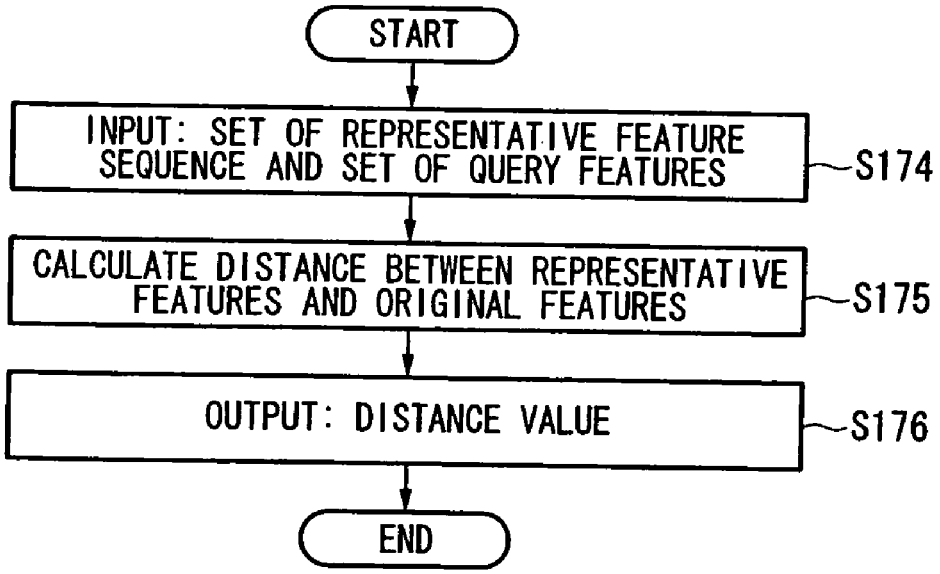
FIG. 41 is a second flow chart showing the processing which is performed by a feature matching section.

FIG. 41 is a second flow chart showing the processing which is performed by the feature matching section 106.

Next, referring to FIG. 41, the feature matching section 0.106 reads in (in a step S174) the representative feature sequence which is outputted from the database feature pruning section 104 and the query feature which is outputted from the database feature extraction section 102. Next, the feature matching section 106 calculates the distance between the query feature $x_Q$ and the representative feature $x_D$ (in a step S175). Although various distance measures might be used for this calculation, for example, the Manhattan distance or the Euclid distance may be used.

The Manhattan distance is defined as $$d(x_Q, x_D) \overset{def}{=} \sum_{i=1}^{n} |x_{Qi} - x_{Di}|, \quad (7)$$

while the Euclid distance is defined as $$d(x_Q, x_D) \overset{def}{=} \sqrt{\sum_{i=1}^{n} (x_{Qi} - x_{Di})^2}. \quad (8)$$

Then, the feature matching section 106 outputs (in a step S176) the distance $d(x_Q, x_D)$.

Figure 42:
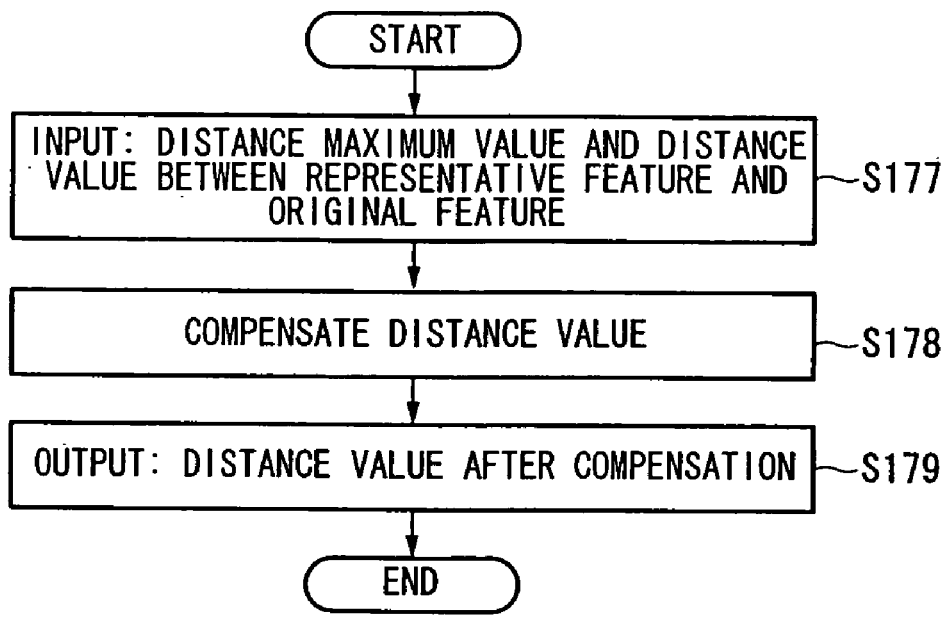
FIG. 42 is a flow chart showing the processing which is performed by a distance compensation section.

FIG. 42 is a flow chart showing the processing which is performed by the distance compensation section.

Next, referring to FIG. 42, the distance compensation section 107 reads in (in a step S177) the distance value dmax which is outputted from the feature region extraction section 105 and the distance value $d(x_Q, x_D)$ which is outputted from the feature matching section 106. Next, the distance compensation section 107 calculates the compensated distance value. In other words, the distance compensation section 107 calculates $d(x_Q, x_D)$–dmax, thus correcting the distance value (in a step S178). By doing this, for the partial histogram sequence which corresponds to the representative feature, the minimum value of the distance from the histograms therein is obtained. The distance compensation section 107 then outputs (in a step S179) the distance value after compensation (the compensated distance value).

The Sixth Preferred Embodiment

Next, a sixth preferred embodiment of the present invention will be described with reference to the drawings.

Figure 31:
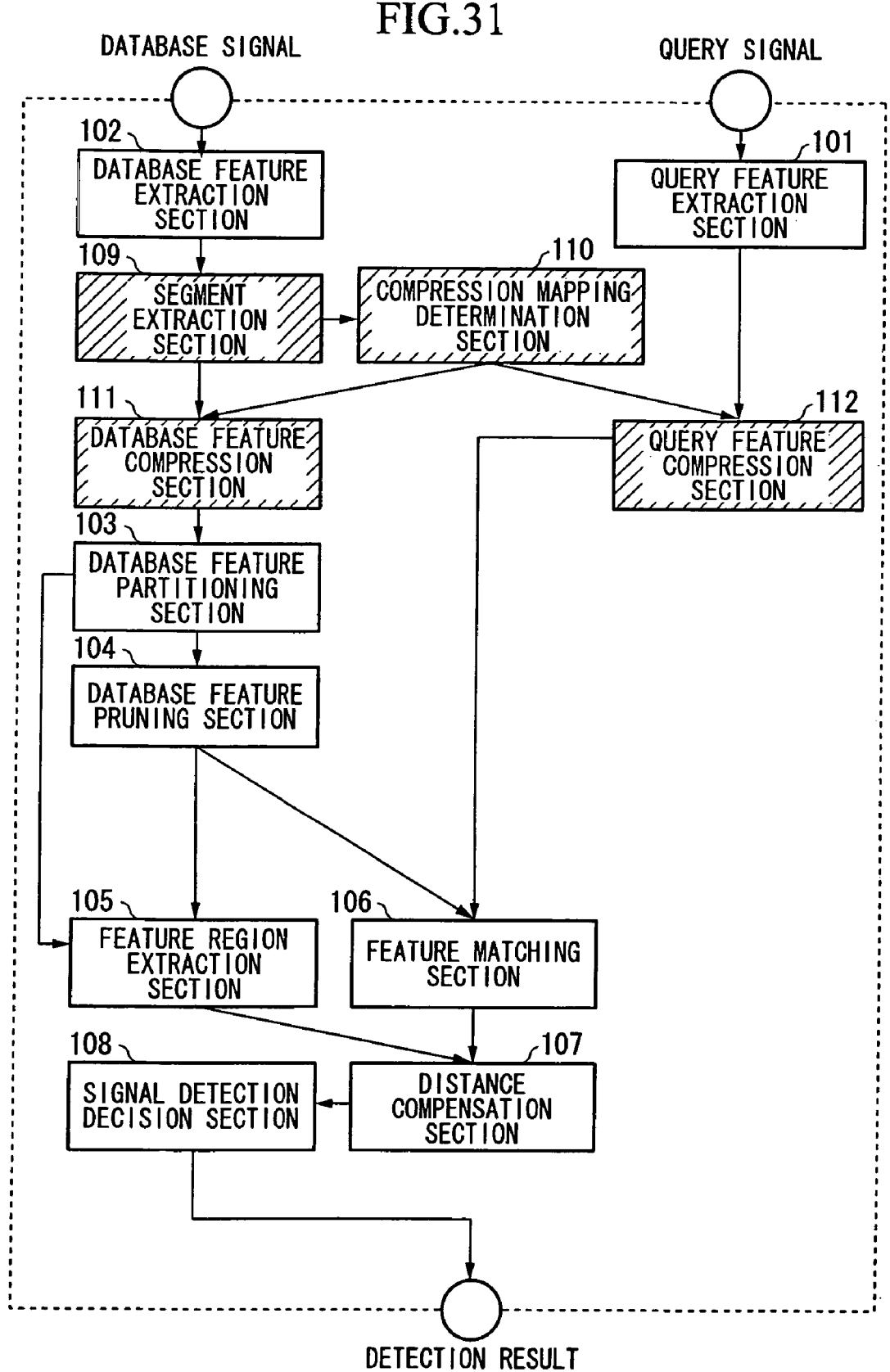
FIG. 31 is a figure showing a functional block of a signal retrieval device to which the signal retrieval method according to the sixth preferred embodiment of the present invention has been applied.

FIG. 31 is a functional block diagram showing a signal retrieval device to which the method of the sixth preferred embodiment has been applied. With the signal retrieval device of this preferred embodiment, in the signal retrieval device according to the fifth preferred embodiment of the present invention, there are further comprised a segment extraction section 109, a compression mapping determination section 110, a database feature compression section (a stored feature compression section) 111, and a query feature compression section (a reference feature compression section) 112; and it takes as its input a query signal, in other words an audio signal which it is desired to retrieve for serving as a pattern or sample, and a database signal, in other words an audio signal which is retrieved, and it outputs the location within the database signal for which the distance from the query signal is less than a value $\theta_1$ which been set in advance (this is termed the search threshold).

The segment extraction section 109, by segmenting the feature sequences which the database feature extraction section 102 has produced by repeatedly shifting the window upon which attention is focused, extracts segments (sub-signals) which are partial sequences. Furthermore the compression mapping determination section 110 determines, from each segment which has been outputted from the segment extraction section 109, upon a mapping for calculating features of lower dimensions than the features. Based upon the mapping which has been outputted from the compression mapping determination section 110, the database feature compression section 111 calculates features which correspond to the segments which have been outputted from the segment extraction section 109, and which are of lower dimensions than the features. Moreover, based upon the mapping which has been outputted from the compression mapping determination section 110, the query feature compression section 112 calculates features which correspond to the features which have been outputted from the query feature extraction section 101, and which are of lower dimensions than the features.

Next, the procedures which are performed by the signal retrieval device of this sixth preferred embodiment will be explained in detail with reference to FIGS. 31 and 43.

First, the procedures which are performed by the query feature extraction section 101, the database feature extraction section 102, the compression mapping determination section 110, the database feature compression section 111, and the query feature compression section 112 are the same as in the case of the second preferred embodiment which was described above, and accordingly their explanation will be curtailed.

Figure 43:
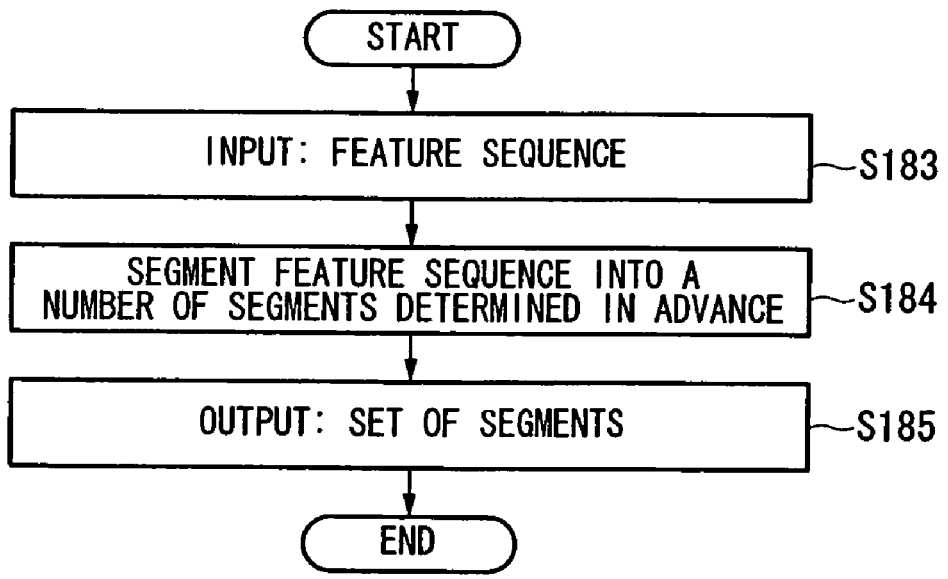
FIG. 43 is a flow chart showing the processing which is performed by a segment extraction section.

FIG. 43 is a flow chart showing the processing which is performed by the segment extraction section 109.

The segment extraction section 109 may have either one of two different structures. The first structure is that this segment extraction section 109 only incorporates the initial sub-signal creation section 1 described above. The second structure is that this segment extraction section 109 comprises the initial sub-signal creation section 1, the created sub-signal selection section 2, and the sub-signal re-creation section 3. In either case, since the procedures which are performed by these sections are the same as in the case of the second preferred embodiment which was described above (in steps S183 through S184), accordingly their explanation will be curtailed. The segment extraction section 109 outputs (in a step S185) a set of segments which are histogram sequences which have been segmented.

After this, the operations of the database feature partitioning section 103 through the signal detection decision section 108 are performed. Note that, since the procedures which are performed by the database feature partitioning section 103 through the signal detection decision section 108 are the same as in the case of the fifth preferred embodiment which was described above, accordingly their explanation will be curtailed.

The Seventh Preferred Embodiment

Next, a seventh preferred embodiment of the present invention will be explained with reference to the drawings.

Figure 32:
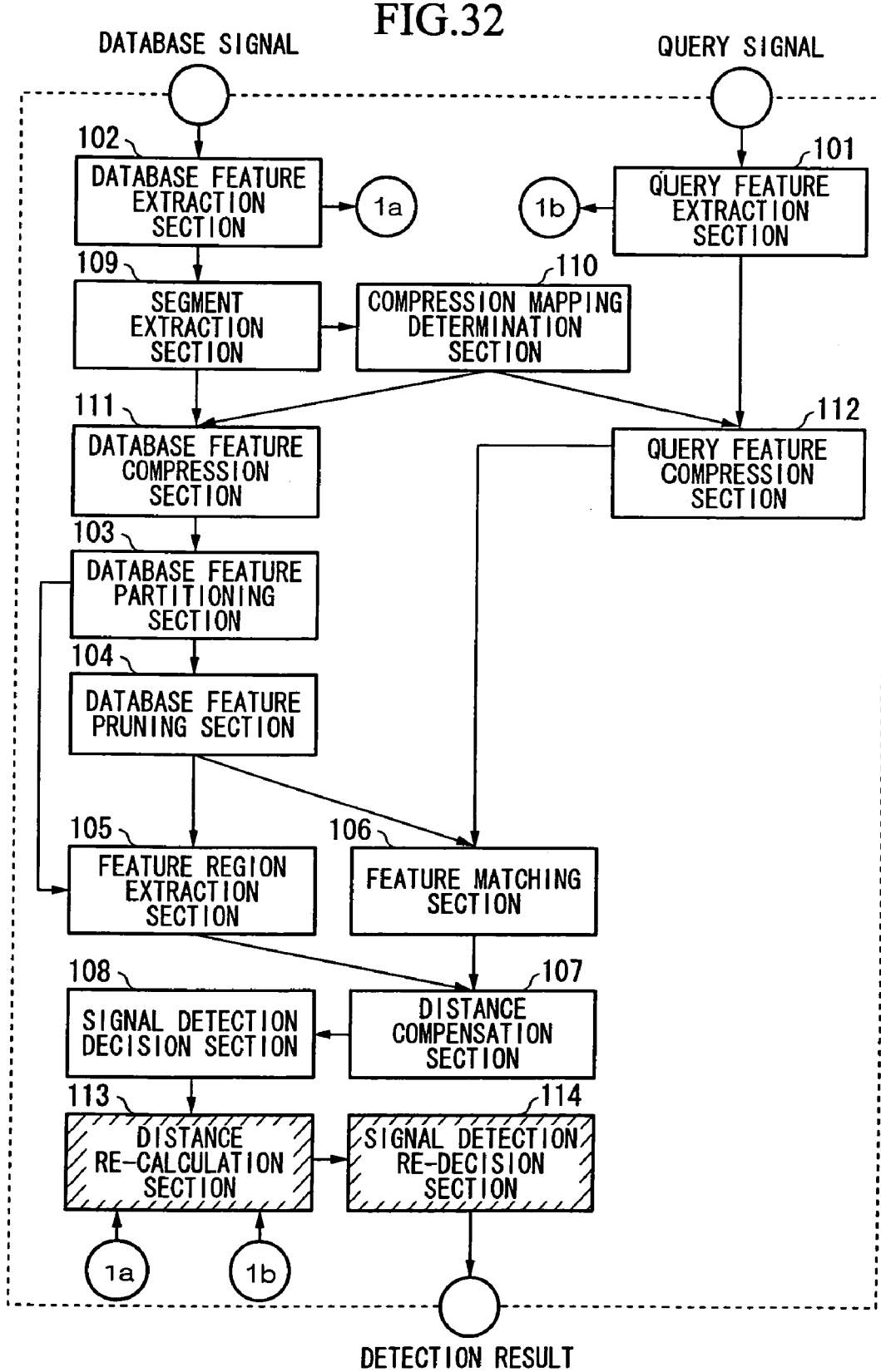
FIG. 32 is a figure showing a functional block of a signal retrieval device to which the signal retrieval method according to the seventh preferred embodiment of the present invention has been applied.

FIG. 32 is a functional block diagram showing the structure of a signal retrieval device to which the method of this seventh preferred embodiment of the present invention has been applied. With the signal retrieval device of this preferred embodiment, in the signal retrieval device according to the sixth preferred embodiment of the present invention, there are further comprised a distance re-calculation section 113 and a signal decision re-calculation section 114; and it takes as its input a query signal, in other words an audio signal which it is desired to retrieve for serving as a pattern or sample, and a database signal, in other words an audio signal which is retrieved, and it outputs the location within the database signal for which the distance from the query signal is less than a value $\theta_1$ which been set in advance (this is termed the search threshold).

Here, for the location in the database signal at which it has been decided by the signal detection decision section 108 that the query signal is present, the distance re-calculation section 113 calculates the distance between the feature sequence which has been outputted from the query feature extraction section 101 and the feature sequence which has been outputted from the database feature extraction section 102. In addition, the signal detection re-decision section 114 re-determines whether or not the query signal is present at the location in the database signal by comparing together the distance which has been outputted from the distance re-calculation section 113 and the search threshold.

Since the other procedures are the same as in the case of the fourth preferred embodiment which was described above, their explanation will be curtailed.

The Eighth Preferred Embodiment

Next, an eighth preferred embodiment of the present invention will be described in detail with reference to the figures.

Figure 33:
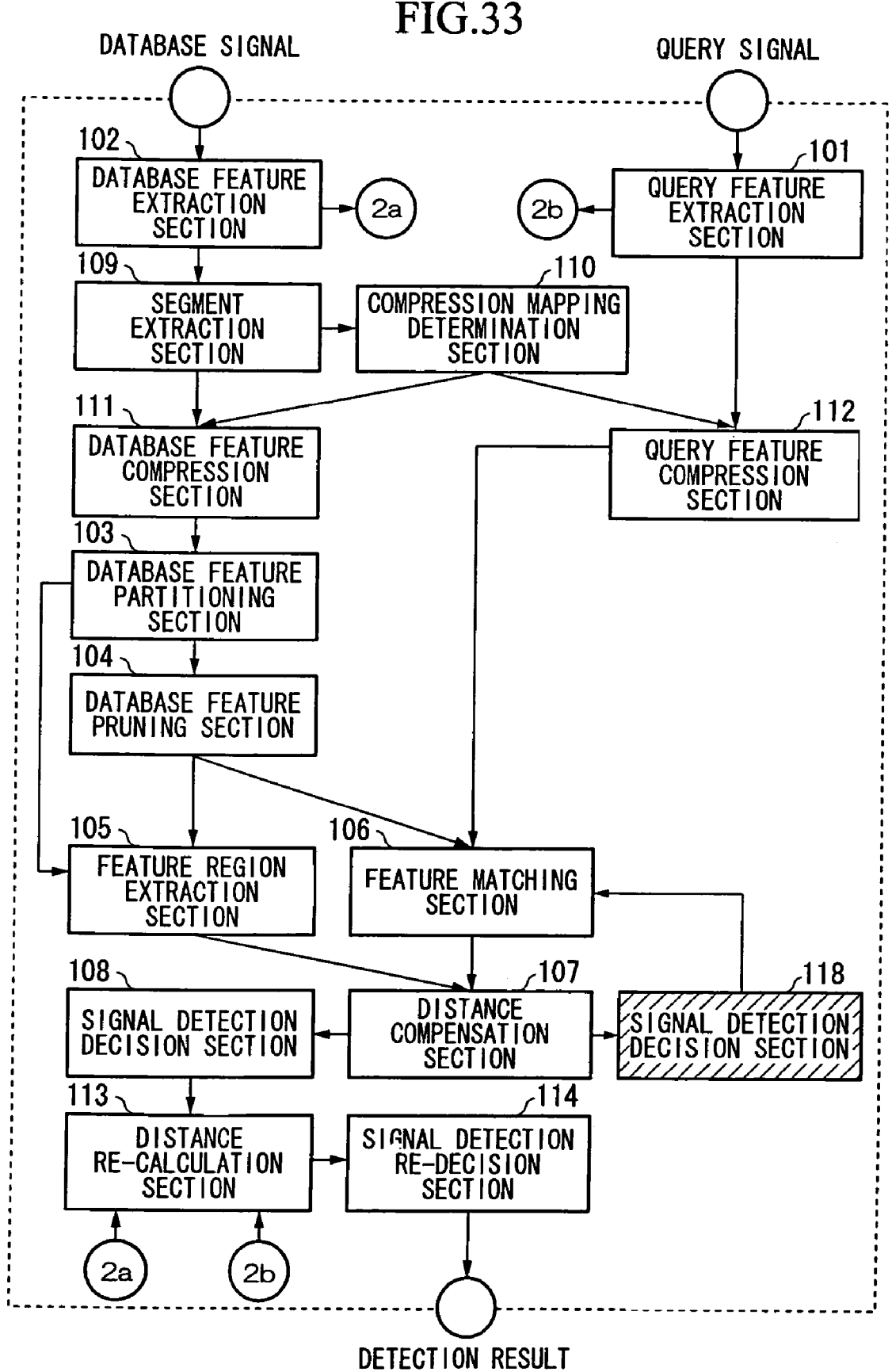
FIG. 33 is a figure showing a functional block of a signal retrieval device to which the signal retrieval method according to the eighth preferred embodiment of the present invention has been applied.

FIG. 33 is a figure showing functional blocks of a signal retrieval device to which a method according to the eighth preferred embodiment of the present invention has been applied. The signal retrieval device of this eighth preferred embodiment is constructed by adding a skip width calculation section 118 to the signal retrieval device of the seventh preferred embodiment of the present invention, and takes as its input a query signal, in other words an audio signal which has been retrieved and which serves as a pattern or sample, and a database signal, in other words an audio signal which is retrieved, and outputs a location in the database signal at which the distance from the query signal is less than a value $\theta_1$ which has been set in advance (this is termed the search threshold).

Here, the skip width calculation section 118 calculates a skip width for the window upon which attention is focused which is set for the compressed feature sequence which is outputted from the database feature compression section 111 based upon the distance which has been outputted from the feature matching section 106, and shifts the window upon which attention is focused by this skip width. This procedure is the same as that performed in the case of the third preferred embodiment of the present invention described above. The other procedures of this eighth preferred embodiment are the same as those performed in the case of the seventh preferred embodiment of the present invention and described above, and accordingly their description will be curtailed. Note that, according to requirements, the distance re-calculation section 113 and the signal detection re-decision section 114 may be included in the signal retrieval device shown in FIG. 33, or, if they are not required, may not be included.

Results of Actual Experiments

Next, actual experimental results which were obtained during the operation of a signal retrieval device according to the eighth preferred embodiment of the present invention will be explained.

An audio signal 200 hours long was taken as the stored signal, and signal retrieval was performed for 200 reference signals, each consisting of a different 15 seconds which had been selected randomly from a signal which was provided separately from the stored signal; and the time period which was required for retrieval from when the reference signal was inputted, and the number of times the processing of the feature matching section 106 was executed, in other words the number of feature matches, were investigated. Note that, at this time, the parameters were as follows: dimensionality of the feature vectors=7; time width of the feature vectors=60 msec; time resolution of the feature vectors=10 msec; dimensionality of the histograms=128. The compression features were created for each a=50 frames. Furthermore, the contribution threshold was =0.9, and the search threshold was =85.

Figure 48:
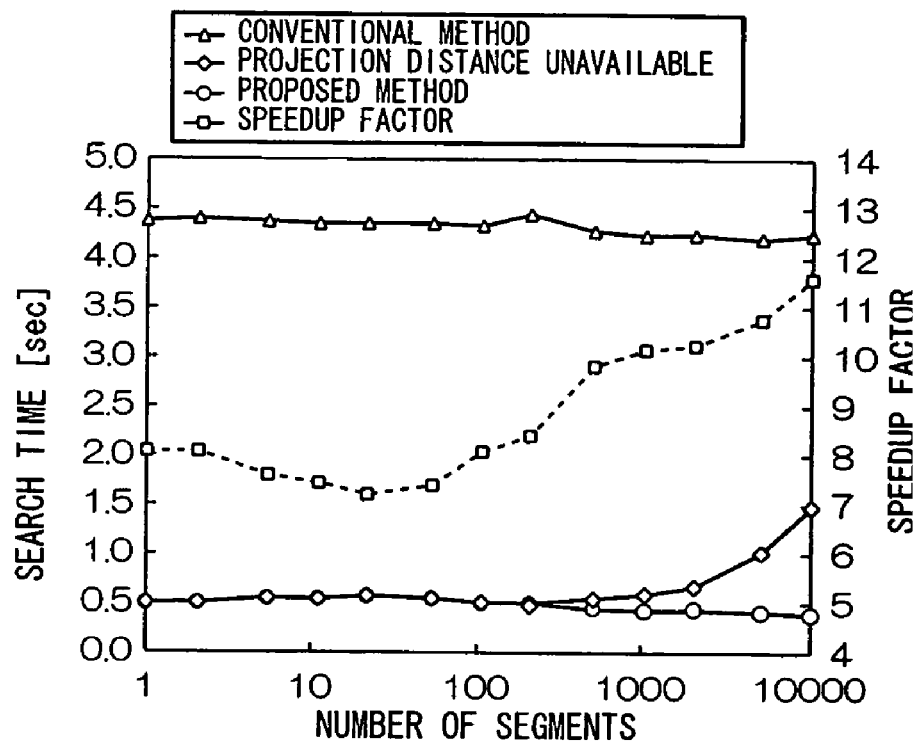
FIG. 48 is a third explanatory figure showing the results of certain experiments.
Figure 49:
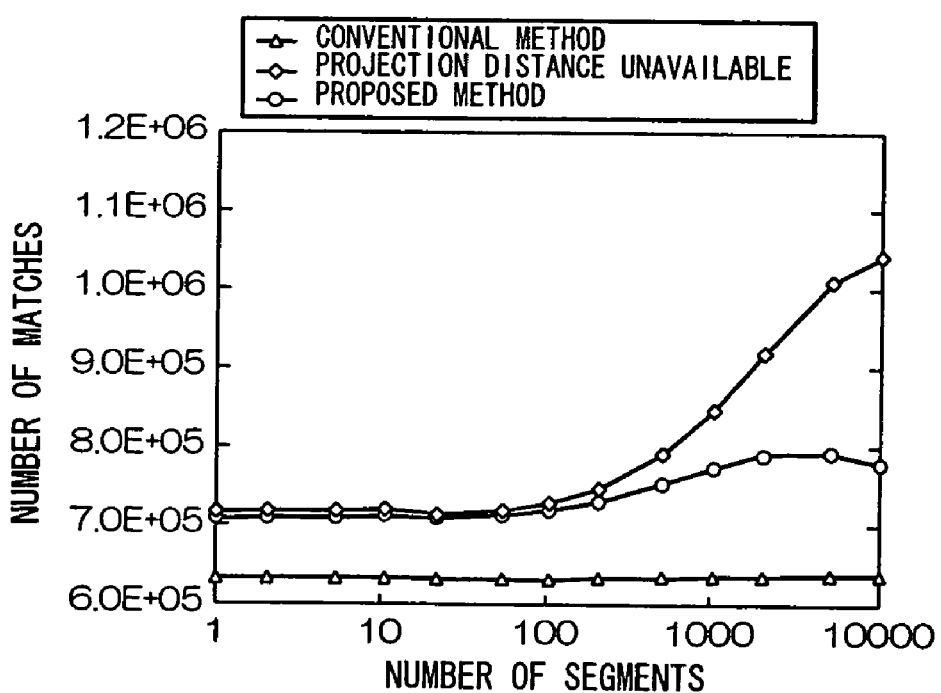
FIG. 49 is a fourth explanatory figure showing the results of certain experiments.

The experimental results which were obtained for this preferred embodiment are shown in FIGS. 48 and 49. FIG. 48 is a third explanatory figure showing the experimental results. FIG. 49 is a fourth explanatory figure showing the experimental results.

The number of segments is, in each case, shown along the horizontal axis; and in FIG. 48 the time period which was required for the retrieval is shown along the vertical axis, while in FIG. 49 the number of matches is shown along the vertical axis. When the number of segments was taken as 10,000, with the method of the present invention ("proposed method"), the time period which was required for the retrieval was 0.364 seconds and the number of matches was 772,784; while, with a method in which matching was performed without taking advantage of the projection distance ("projection distance unavailable"), the time period which was required for the retrieval was 1.491 seconds and the number of matches was 1,036,493; and, with a conventional method (i.e. with a conventional method as described in Japanese Patent No. 3,065,314), the time period which was required for the retrieval was 4.218 seconds and the number of matches was 633,047.

The Ninth Preferred Embodiment

Next, a ninth preferred embodiment of the present invention will be explained with reference to the drawings.

Figure 34:
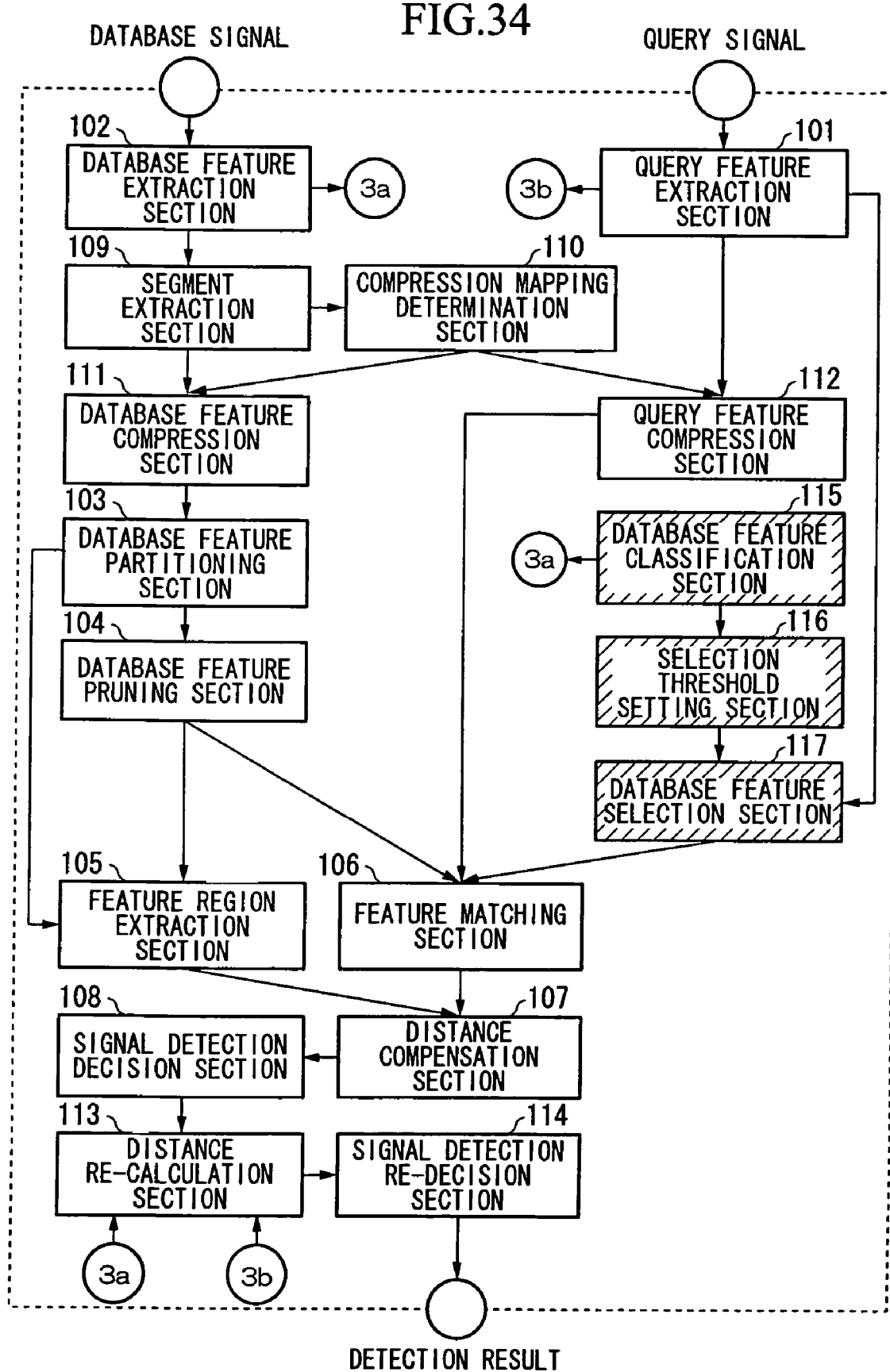
FIG. 34 is a figure showing a functional block of a signal retrieval device to which the signal retrieval method according to the ninth preferred embodiment of the present invention has been applied.

FIG. 34 is a functional block diagram showing the structure of a signal retrieval device to which the method of this ninth preferred embodiment of the present invention has been applied. With the signal retrieval device of this preferred embodiment, in the signal retrieval device according to the seventh preferred embodiment of the present invention, there are further comprised a database feature classification section 115, a selection threshold setting section 116, and a database feature selection section 117; and the device takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which been set in advance (this is termed the search threshold).

The database feature classification section 115 classifies each feature which has been produced in the processing which has been performed by the database feature extraction section 102 by repeating its operation while shifting the widow upon which attention is focused, based upon a distance which has been defined in advance, and determines upon a representative feature of the classified features. The selection threshold setting section 116 calculates a selection threshold for the distance which has been defined by the database feature classification section 115 from the search threshold which has been defined in advance. Furthermore, among the classifications which have been outputted from the database feature classification section 115, the database feature selection section 117 selects a feature included in the classification which is such that the distance from the feature which has been outputted from the query feature extraction section 01 satisfies the condition which has been produced from the selection threshold which has been outputted from the selection threshold setting section 116.

Next, the operation of the signal retrieval device of this preferred embodiment of the present invention will be explained with reference to FIG. 34 and FIGS. 44 through 47. First, since the procedures which are performed by the query feature extraction section 101 and the database feature extraction section 102 are the same as in the case of the seventh preferred embodiment which was described above, accordingly their explanation will be curtailed.

Figure 44:
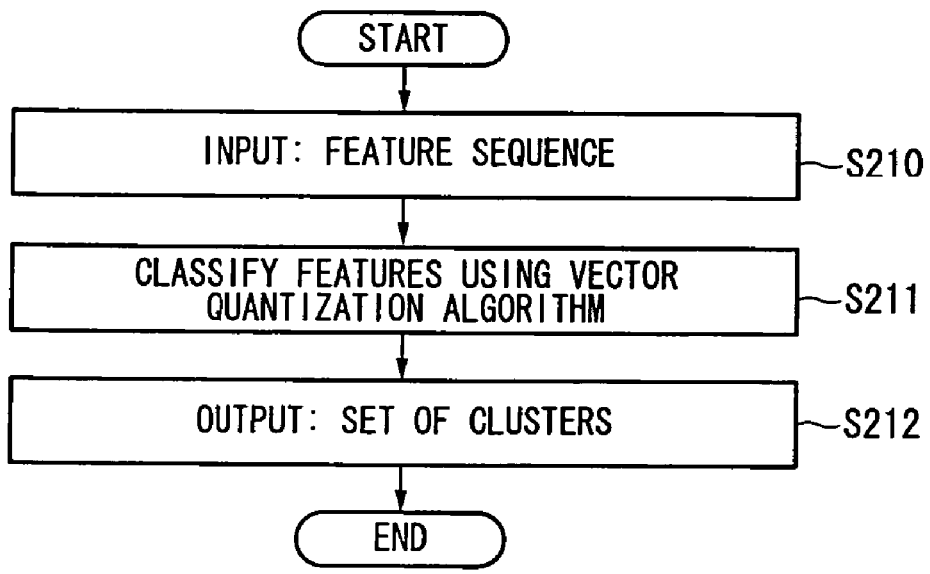
FIG. 44 is a flow chart showing the processing which is performed by a database feature classification section.

FIG. 44 is a flow chart showing the processing which is performed by the database feature classification section. Referring to this figure, the database feature classification section 115 reads in (in a step S210) the histogram sequences which have been outputted by the database feature extraction section 102 repeatedly performing its operation while shifting the widow upon which attention is focused. Next, the database feature classification section 115 classifies each of the histograms in this histogram sequence according to, for example, the Euclid distance (in a step S211). This classification of the histograms is performed by regarding each of the histograms as a vector having the dimensionality which is equal to the number of its bins, and by encoding these vectors utilizing vector quantization. For example, if the number of codewords employed for the vector quantization is 1024, then each of the histograms comes to be classified into some one of the 1024 sets (these are termed clusters). Each of the clusters is considered as being represented by a histogram (termed the centroid histogram) which is the centroid of the histograms which belong to that cluster. At this time, the clusters are constituted so that the sum of the distances between the histograms which belong to each of the clusters and its centroid histogram is a minimum, and moreover so that, for each of the histograms which belongs to each of the clusters, its distance from the centroid histogram of the cluster to which it belongs comes to be smaller than the distance from the centroid histogram of any other cluster. The database feature classification section 115 then outputs (in a step S212) the set of clusters which are the classifications of the histograms.

Figure 45:
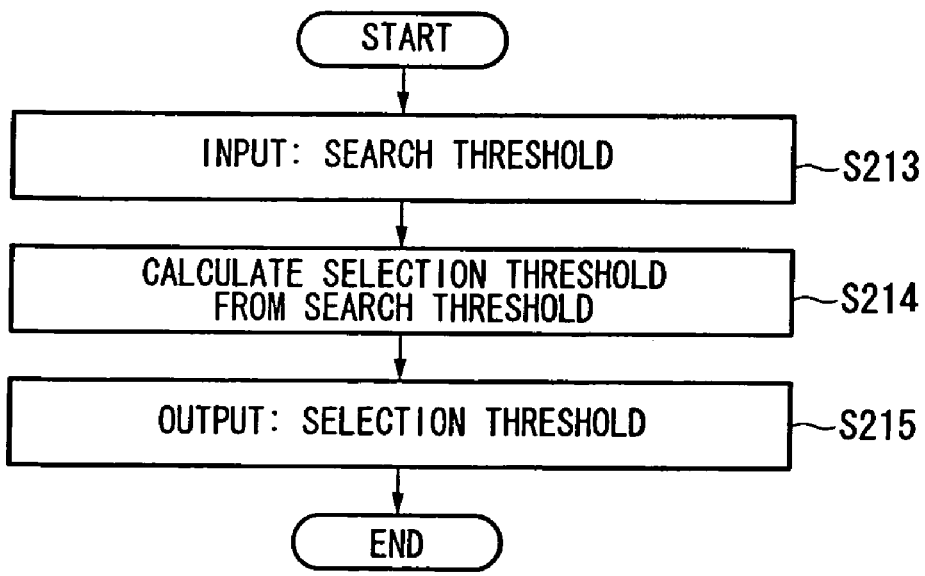
FIG. 45 is a flow chart showing the processing which is performed by a selection threshold setting section.

FIG. 45 is a flow chart showing the processing which is performed by the selection threshold setting section.

Next, referring to FIG. 45, the selection threshold setting section 116 reads in the search threshold $\theta_1$ (in a step S213), and calculates a selection threshold $\theta_2$ from this search threshold $\theta_1$ (in a step S214). Here by the selection threshold is meant, when a cluster is selected which has a possibility of including the DB histogram which corresponds to the signal to be retrieved, an upper limit for the distance between the query histogram and the cluster. If the distance measure which is employed when performing the matching is Euclid distance, then the selection threshold is the same as the search threshold. Since the measures which are employed for classification and for selection are mutually compatible, there are no cases of the occurrence of false dismissal. If the distance measure which is employed when performing the matching is Manhattan distance, then the selection threshold is set using the parameter p in the following manner:

$$\theta_2 = \frac{\theta_1}{\left(\sqrt{L}\right)^p} \quad (9)$$

The selectable region of the cluster becomes narrower asp is set larger. When p=0, the maximum value of the region is obtained for which it is theoretically possible to guarantee that no false dismissal will occur. Since actually hardly any false dismissals occur even if p is approximately 1, for example, the selection threshold may be calculated with p=1. The selection threshold setting section 116 then outputs (in a step S215) the selection threshold $\theta_2$.

Figure 46:
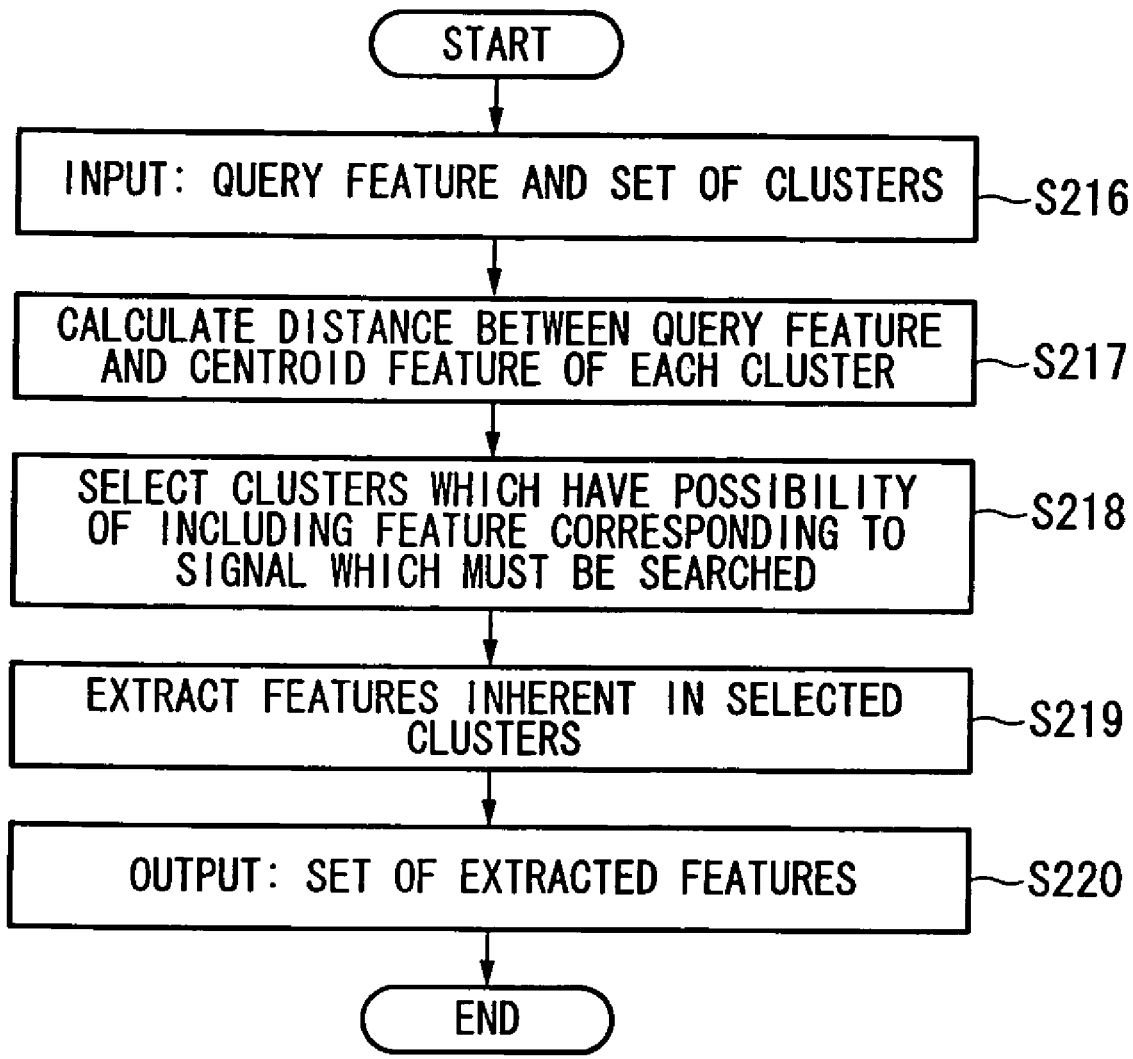
FIG. 46 is a figure showing the processing which is performed by a database feature selection section.

FIG. 46 is a figure showing the processing which is performed by the database feature selection section.

Next, referring to FIG. 46, the database feature selection section 117 reads in (in a step S216) the query histogram which is outputted from the query feature extraction section 101, the classification histograms (clusters) which are outputted from the database feature classification section 115, and the selection threshold which is outputted from the selection threshold setting section 116. Next, the database feature selection section 117 calculates the Euclid distance between the query histogram which has been read in and the centroid histogram of each cluster on the database signal side (in a step S217). Next, based upon these distances which it has calculated, the database feature selection section 117 selects (in a step S218) a cluster which is capable of including a histogram which corresponds to the signal to be searched for. The principle by which this is done will be explained below.

Figure 47:
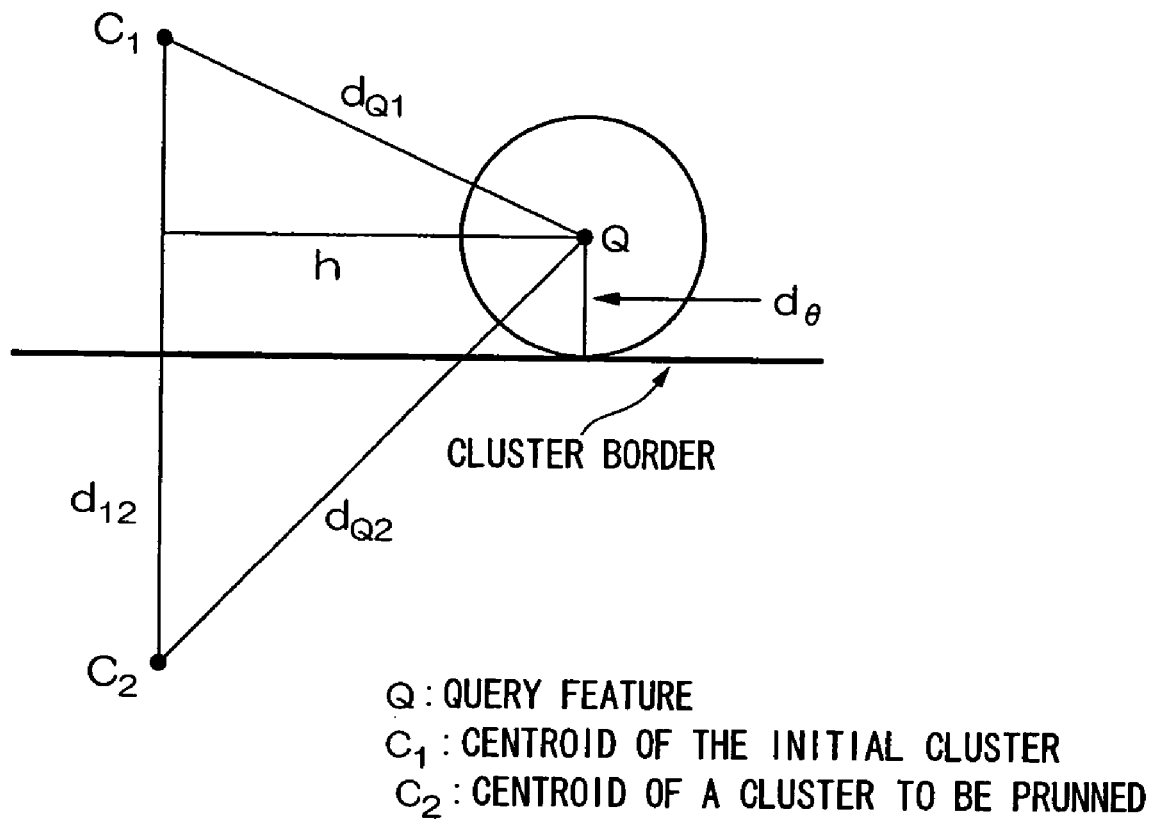
FIG. 47 is a figure showing the way in which a histogram space is defined.

Here, FIG. 47 is a figure showing the principle by which the histogram space. (in the above example, a space of 128 dimensions) is dissected upon a plane which includes three points Q, $C_1$, and $C_2$. Here, Q is the query histogram, $C_1$ is the centroid histogram of the cluster to which the histogram Q belongs, and $C_2$ is the centroid histogram of some other cluster, while $d_{Q1}$, $d_{Q2}$, and $d_{12}$ are, respectively, the distance between Q and $C_1$, the distance between Q and $C_2$, and the distance between $C_1$ and $C_2$. Here, if it is supposed that it is required to detect the location in the database signal which corresponds to the histogram whose distance from the histogram Q is less than d; then a histogram which is internal to the hypersphere (shown as a circle in FIG. 47) of radius d centered upon Q corresponds to the location in the database signal which it is required to detect. When the radius of the hypersphere centered upon Q becomes greater than $d_\theta$, then there is a possibility that the histogram which corresponds to the location in the database signal to be detected may be included among the histograms which belong to the cluster which is represented by $C_2$. Here, when the selection threshold $\theta_2$ has become greater than $d_\theta$, the cluster which is represented by $C_2$ is selected.

$d_{74}$ is obtained in the following manner. From FIG. 47, the following Equation holds:

$$h^2 = d_{Q1}^2 - \left(\frac{1}{2}d_{12} - d_\theta\right)^2 \qquad (10)$$
$$= d_{Q2}^2 - \left(\frac{1}{2}d_{12} + d_\theta\right)^2$$

From Equation (10):

$$d_\theta = \frac{d_{Q2}^2 - d_{Q1}^2}{2d_{12}} \qquad (11)$$

Accordingly, from Equation (11), when $$\frac{d_{Q2}^2 - d_{Q1}^2}{2d_{12}} \le \theta_2 \qquad (12)$$

holds, all the histograms which belong to the cluster which is represented by $C_2$ are selected (in a step S219). These steps are performed for all the clusters except for the one to which the histogram Q belongs, and the locations in the database signal which correspond to the histograms which are selected are outputted (in a step S220). The following procedures are only executed for the locations which are outputted by the database feature selection section 117.

Then, the segment extraction section 109 through the database feature compression section 111, the database feature partitioning section 103 through the signal detection decision section 108, and the distance re-calculation section 113 and the signal detection re-decision section 114 now perform their procedures. Note that, since these procedures which are performed by these sections are the same as in the case of the seventh preferred embodiment which was described above, accordingly their explanation will be curtailed. Note that, according to requirements, the distance re-calculation section 113 and the signal detection re-decision section 114 may be included, or, if they are not required, may not be included.

Next, the query feature compression section 112 reads in the locations in the database signal which have been outputted from the database feature selection section 117, the query histogram which is outputted from the query feature extraction section 101, and the set of linear mappings which are outputted from the compression mapping determination section 110. Next, the query feature compression section 112 performs mapping of the histograms to a corresponding subspace, using the linear mappings. The mappings are used at the locations which are outputted from the database feature selection section 117. It is sufficient only to perform this for the linear mappings; it is not necessary to do so for all of the linear mappings. By doing this, a noteworthy benefit is obtained with regard to reduction of the processing time.

The Tenth Preferred Embodiment

Next, a tenth preferred embodiment of the present invention will be explained with reference to the drawings.

Figure 35:
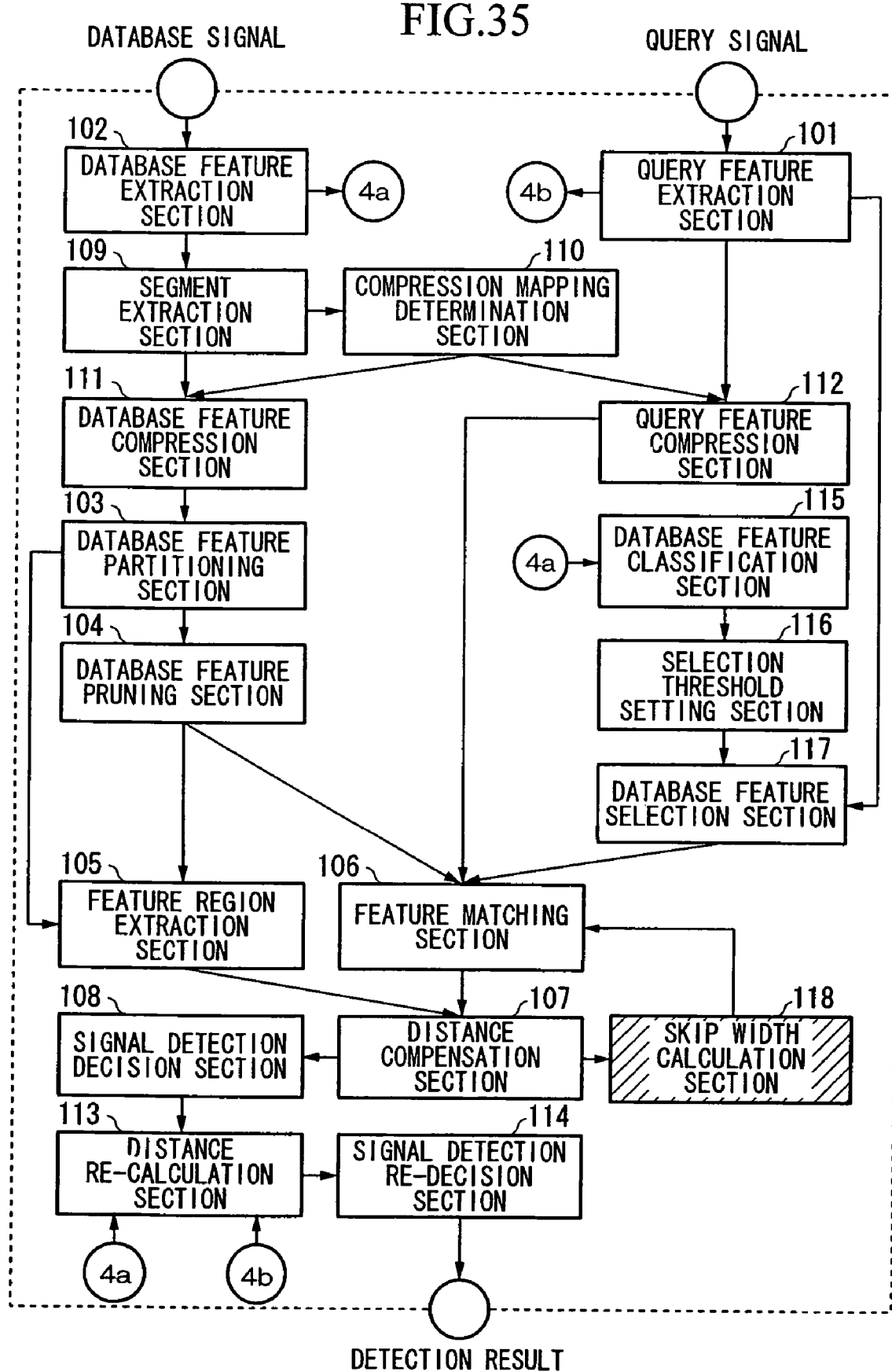
FIG. 35 is a figure showing a functional block of a signal retrieval device to which the signal retrieval method according to the tenth preferred embodiment of the present invention has been applied.

FIG. 35 is a functional block diagram showing the structure of a signal retrieval device to which the method of this tenth preferred embodiment of the present invention has been applied. With the signal retrieval device of this preferred embodiment, in the signal retrieval device according to the ninth preferred embodiment of the present invention, there is further comprised a skip width calculation section 118; and it takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which been set in advance (this is termed the search threshold).

The skip width calculation section 118 calculates the skip width for the window upon which attention is focused based upon the distance which is outputted from the distance compensation section 107, and shifts the window upon which attention is focused by this skip width. Note that the actual details of the operation of the skip width calculation section 118 are the same as in the case of the third preferred embodiment described above, and accordingly they have been curtailed herein.

Results of Actual Experiments

Next, actual experimental results which were obtained during the operation of a signal retrieval device according to this preferred embodiment of the present invention will be explained.

Here, the conditions of the experiments were the same as for the seventh preferred embodiment described above. As another parameter, the number of clusters was set to 1024.

Figure 50:
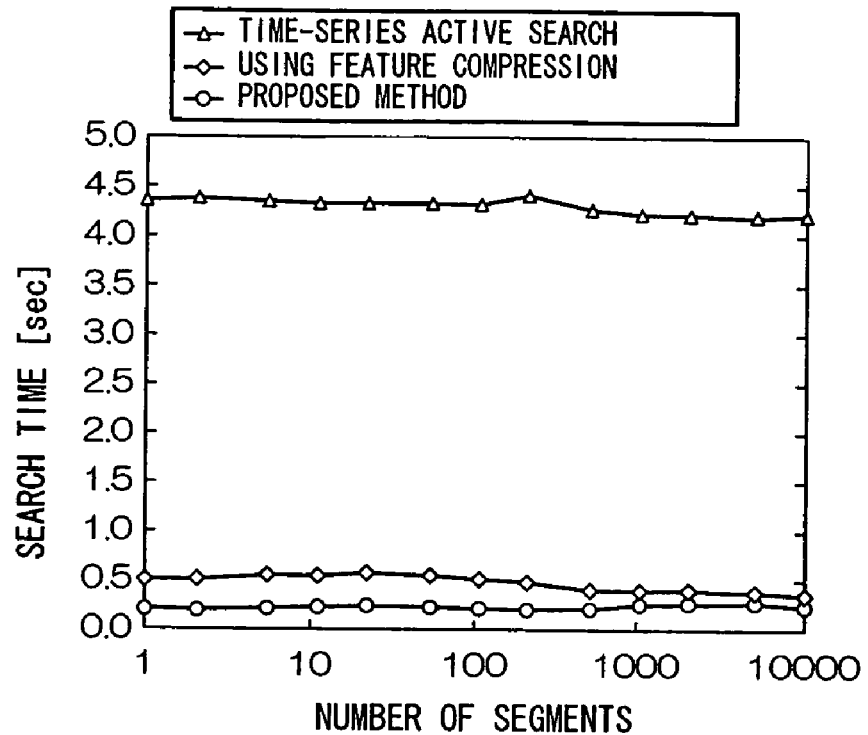
FIG. 50 is a fifth explanatory figure showing the results of certain experiments.
Figure 51:
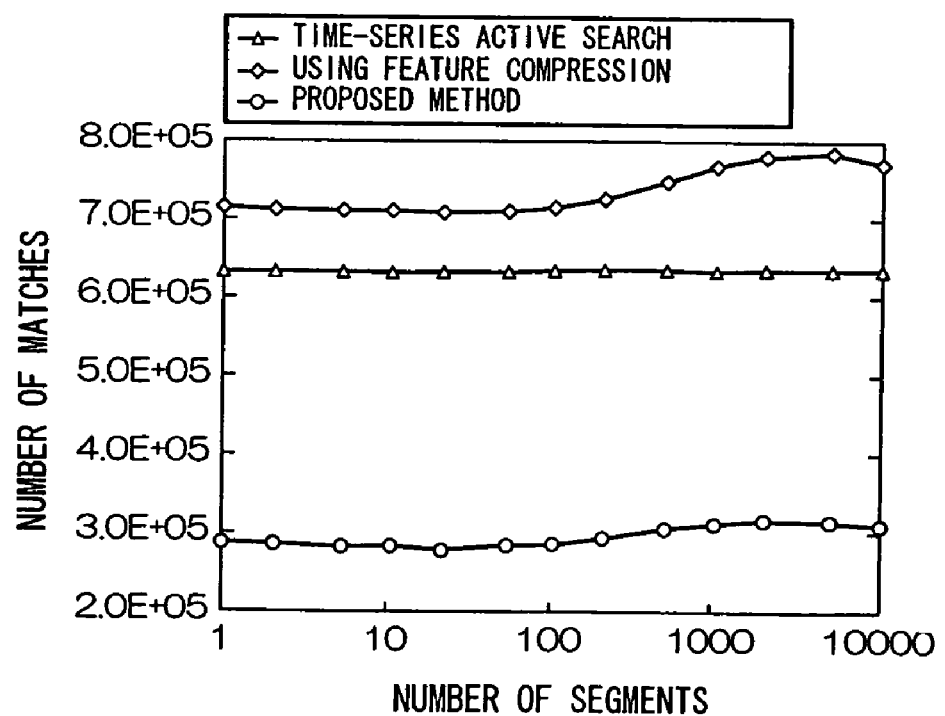
FIG. 51 is a sixth explanatory figure showing the results of certain experiments.

The results of these experiments are shown in FIG. 50 and FIG. 51. FIG. 50 is a fifth explanatory figure showing the experimental results. In addition, FIG. 51 is a sixth explanatory figure showing the experimental results. The number of segments is, in each case, shown along the horizontal axis; and in FIG. 50 the time period which was required for the retrieval is shown along the vertical axis, while in FIG. 51 the number of matches is shown along the vertical axis. When the number of segments was taken as 10,000, with the method of this preferred embodiment, the time period which was required for the retrieval was 0.234 seconds and the number of matches was 305,351; while, with a method in which only feature compression was implemented ("using feature compression"), the time period which was required for the retrieval was 0.364 seconds and the number of matches was 772,784; and, with a conventional method ("Time-Series Active Search"), the time period which was required for the retrieval was 4.218 seconds and the number of matches was 633,047.

The Eleventh Preferred Embodiment

Next, an eleventh preferred embodiment of the present invention will be explained with reference to the drawings.

Figure 36:
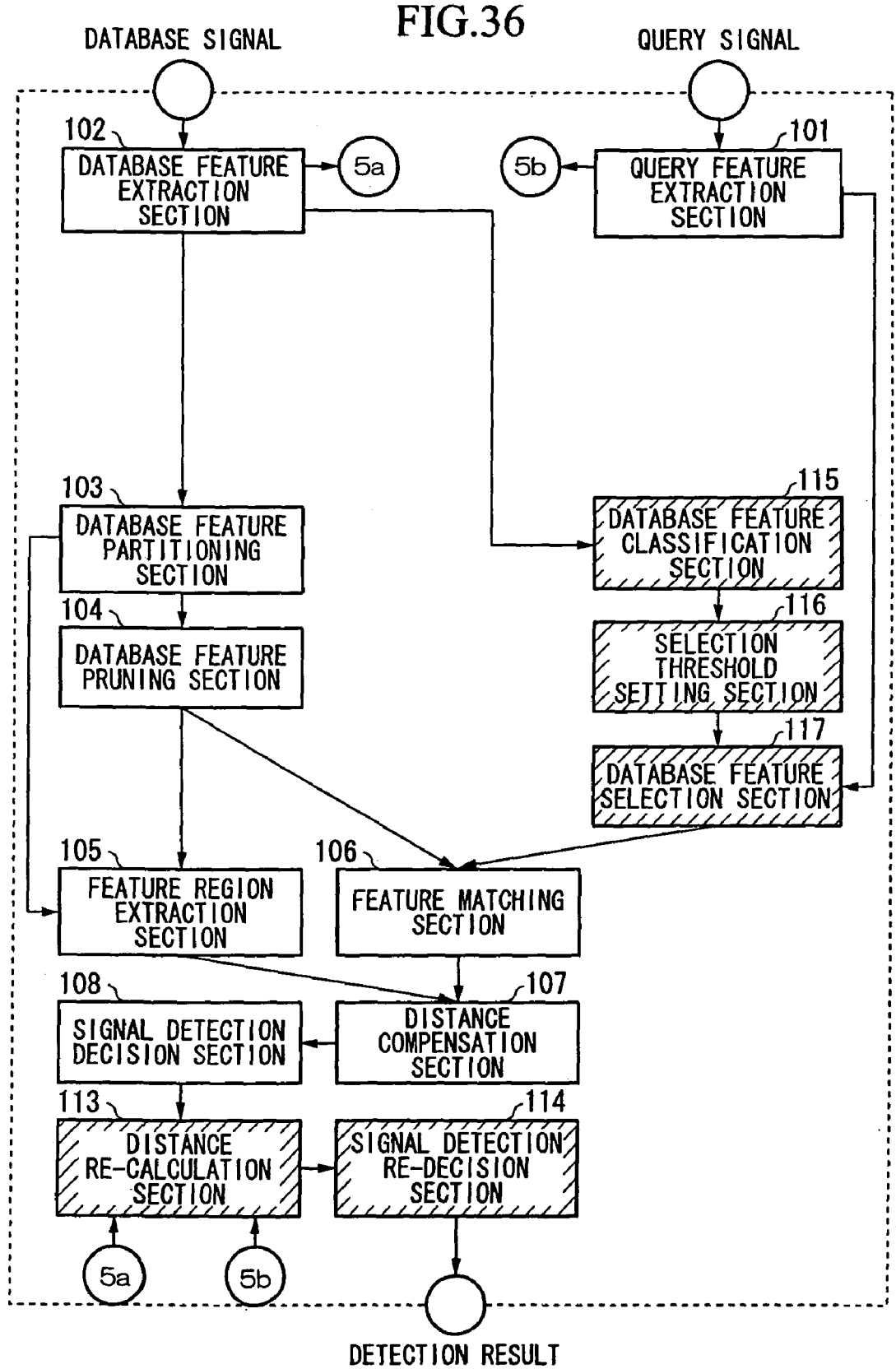
FIG. 36 is a figure showing a functional block of a signal retrieval device to which the signal retrieval method according to the eleventh preferred embodiment of the present invention has been applied.

FIG. 36 is a functional block diagram of a signal retrieval device to which the method of this eleventh preferred embodiment has been applied. With the signal retrieval device of this preferred embodiment, in the signal retrieval device according to the fifth preferred embodiment of the present invention, there are further comprised a distance re-calculation section 113, a signal detection re-decision section 114, a database feature classification section 115, a selection threshold setting section 116, and a database feature selection section 117; and the device takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which has been set in advance (this is termed the search threshold).

Note that, with regard to the procedures performed by this preferred embodiment, after the procedure which is performed by the query feature extraction section 101 and the procedure which is performed by the database feature extraction section 102 have been completed in the manner described above in connection with the fifth preferred embodiment, then the steps S210 through S212 of the procedure which is performed by the database feature classification section 115, the steps S213 through S215 of the procedure which is performed by the selection threshold setting section 116, and the steps S216 through S220 of the procedure which is performed by the database feature selection section 117 are performed in the manner described above in connection with the ninth preferred embodiment.

Next, the steps S164 through S166 of the procedure which is performed by the database feature partitioning section 103, the steps S167 through S170 of the procedure which is performed by the database feature pruning section 104, and the steps S171 through S173 of the procedure which is performed by the feature region extraction section 105 are performed in the manner described above in connection with the fifth preferred embodiment. Next, the feature matching section 106 reads in the representative feature sequence which is outputted from the database feature pruning section 104 and the query feature which is outputted from the database feature selection section 117, and the procedures shown in the steps S174 through S176 are performed. Subsequently, the steps S177 through S179 of the procedure which is performed by the distance compensation section 107 and the procedure which is performed by the signal detection decision section 108 are performed in the manner described above in connection with the fifth preferred embodiment, and the procedures which are performed by the distance re-calculation section 113 and by the signal decision re-decision section 114 are performed in the manner described above in connection with the seventh preferred embodiment. Note that, according to requirements, the distance re-calculation section 113 and the signal detection re-decision section 114 may be included, or, if they are not required, may not be included.

The Twelfth Preferred Embodiment

Next, a twelfth preferred embodiment of the present invention will be described in detail with reference to the figures.

Figure 37:
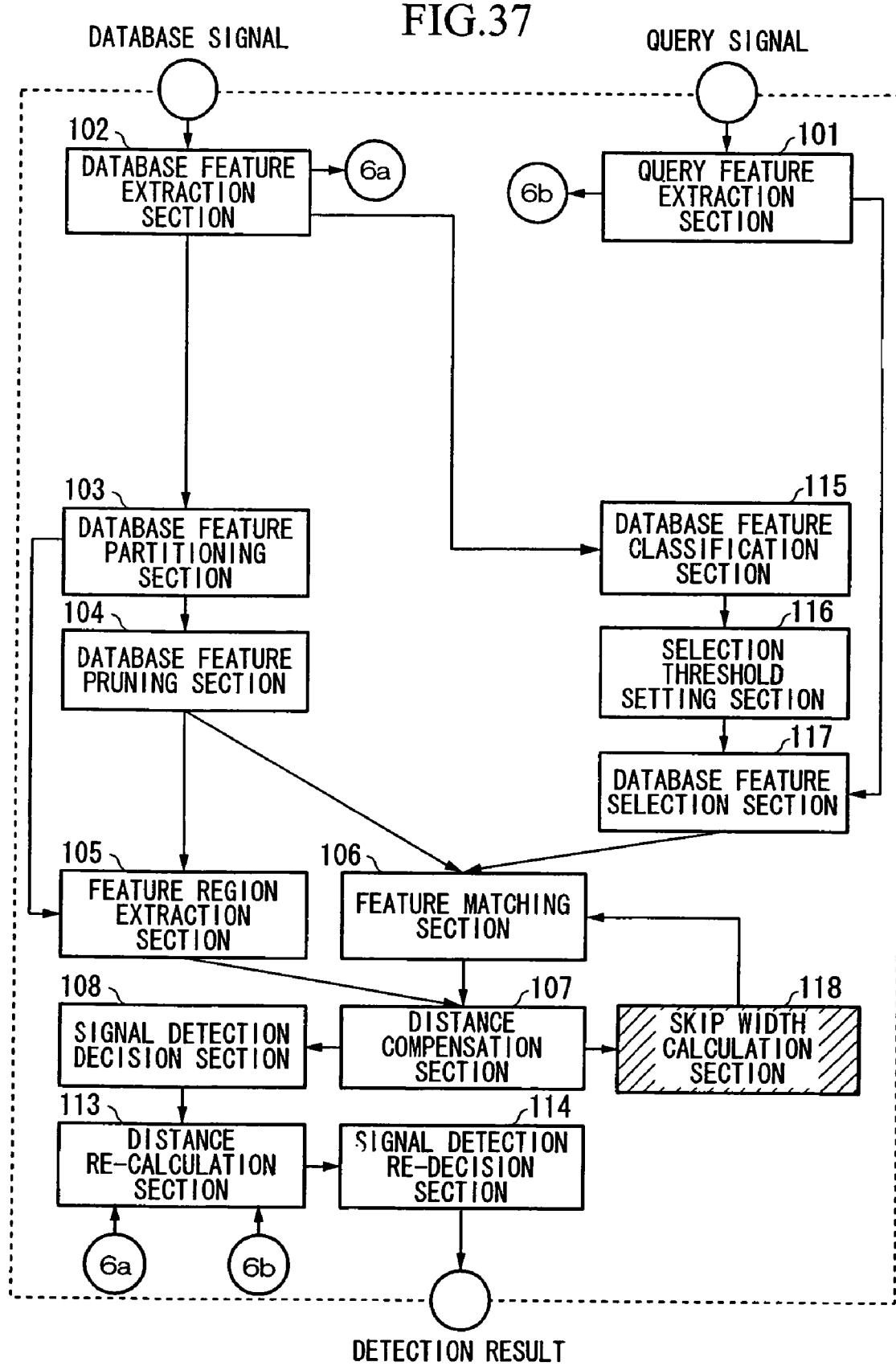
FIG. 37 is a figure showing a functional block of a signal retrieval device to which the signal retrieval method according to the twelfth preferred embodiment of the present invention has been applied.

FIG. 37 is a figure showing functional blocks of a signal retrieval device to which a method according to the twelfth preferred embodiment has been applied. The signal retrieval device of this preferred embodiment is constructed by further adding a skip width calculation section 118 to the signal retrieval device of the eleventh preferred embodiment, and takes as its input a query signal, in other words an audio signal which has been retrieved and which serves as a pattern or sample, and a database signal, in other words an audio signal which is retrieved, and outputs a location in the database signal at which the distance from the query signal is less than a value $\theta_1$ which has been set in advance (this is termed the search threshold value).

Here, the skip width calculation section 118 calculates a skip width for the window upon which attention is focused which is set for the sequence of DB histograms which is outputted from the database feature extraction section 102, based upon the distance which has been outputted from the distance compensation section 107, and shifts the window upon which attention is focused by this skip width. The other processing steps which are performed are the same as in the case of the eleventh preferred embodiment described above.

The Thirteenth Preferred Embodiment

Next, a thirteenth preferred embodiment of the present invention will be explained with reference to the drawings.

Although this preferred embodiment is able to deal with various different types of object signal for processing, here, by way of example, an audio signal will be considered as the object signal for processing.

Figure 52:
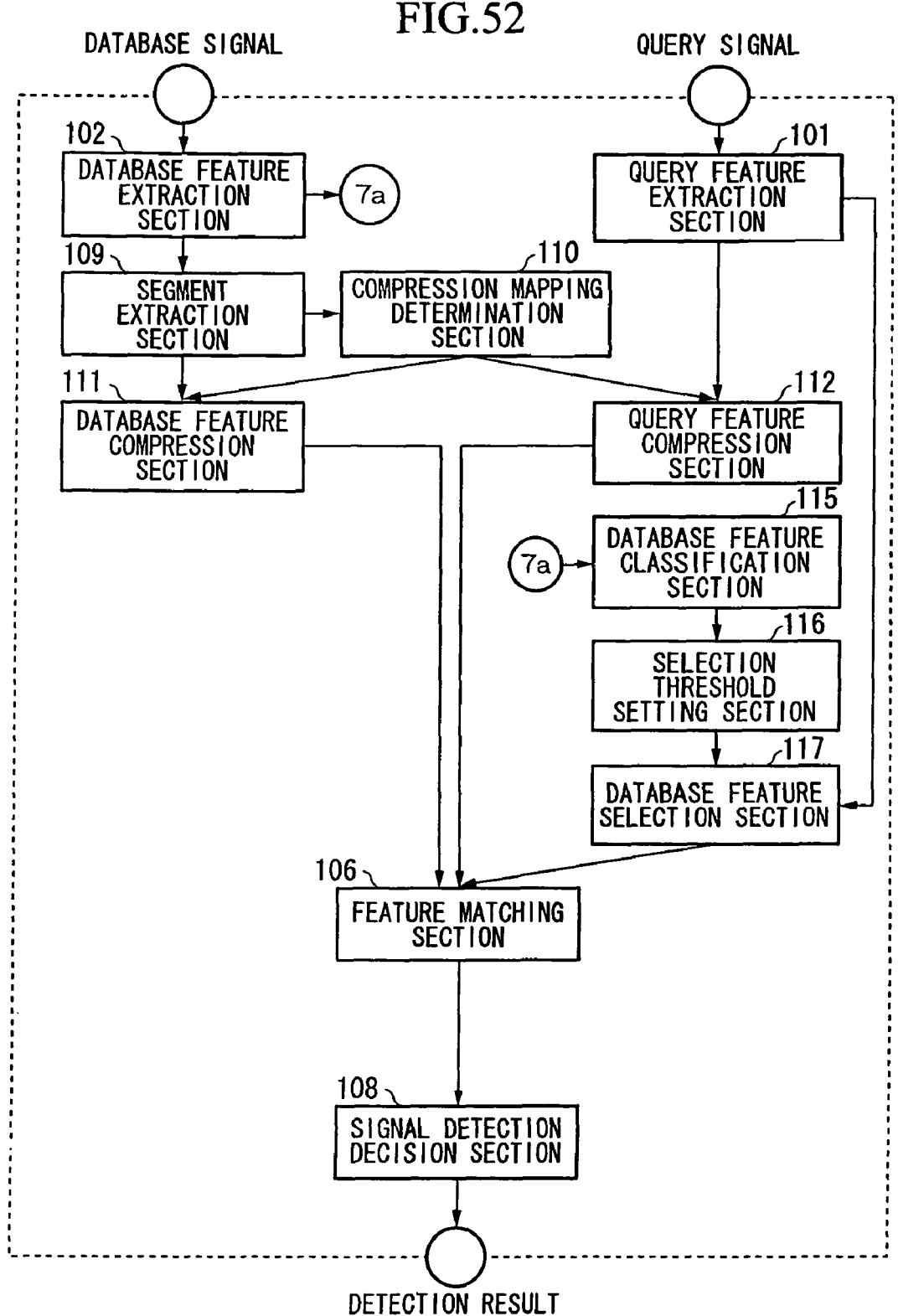
FIG. 52 is a figure showing a functional block of a signal retrieval device to which the method according to the thirteenth preferred embodiment of the present invention has been applied.

FIG. 52 is a functional block diagram showing the structure of a signal retrieval device to which the method of this thirteenth preferred embodiment has been applied. Referring to this figure, the signal retrieval device of this preferred embodiment comprises a query feature extraction section 101, a database feature extraction section 102, a database feature classification section 115, a selection threshold setting section 116, a database feature selection section 117, a segment extraction section 109, a compression mapping determination section 110, a database feature compression section 111, a query feature compression section 112, a feature matching section 106, and a signal detection decision section 8.

The signal retrieval device shown in FIG. 52 takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which been set in advance (this is termed the search threshold).

Note that the query feature extraction section 101 produces features from the query signal. The database feature extraction section 102 sets the window in the database signal upon which attention is focused, and produces features while shifting this window upon which attention is focused. Furthermore, the database feature classification section 115 classifies the features which have been produced by repeatedly performing the procedure which is performed by the database feature extraction section 102 while shifting the window upon which attention is focused, based upon a distance which is defined in advance, and determines upon the representative feature of this classification. The selection threshold setting section 116 calculates a selection threshold for the distance which has been defined by the database feature classification section 115 from the search threshold which has been defined in advance. Then the database feature selection section 117, for the classification which has been outputted from the database feature classification section 115, selects a feature which is included in the classification so that the distance from the feature which has been outputted from the query feature extraction section 101 satisfies the condition which is produced from the selection threshold which has been outputted from the selection threshold setting section 116.

Furthermore, the segment extraction section 109 extracts a segment, which is a sub-sequence, by segmenting the feature sequence which has been produced by repeatedly performing the procedure of the database feature extraction section 102 while shifting the window upon which attention is focused. The compression mapping determination section 110 determines, from each segment which has been outputted from the segment extraction section 109, upon a mapping for calculation of a feature of lower dimensions than the feature. The database feature compression section 111 calculates a feature of lower dimensions than the feature, which corresponds to the segment which has been outputted from the segment extraction section 109, based upon the mapping which has been outputted from the compression mapping determination section 110. The query feature compression section 112 calculates a feature of lower dimensions than the feature, which corresponds to the feature which has been outputted from the query feature extraction section 101, based upon the mapping which has been outputted from the compression mapping determination section 110.

Furthermore, the feature matching section 106 calculates the distance between the compressed feature sequence which has been outputted from the database feature compression section 111 and the compressed feature sequence which has been outputted from the query feature compression section 112, for the location within the database signal which has been outputted from the database feature selection section 117. The signal detection decision section 108 determines whether or not the query signal is present at the location within the database signal, by comparing together the distance which has been outputted from the feature matching section 106 and a search threshold, which is a threshold which corresponds to the distance.

Figure 55:
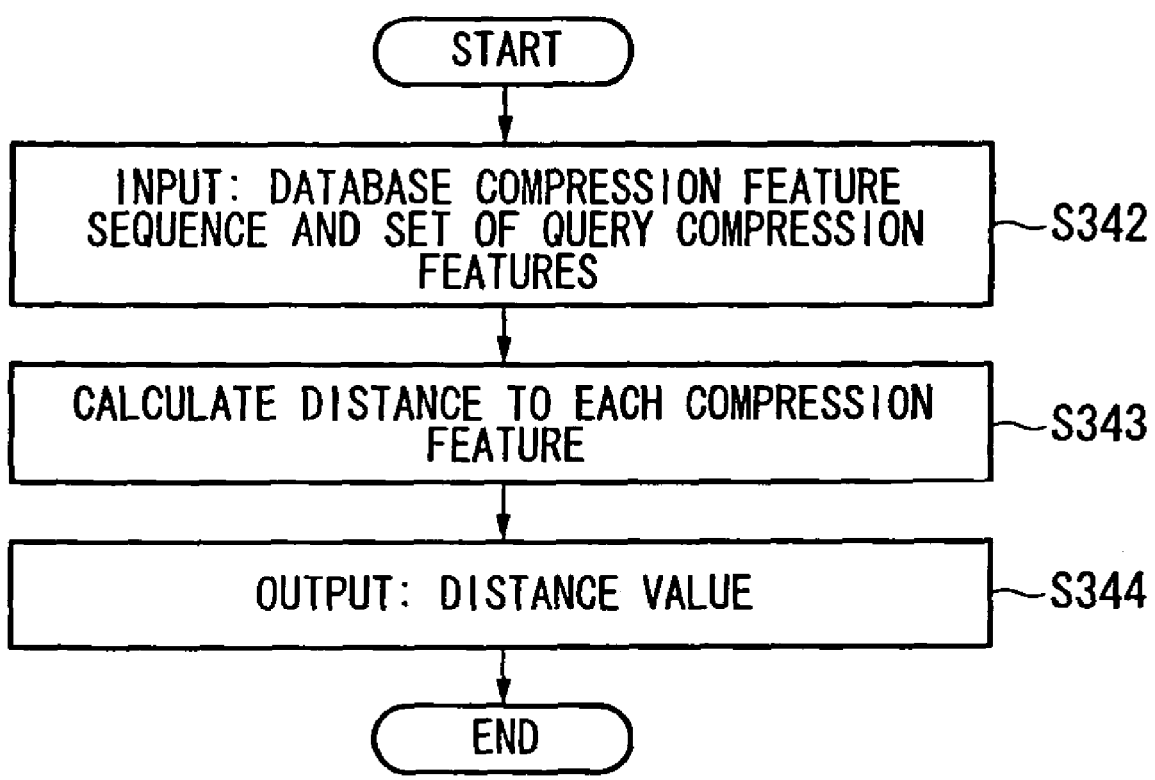
FIG. 55 is a third flow chart showing the processing which is performed by a feature matching section.

Next, the operation of the signal retrieval device of this preferred embodiment will be explained with reference to FIGS. 52 and 55.

The procedures which are performed by the query feature extraction section 101 and the database feature extraction section 102 are the same as in the case of the second preferred embodiment which was described above. In addition, the procedures which are performed by the database feature classification section 115, the selection threshold setting section 116, and the database feature selection section 117 are the same as in the case of the ninth preferred embodiment which was described above. Moreover, the procedure which is performed by the segment extraction section 109 is the same as in the case of the sixth preferred embodiment which was described above. Yet further, the procedures which are performed by the compression mapping determination section 110, the database feature compression section 111, the feature matching section 106, and the signal detection section 108 are the same as in the case of the second preferred embodiment which was described above. Finally, the procedure which is performed by the query feature compression section 112 is the same as in the case of the ninth preferred embodiment which was described above.

The Fourteenth Preferred Embodiment

Next, a fourteenth preferred embodiment of the present invention will be explained with reference to the drawings.

Figure 53:
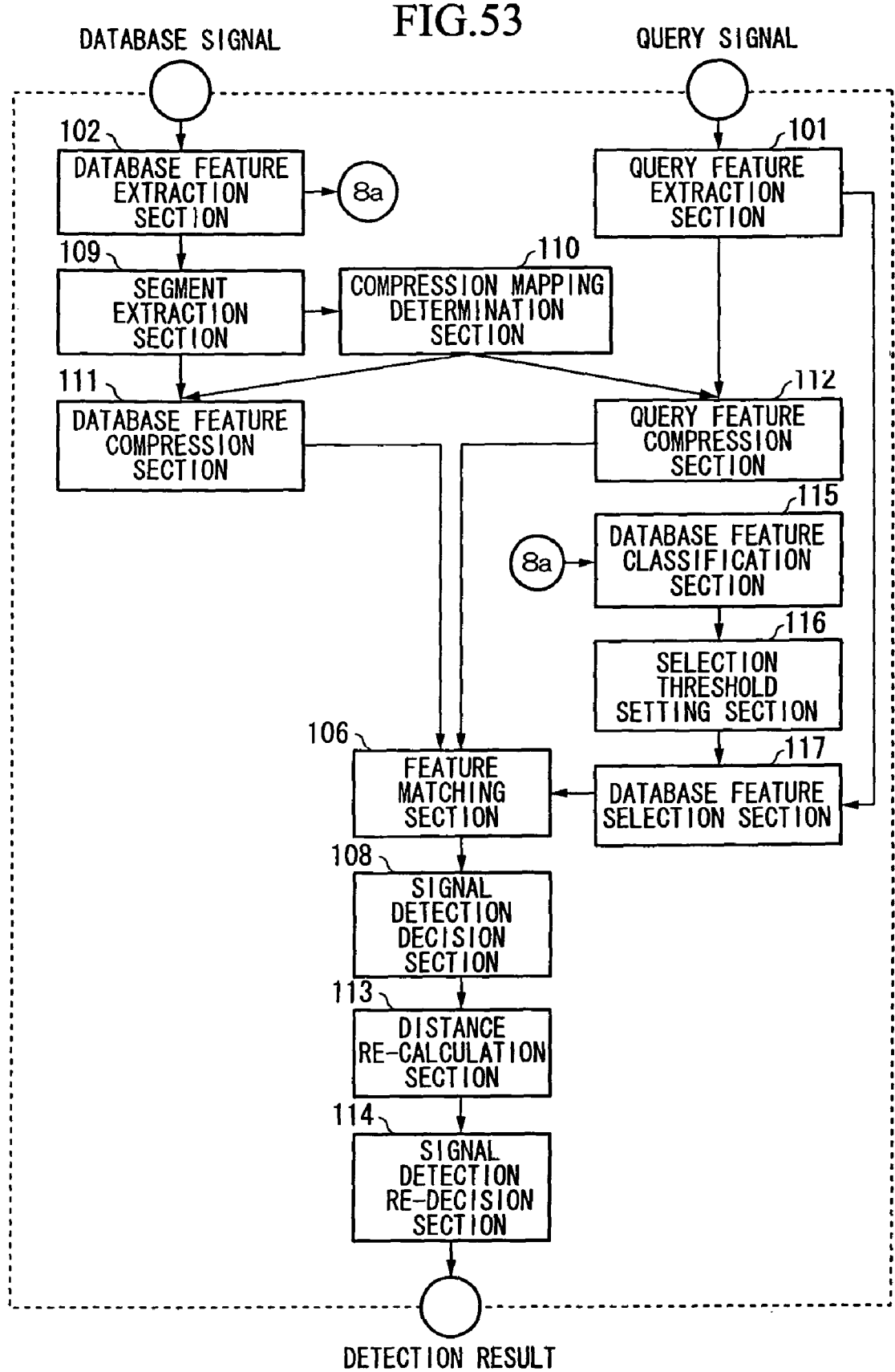
FIG. 53 is a figure showing a functional block of a signal retrieval device to which the method according to the fourteenth preferred embodiment of the present invention has been applied.

FIG. 53 is a functional block diagram showing the structure of a signal retrieval device to which the method of this fourteenth preferred embodiment has been applied.

With the signal retrieval device of this preferred embodiment, in the signal retrieval device according to the thirteenth preferred embodiment, there are further comprised a distance re-calculation section 113 and a signal detection re-decision section 114; and the device takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which been set in advance (this is termed the search threshold).

Here, for the location in the database signal at which it has been decided by the signal detection decision section 108 that the query signal is present, the distance re-calculation section 113 calculates the distance between the feature sequence which has been outputted from the query feature extraction section 101 and the feature sequence which has been outputted from the database feature extraction section 102. By comparing together the distance which has been outputted from the distance re-calculation section 113 and the search threshold, the signal detection re-decision section 114 re-determines whether or not the query signal is present at the location of the database signal.

Note that the procedures which are performed by the distance re-calculation section 113 and by the signal detection re-decision section 114 are the same as in the case of the fourth preferred embodiment described above, and accordingly their description will be curtailed.

Furthermore, since the procedures which are performed by the query feature extraction section 101, the database feature extraction section 102, the database feature classification section 115, the selection threshold setting section 116, the database feature selection section 117, the segment extraction section 109, the compression mapping determination section 110, the database feature compression section 111, the query feature compression section 112, the feature matching section 106, and the signal detection decision section 108 are the same as in the case of the thirteenth preferred embodiment described above, therefore their description will be curtailed.

The Fifteenth Preferred Embodiment

Next, a fifteenth preferred embodiment of the present invention will be explained with reference to the drawings.

Figure 54:
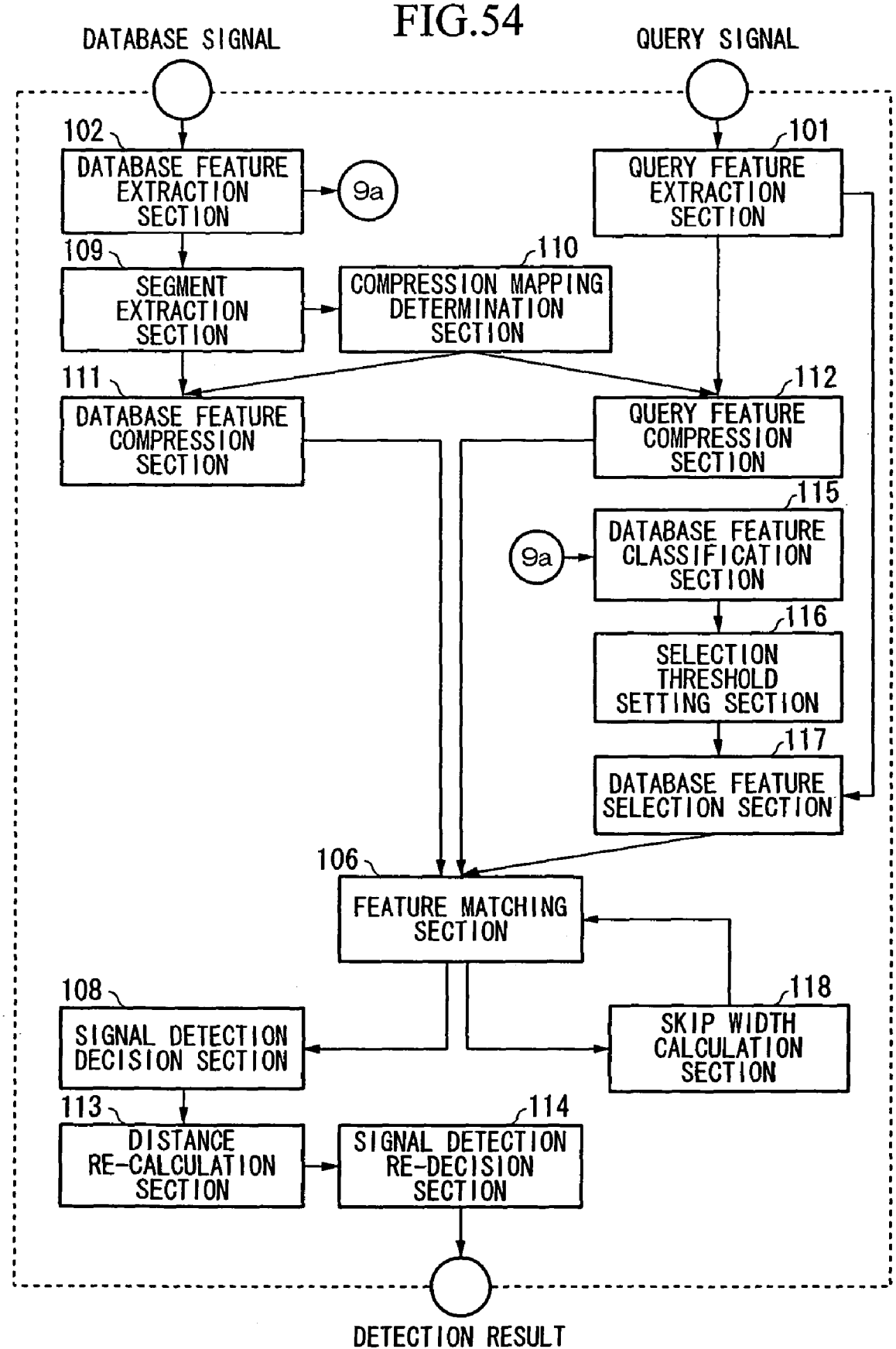
FIG. 54 is a figure showing a functional block of a signal retrieval device to which the method according to the fifteenth preferred embodiment of the present invention has been applied.

FIG. 54 is a functional block diagram showing the structure of a signal retrieval device to which the method of this fifteenth preferred embodiment has been applied. With the signal retrieval device of this preferred embodiment, in the signal retrieval device according to the fourteenth preferred embodiment of the present invention, there is further comprised a skip width calculation section 118; and the device takes as its input a query signal, in other words an audio signal which it is desired to retrieve for serving as a pattern or sample, and a database signal, in other words an audio signal which is retrieved, and the device outputs the location within the database signal for which the distance from the query signal is less than a value $\theta_1$ which been set in advance (this is termed the search threshold).

The skip width calculation section 118 calculates the skip width for the window upon which attention is focused based upon the distance which has been outputted from the feature matching section 106, and shifts the window upon which attention is focused by this skip width.

Next, the processing which is performed by the signal retrieval device of this preferred embodiment will be explained.

First, since the processing which is performed by the query feature extraction section 101, the database feature extraction section 102, the database feature classification section 115, the selection threshold setting section 116, the database feature selection section 117, the segment extraction section 109, the compression mapping determination section 110, the database feature compression section 111, and the query feature compression section 112, and the processing which is performed by the feature matching section 106, the signal detection decision section 108, the distance re-calculation section 113, and the signal detection re-decision section 114 are the same as in the thirteenth and the fourteenth preferred embodiments described above, the explanation thereof will be curtailed. Furthermore, the processing which is performed by the skip width calculation section 118 is the same as that performed in the third preferred embodiment described above.

Results of Actual Experiments

Next, actual experimental results which were obtained during the operation of a device to which the preferred embodiment of the present invention was applied will be explained.

In order to check upon the beneficial effects of the present invention, first, a histogram which was made from about 10 hours of audio signal was taken as a database signal, and investigation was performed of the file size, the time period for search, and the number of feature matches when compression features had been written into the file. The parameters of the search were: audio signal sampling frequency=33 kHz; dimensionality of the feature vector=7; time width of the feature vector=60 msec; time resolution for the feature vector=10 msec; dimensionality of the histogram=128; width of the time window=15 sec; contribution threshold=0.9; number of segments=200; and search threshold=85. In the feature pruning, sequence partitioning was performed by equi-segmentation, and the tops of the sub-histogram sequences were employed as representative features just as they were. The distance measure for the matching was Euclid distance.

Figure 56:
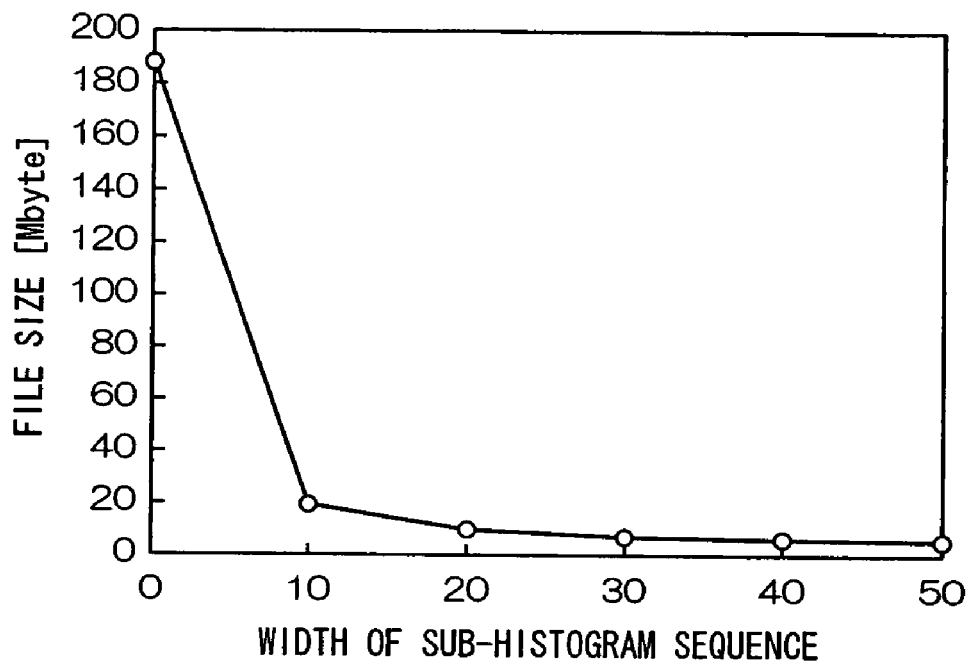
FIG. 56 is a seventh explanatory figure showing the results of certain experiments.
Figure 57:
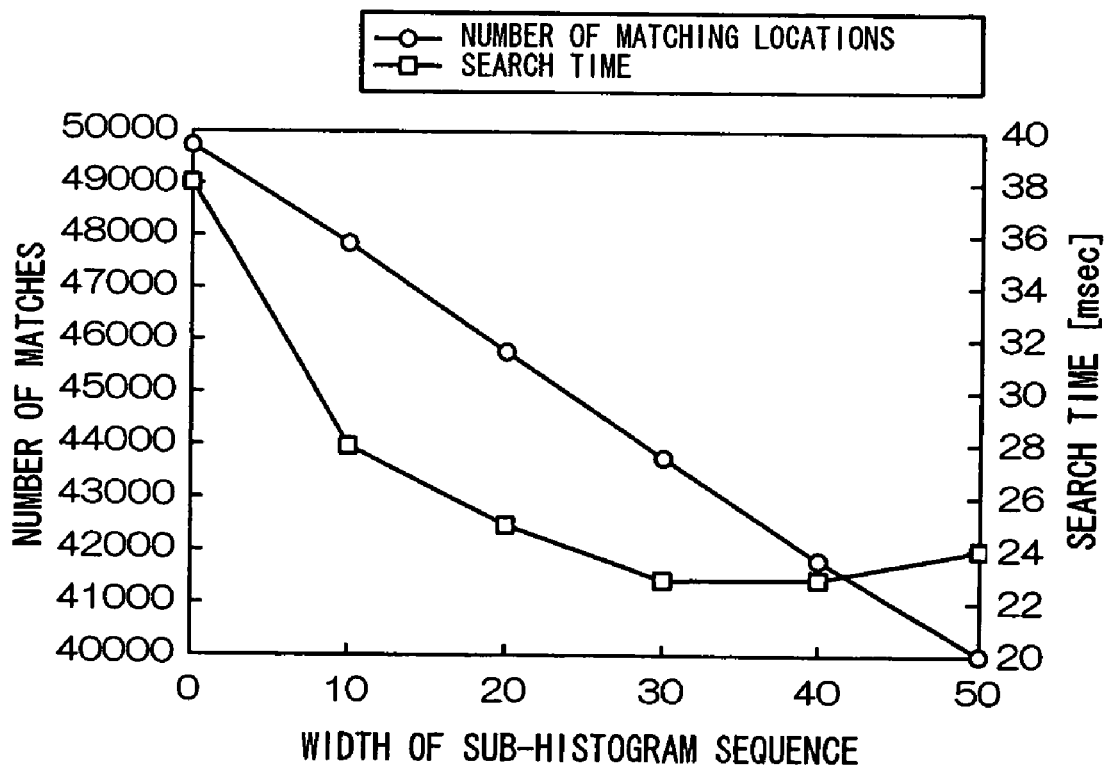
FIG. 57 is an eighth explanatory figure showing the results of certain experiments.

FIG. 56 is a seventh explanatory figure showing the experimental results. FIG. 57 is a ninth explanatory figure showing the experimental results. The experimental results when the width of the sub-histogram sequences was varied from 10 to 50 by steps of 10 are shown in FIG. 56 and FIG. 57. In both cases, the width a of the sub-histogram sequences is shown along the horizontal axes of the graphs, while in FIG. 56 the file size is shown along the vertical axis, and in FIG. 57, the number of matching locations is shown along the vertical axis on the left hand side and the time period for the search is shown along the vertical axis on the right hand side. The case a=0 means that the method of the present invention is not being employed.

As can be understood from FIG. 56 and FIG. 57, it is possible to monotonically reduce the file size and the number of matching locations by increasing the width of the sub-histogram sequences. Furthermore, as can be understood from FIG. 57, the search time is also reduced along with reduction of the number of matching locations. The fact that the search time changes over to increasing at the boundary where a=40 is because the number of locations at which it is necessary to perform re-matching for the histograms increases due to the range over which features are present being magnified.

Due to the above, it is considered that a=40 is the width of the most suitable sub-histogram sequence, and the file size at this time was 5.8 megabytes (about 1/30 of the value when the present invention was not employed), the search time was 23 msec (about 60% of the value when the present invention was not employed), and the number of matching locations was 41,855 (about 85% of the value when the present invention was not employed).

As has been explained, according to the present invention, the benefit is obtained that, by performing the compression in the time domain while pruning the features of the database signal in advance, it is possible to greatly reduce the number of indices while ensuring that false dismissal do not occur, so that, in comparison with well-known methods, it is possible to perform signal retrieval at higher speed.

Note that it would also be possible to perform the signal compression procedure or the signal retrieval procedure by recording a program for implementing the function of each of the processing sections in FIGS. 1 through 4 upon a recording medium capable of being read in by a computer system, and by causing this program which has been recorded upon the recording medium to be read in by a computer system, thus causing the program to be executed. Note that, by the term "computer system", it is intended to include an operating system and hardware such as various peripheral devices. Furthermore, in the case of utilization of the WWW system, the term "computer system" is intended also to encompass a presentation environment (or a display environment) for a home page. Yet further, the term "recording medium capable of being read in by a computer system" is intended to encompass an item of transportable media such as a flexible disk, an opto-magnetic disk, a ROM, a CD-ROM or the like, or a storage device provided within a computer system such as a hard disk or the like. Even further, the term "recording medium capable of being read in by a computer system" is also intended to include the case in which the program is retained for a certain time period, such as the case in which, when the program is transmitted via a network such as the Internet or the like, or via a transmission line such as a telephone line or the like, it is held in a volatile memory (RAM) within a computer system which functions as a server or a client.

Furthermore, the above described program may be one for implementing only a portion of the above described function. Yet further, it would be acceptable to implement the above described function via a differential file (a differential program) which was able to do so in combination with a program which was already recorded in a computer system.

What is claimed is:

1. A signal compression method for compressing an original video signal which has been provided in advance and which is represented as a sequence of multi-dimensional vectors to convert the original signal into a compressed signal, comprising:

an initial sub-signal creation step of creating sub-signals by dividing the original signal into the sub-signals in a time domain so as not to overlap with each other, wherein the original video signal represents a sequence of images of a physical domain captured by an imaging device;

a created sub-signal selection step of, for each of the sub-signals which have been produced by the initial sub-signal creation step, setting a segmentation boundary shiftable range which includes a segmentation boundary between the sub- signals produced by the initial sub-signal creation step, calculating an average value of dimensionality of compressed signals which are obtained from the sub-signals produced by the initial sub-signal creation step, and extracting segmentation boundary candidates from the segmentation boundary shiftable range, the average value of dimensionality of compressed signals which are obtained from sub-signals which are determined by each of the segmentation boundary candidates being smaller than the average value of dimensionality of the compressed signals which are obtained from the sub-signals produced by the initial sub-signal creation step;

a sub-signal re-creation step of determining upon a created sub-signal which is actually to be used, using the segmentation boundary candidates which have been produced by the created sub-signal selection step;

a compression mapping determination step of determining, from only the respective sub-signals which have been produced by the sub-signal re-creation step, different mappings for calculation of a compressed signal corresponding to the respective sub-signals; and a signal compression step of calculating a compressed signal which corresponds to each of the sub-signals which have been obtained by the sub-signal re- creation step, based upon the mappings which have been obtained by the compression mapping determination step, to reduce the dimensionality of each of the multi-dimensional vectors in each unit time.

2. A signal compression method as described in claim 1, wherein the signal compression step comprises:
   a signal mapping step of mapping each of the sub-signals which have been obtained by the sub-signal re-creation step by the mappings which have been obtained by the compression mapping determination step;
   a projection distance calculation step of calculating the distance between the sub-signal after the mapping which has been obtained by the signal mapping step and the sub-signal which has been obtained by the sub-signal re-creation step; and
   a compressed feature creation step of creating the compressed signal from the respective sub-signals after mapping which have been produced by the signal mapping step and the projection distance which has been produced by the projection distance calculation step.

3. A signal compression method as described in claim 1, wherein the initial sub-signal creation step segments the original signal from the beginning of the original signal, and takes the sub-signal after the segmentation as its resulting sub-signal.

4. A signal compression method as described in claim 3, wherein the created sub-signal selection step and the sub-signal re-creation step determine segmentation boundaries in order from the beginning of the original signal.

5. A signal compression method as described in claim 3, wherein the created sub-signal selection step and the sub-signal re-creation step set a segmentation boundary shiftable width which is determined in advance, and, taking the segmentation boundary which has been obtained by the initial sub-signal creation step as a reference, determine segmentation boundaries which minimize the amount of the data of the compressed signal within the segmentation boundary shiftable range having the segmentation boundary shiftable width on both sides of the center thereof.

6. A signal compression method as described in claim 3, wherein the created sub-signal selection step shifts the segmentation boundaries to some locations and calculates compression ratios, and, based upon the results thereof, selects a range in which the segmentation boundaries which minimize the amount of the data of the compressed signal can exist.

7. A signal compression method as described in claim 6, wherein the created sub-signal selection step automatically determines the number of times for calculation of compression ratio in the created sub-signal selection step, so as to reduce the number of times of calculation of compression ratio in the created sub-signal selection step and the sub-signal re-creation step.

8. A signal compression method as described in claim 1, wherein the original signal includes features of a given signal extracted from the given signal as the sequence of multi-dimensional vectors.

9. A signal retrieval method for, at any location within a stored signal, which is an original signal which is registered in advance, calculating the distance from a reference signal, which is a signal which is taken as an object, and finding a location from the stored signal which is similar to the reference signal, comprising:
   the steps which are comprised in the signal compression method as described in claim 1;
   a reference feature extraction step in which a feature is produced from the reference signal;
   a stored feature extraction step in which a window upon which attention is focused is set within the stored signal, and in which a feature is produced from the stored signal within the window upon which attention is focused;
   a reference feature compression step in which a reference feature which has been produced by the reference feature extraction step is compressed, based upon the mappings which have been produced by the compression mapping determination step;
   a feature matching step in which the distance is calculated between a reference compressed signal which has been produced by the reference feature compression step and a stored compressed signal which has been produced from the signal compression step by newly using the feature sequence which has been produced by repeatedly performing the processing of the stored feature extraction step while shifting the window upon which attention is focused; and
   a signal detection decision step in which, by comparing together the distance which has been produced by the feature matching step and a search threshold, which is a threshold which corresponds to the distance, it is decided whether or not the reference signal is present at the location within the stored signal,
   wherein the processing of the feature matching step and the processing of the signal detection decision step are repeated while shifting the window upon which attention is focused.

10. A signal retrieval method as described in claim 9, further comprising:
    a distance re-calculation step in which, for the location in the database signal at which it has been decided by the signal detection decision step that the query signal is present, the distance between the feature sequence which has been produced by the reference feature extraction step and the feature sequence which has been produced by the stored feature extraction step is calculated; and
    a signal detection re-decision step in which, by comparing together the distance which has been produced by the distance re-calculation step and the search threshold, it is re-decided whether or not the query signal is present at the location of the database signal,
    wherein the processing of the feature matching step, the signal detection decision step, the distance re-calculation step, and the signal detection re-decision step is repeated while shifting the window upon which attention is focused; for some locations within the database signal, the distance from the query signal is calculated; and it is determined whether or not the query signal is present at the locations within the database signal.

11. A signal retrieval method as described in claim 9, further comprising a skip width calculation step in which, based upon the distance which has been calculated by the feature matching step, a skip width for the window upon which attention is focused is calculated, and the window upon which attention is focused is shifted by the skip width,
    wherein the processing of the feature matching step, the signal detection decision step, and the skip width calculation step is repeated while shifting the window upon which attention is focused; for some locations within the database signal, the distance from the query signal is calculated; and it is determined whether or not the query signal is present at the locations within the database signal.

12. A signal compression device which compresses an original signal which is provided in advance and which is represented as a sequence of multi-dimensional vectors to convert the original signal into a compressed signal, comprising:

an initial sub-signal creation section embodied as computer executable instructions in a computer memory which creates sub-signals by dividing the original signal into the sub-signals in a time domain so as not to overlap with each other;

a created sub-signal selection section embodied as computer executable instructions in a computer memory which, for each of the sub-signals which have been produced by the initial sub-signal creation section, sets a segmentation boundary shiftable range which includes a segmentation boundary between the sub-signals produced by the initial sub-signal creation section, calculates an average value of dimensionality of compressed signals which are obtained from the sub-signals produced by the initial sub-signal creation section, and extracts segmentation boundary candidates from the segmentation boundary shiftable range, the average value of dimensionality of compressed signals which are obtained from sub-signals which are determined by each of the segmentation boundary candidates being smaller than the average value of dimensionality of the compressed signals which are obtained from the sub-signals produced by the initial sub-signal creation section;

a sub-signal re-creation section embodied as computer executable instructions in a computer memory which, using the segmentation boundary candidates which have been produced by the created sub-signal selection section, determines upon a created sub-signal which is actually to be used;

a compression mapping determination section embodied as computer executable instructions in a computer memory which determines upon different mappings for calculation of a compressed signal corresponding to the respective sub- signals, from only the respective sub-signals which has been obtained by the sub-signal re-creation section; and a signal compression section embodied as computer executable instructions in a computer memory which calculates a compressed signal which corresponds to each of the sub-signals which have been obtained by the sub-signal re- creation section, based upon the mappings which have been obtained by the compression mapping determination section, to reduce the dimensionality of each of the multi-dimensional vectors in each unit time.

13. A signal retrieval device for, at any location within a stored signal, which is an original signal which is registered in advance, calculating the distance from a reference signal, which is a signal which is taken as an object, and finding a location from the stored signal which is similar to the reference signal, comprising:

the sections which are comprised in the signal compression device as described in claim 12;

a reference feature extraction section embodied as computer executable instructions in a computer memory which produces a feature from the reference signal;

a stored feature extraction section embodied as computer executable instructions in a computer memory which sets a window upon which attention is focused within the stored signal, and which produces a feature from the stored signal within the window upon which attention is focused;

a reference feature compression section embodied as computer executable instructions in a computer memory which compresses a reference feature which has been produced by the reference feature extraction section, based upon the mappings which have been produced by the compression mapping determination section;

a feature matching section embodied as computer executable instructions in a computer memory which calculates the distance between a reference compressed signal which has been produced by the reference feature compression section and a stored compressed signal which has been produced from the signal compression section by newly using the feature sequence which has been produced by repeatedly performing the processing by the stored feature extraction section while shifting the window upon which attention is focused; and a signal detection decision section embodied as computer executable instructions in a computer memory which, by comparing together the distance which has been produced by the feature matching section and a search threshold, which is a threshold which corresponds to the distance, decides whether or not the reference signal is present at the location within the stored signal, wherein the operation of the feature matching section and the operation of the signal detection decision section are repeated while shifting the window upon which attention is focused.

14. A signal retrieval device as described in claim 13, further comprising:

a distance re-calculation section embodied as computer executable instructions in a computer memory which, for the location in the database signal at which it has been decided by the signal detection decision section that the query signal is present, calculates the distance between the feature sequence which has been produced by the reference feature extraction section and the feature sequence which has been produced by the stored feature extraction section; and a signal detection re-decision section embodied as computer executable instructions in a computer memory which, by comparing together the distance which has been produced by the distance re-calculation section and the search threshold, re- decides whether or not the query signal is present at the location of the database signal, wherein the processing of the feature matching section, the signal detection decision section, the distance re-calculation section, and the signal detection re-decision section is repeated while shifting the window upon which attention is focused; for some locations within the database signal, the distance from the query signal is calculated; and it is determined whether or not the query signal is present at the locations within the database signal.

15. A signal retrieval device as described in claim 13, further comprising a skip width calculation section embodied as computer executable instructions in a computer memory which, based upon the distance which has been calculated by the feature matching section, calculates a skip width for the window upon which attention is focused, and shifts the window upon which attention is focused by the skip width, and wherein the processing of the feature matching section, the signal detection decision section, and the skip width calculation section is repeated while shifting the window upon which attention is focused; for some locations within the database signal, the distance from the query signal is calculated; and it is determined whether or not the query signal is present at the locations within the database signal.

16. A signal retrieval method which finds out portions from a database video signal which has been registered in advance which are similar to a query signal which is taken as an object, comprising:

a query feature extraction step in which a feature is produced from the query signal;

a database feature extraction step in which a window upon which attention is focused is set within the database video signal, and in which a feature is produced from the database video signal within the window upon which attention is focused, wherein the database video signal represents a sequence of images of a physical domain captured by an imaging device;

a database feature partitioning step in which a feature sequence which has been produced by repeatedly performing the database feature extraction step while shifting the window upon which attention is focused is partitioned in a time domain;

a database feature pruning step in which a representative feature is extracted from the feature sequence which has been obtained after partitioning by the database feature partitioning step, and a representative feature sequence is produced which consists of a smaller number of features;

a feature region extraction step in which a region is produced in which a feature which is included in the partition which has been produced by the database feature partitioning step is present;

a feature matching step in which a distance is calculated between a feature sequence which has been produced by the query feature extraction step and a representative feature sequence which has been produced by the database feature pruning step;

a distance compensation step in which the distance which has been calculated by the feature matching step is compensated using the region which has been produced by the feature region extraction step;

a signal detection decision step in which, by comparing together the distance which has been produced after compensation by the distance compensation step and a search threshold, which is a threshold which corresponds to the distance, it is decided whether or not the query signal is present at the location within the database video signal;

a segment extraction step in which segments, which are sub-sequences, are extracted by segmenting a feature sequence which has been produced by repeatedly performing the database feature extraction step while shifting the window upon which attention is focused;

a compression mapping determination step in which, from each of the segments which have been obtained by the segment extraction step, a mapping is determined for calculation of a feature of less dimensions than the feature;

a database feature compression step in which a feature which corresponds to a segment which has been obtained by the segment extraction step and which is of less dimensions than the feature is calculated based upon the mapping which has been obtained by the compression mapping determination step; and a query feature compression step in which a feature which corresponds to a feature which has been obtained by the query feature extraction step and which is of less dimensions than the feature is calculated based upon the mapping which has been obtained by the compression mapping determination step, wherein the processing of the feature matching step through the signal detection decision step is repeated while shifting the window upon which attention is focused, for some locations within the database video signal, the distance from the query signal is calculated, and it is determined whether or not the query signal is present at the locations within the database video signal, and in the database feature pruning step, a representative feature sequence is produced by taking the compressed feature sequence which has been produced by the database feature compression step as a new feature sequence, and, in the feature matching step, a matching is performed of the compressed feature which has been produced by the query feature compression step as a new feature, the processing of the feature matching step through the signal detection decision step is repeated while shifting the window upon which attention is focused, for some locations within the database video signal, the distance from the query signal is calculated; and it is determined whether or not the query signal is present at the locations within the database video signal.

17. A signal retrieval method as described in claim 16, wherein the database feature compression step comprises:

a database feature mapping step in which a segment which has been obtained by the segment extraction step is mapped according to the mapping which has been obtained by the compression mapping determination step;

a database projection distance calculation step in which, for the compressed feature sequence which has been produced by the database feature mapping step, the distance from the feature sequence which has been produced by the database feature extraction step is calculated; and a database compressed feature creation step in which a new compressed feature sequence is created from the compressed feature sequence which has been produced by the database feature mapping step and the projection distance which has been produced by the database projection distance calculation step, and wherein the query feature compression step comprises:

a query feature mapping step in which the feature which has been obtained by the query feature extraction step is mapped according to the mapping which has been obtained by the compression mapping determination step;

a query projection distance calculation step in which, for the compressed feature which has been produced by the query feature mapping step, the distance from the feature which has been produced by the query feature extraction step is calculated; and a query compression feature creation step in which a new compressed feature is created from the compressed feature which has been produced by the query feature mapping step and the projection distance which has been produced by the query projection distance calculation step.

18. A signal retrieval method as described in claim 17, wherein the database projection distance calculation step calculates the distance based upon Manhattan distance or Euclid distance.

19. A signal retrieval method as described in claim 16, wherein the compression mapping determination step extracts a representative feature by a Karhunen-Loeve transform.

20. A signal retrieval method as described in claim 16, further comprising:

a distance re-calculation step in which, for the location in the database video signal at which it has been decided by the signal detection decision step that the query signal is present, the distance between the feature which has been produced by the query feature extraction step and the feature sequence which has been produced by the database feature extraction step is calculated; and a signal detection re-decision step in which, by comparing together the distance which has been produced by the distance re-calculation step and the search threshold, it is again decided whether or not the query signal is present at the location of the database video signal, and wherein the processing of the feature matching step, the signal compensation step, the signal detection decision step, the distance re-calculation step, and the signal detection re-decision step is repeated while shifting the window upon which attention is focused, for some locations within the database video signal, the distance from the query signal is calculated; and it is determined whether or not the query signal is present at the locations within the database video signal.

21. A signal retrieval method as described in claim 16, further comprising:

a database feature classification step in which the respective features which have been produced by repeatedly performing the database feature extraction step while shifting the window upon which attention is focused are classified based upon a distance which has been defined in advance, and a representative feature of the classification is determined upon;

a selection threshold setting step in which a selection threshold for the distance which has been defined by the database feature classification step is calculated from a search threshold which has been defined in advance; and a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step.

22. A signal retrieval method as described in claim 16, wherein the query feature extraction step and the database feature extraction step classify the features by a method which is determined in advance, create a histogram which is a frequency distribution table for each classification, and output the histogram as a new feature.

23. A signal retrieval method as described in claim 16, further comprising a skip width calculation step in which, based upon the distance which has been calculated by the distance compensation step, a skip width for the window upon which attention is focused is calculated, and the window upon which attention is focused is shifted by the skip width, and wherein the processing of the feature matching step, the distance compensation step, the signal detection decision step, and the skip width calculation step is repeated while shifting the window upon which attention is focused, for some locations within the database video signal, the distance from the query signal is calculated, and it is determined whether or not the query signal is present at the locations within the database video signal.

24. A signal retrieval method which finds out portions from a database video signal which has been registered in advance which are similar to a query signal which is taken as an object, comprising:

a query feature extraction step in which a feature is produced from a query signal;

a database feature extraction step in which a window upon which attention is focused is set within the database video signal, and in which a feature is produced from the database video signal within the window upon which attention is focused, wherein the database video signal represents a sequence of images of a physical domain captured by an imaging device;

a database feature classification step in which the respective features which have been produced by repeatedly performing the database feature extraction step while shifting the window upon which attention is focused are classified based upon a distance which has been defined in advance, and a representative feature of the classification is determined upon;

a selection threshold setting step in which a selection threshold for the distance which has been defined by the database feature classification step is calculated from a search threshold which has been defined in advance;

a database feature selection step in which, among the classification which has been produced by the database feature classification step, a feature is selected which is included in the classification which contains a representative feature such that the distance from the feature which has been produced by the query feature extraction step satisfies a condition which is produced from the selection threshold which has been calculated by the selection threshold setting step;

a segment extraction step in which segments, which are sub-sequences, are extracted by segmenting a feature sequence which has been produced by repeatedly performing the database feature extraction step while shifting the window upon which attention is focused;

a compression mapping determination step in which, from each of the segments which have been obtained by the segment extraction step, a mapping is determined for calculation of a feature of less dimensions than the feature;

a database feature compression step in which a feature which corresponds to a segment which has been obtained by the segment extraction step and which is of less dimensions than the feature is calculated based upon the mapping which has been obtained by the compression mapping determination step;

a query feature compression step in which a feature which corresponds to a feature which has been obtained by the query feature extraction step and which is of less dimensions than the feature is calculated based upon the mapping which has been obtained by the compression mapping determination step;

a feature matching step in which a distance is calculated between a compressed feature sequence which has been produced by the database feature compression step and a compressed feature which has been produced by the query feature extraction step; and a signal detection decision step in which, by comparing together the distance which has been calculated by the feature matching step and a search threshold, which is a threshold which corresponds to the distance, it is decided whether or not the query signal is present at the location within the database video signal, and wherein the processing of the feature matching step and the signal detection decision step is repeated while shifting the window upon which attention is focused, for some locations within the database video signal, the distance from the query signal is calculated; and it is determined whether or not the query signal is present at the locations within the database video signal, and the segment extraction step comprises;

an initial sub-sequence creation step of creating sub-sequences by dividing the feature sequence into the sub-sequences in a time domain so as not to overlap with each other;

a created sub-sequence selection step of, for each of the sub-sequences which have been produced by the initial sub-sequence creation step, pruning the created sub-sequence candidates having different lengths to those which reduce an amount of data of the compressed feature sequence; and a sub-sequence re-creation step of determining upon a created sub-sequence which is actually to be used, using the created sub-sequence candidates which have been produced by the created sub-sequence selection step.

25. A signal retrieval method as described in claim 24, further comprising:

a distance re-calculation step in which, for the location in the database video signal at which it has been decided by the signal detection decision step that the query signal is present, the distance between the feature which has been produced by the query feature extraction step and the feature sequence which has been produced by the database feature extraction step is calculated; and a signal detection re-decision step in which, by comparing together the distance which has been produced by the distance re-calculation step and the search threshold, it is again decided whether or not the query signal is present at the location of the database video signal, and wherein the processing of the feature matching step, the signal detection decision step, the distance re-calculation step, and the signal detection re-decision step is repeated while shifting the window upon which attention is focused, for some locations within the database video signal, the distance from the query signal is calculated; and it is determined whether or not the query signal is present at the locations within the database video signal.

26. A signal retrieval method as described in claim 24, further comprising a skip width calculation step in which, based upon the distance which has been calculated by the feature matching step, a skip width for the window upon which attention is focused is calculated, and the window upon which attention is focused is shifted by the skip width, and wherein the processing of the feature matching step, the signal detection decision step, and the skip width calculation step is repeated while shifting the window upon which attention is focused, for some locations within the database video signal, the distance from the query signal is calculated; and it is determined whether or not the query signal is present at the locations within the database video signal.

27. A signal retrieval device which finds out portions from a database signal which has been registered in advance which are similar to a query signal which is taken as an object, comprising:

a query feature extraction section embodied as computer executable instructions in a computer memory which produces a feature from the query signal;

a database feature extraction section embodied as computer executable instructions in a computer memory which sets a window upon which attention is focused is set within the database signal, and which produces a feature from the database signal within the window upon which attention is focused;

a database feature partitioning section embodied as computer executable instructions in a computer memory which partitions a feature sequence in a time domain which has been produced by repeatedly performing the processing of the database feature extraction section while shifting the window upon which attention is focused;

a database feature pruning section embodied as computer executable instructions in a computer memory which extracts a representative feature from the feature sequence which has been obtained after partitioning by the database feature partitioning section, and which produces a representative feature sequence which consists of a smaller number of features;

a feature region extraction section embodied as computer executable instructions in a computer memory which produces a region in which a feature which is included in the partition which has been produced by the database feature partitioning section is present;

a feature matching section embodied as computer executable instructions in a computer memory which calculates a distance between a feature sequence which has been produced by the query feature extraction section and a representative feature sequence which has been produced by the database feature pruning section;

a distance compensation section embodied as computer executable instructions in a computer memory in which the distance which has been calculated by the feature matching section is compensated using the region which has been produced by the feature region extraction section;

a signal detection decision section embodied as computer executable instructions in a computer memory in which, by comparing together the distance which has been produced after compensation by the distance compensation section and a search threshold, which is a threshold which corresponds to the distance, it is decided whether or not the query signal is present at the location within the database signal;

a segment extraction section embodied as computer executable instructions in a computer memory which extracts segments, which are sub-sequences, by segmenting a feature sequence which has been produced by repeatedly performing the processing of the database feature extraction section while shifting the window upon which attention is focused;

a compression mapping determination section embodied as computer executable instructions in a computer memory which, from each of the segments which have been obtained by the segment extraction section, determines a mapping for calculation of a feature of less dimensions than the feature;

a database feature compression section embodied as computer executable instructions in a computer memory which calculates a feature which corresponds to a segment which has been obtained by the segment extraction section and which is of less dimensions than the feature based upon a mapping which has been obtained by the compression mapping determination section; and a query feature compression section embodied as computer executable instructions in a computer memory which calculates a feature which corresponds to a feature which has been obtained by the query feature extraction section and which is of less dimensions than the feature based upon a mapping which has been obtained by the compression mapping determination section, wherein the processing of the feature matching section through the signal detection decision section is repeated while shifting the window upon which attention is focused; for some locations within the database signal, the distance from the query signal is calculated; and it is determined whether or not the query signal is present at the locations within the database signal, and by the database feature pruning section, a representative feature sequence is produced by using a compressed feature sequence which has been produced by the database feature compression section is produced as a new feature sequence; by the feature matching section, matching is performed using a compressed feature which has been produced by the query feature compression section as a new feature; and further: the processing of the feature matching section through the signal detection decision section is repeated while shifting the window upon which attention is focused, for some locations within the database signal, the distance from the query signal is calculated; and it is determined whether or not the query signal is present at the locations within the database signal.

28. A signal retrieval device which finds out portions from a database signal which has been registered in advance which are similar to a query signal which is taken as an object, comprising:

a query feature extraction section embodied as computer executable instructions in a computer memory which produces a feature from a query signal;

a database feature extraction section embodied as computer executable instructions in a computer memory which sets a window upon which attention is focused within the database signal, and which produces a feature from the database signal within the window upon which attention is focused;

a database feature classification section embodied as computer executable instructions in a computer memory which classifies the respective features which have been produced by repeatedly performing the processing of the database feature extraction section while shifting the window upon which attention is focused based upon a distance which has been determined in advance, and determines upon a representative feature of the classification;

a selection threshold setting section embodied as computer executable instructions in a computer memory which calculates a selection threshold for the distance which has been defined by the database feature classification section from a search threshold which has been defined in advance;

a database feature selection section embodied as computer executable instructions in a computer memory which, among the classification which has been produced by the database feature classification section, selects a feature which is included in the classification which contains a representative feature such that the distance from the feature which has been produced by the query feature extraction section satisfies a condition which is produced from the selection threshold which has been calculated by the selection threshold setting section;

a segment extraction section embodied as computer executable instructions in a computer memory which extracts segments, which are sub-sequences, by segmenting a feature sequence which has been produced by repeatedly performing the processing of the database feature extraction section while shifting the window upon which attention is focused;

a compression mapping determination section embodied as computer executable instructions in a computer memory which, from each of the segments which have been obtained by the segment extraction section, determines a mapping for calculation of a feature of less dimensions than the feature;

a database feature compression section embodied as computer executable instructions in a computer memory which calculates a feature which corresponds to a segment which has been obtained by the segment extraction section and which is of less dimensions than the feature based upon a mapping which has been obtained by the compression mapping determination section;

a query feature compression section embodied as computer executable instructions in a computer memory which calculates a feature which corresponds to a feature which has been obtained by the query feature extraction section and which is of less dimensions than the feature based upon the mapping which has been obtained by the compression mapping determination section;

a feature matching section embodied as computer executable instructions in a computer memory which calculates a distance between a compressed feature sequence which has been produced by the database feature compression section and a compressed feature which has been produced by the query feature extraction section; and a signal detection decision section embodied as computer executable instructions in a computer memory which, by comparing together the distance which has been calculated by the feature matching section and a search threshold, which is a threshold which corresponds to the distance, decides whether or not the query signal is present at the location within the database signal, and wherein the processing of the feature matching section through the signal detection decision section is repeated while shifting the window upon which attention is focused, for some locations within the database signal, the distance from the query signal is calculated; and it is determined whether or not the query signal is present at the locations within the database signal, and the segment extraction section comprises:

an initial sub-sequence creation section which creates sub-sequences by dividing the feature sequence into the sub-sequences in a time domain so as not to overlap with each other;

a created sub-sequence selection section which, for each of the sub-sequences which have been produced by the initial sub-sequence creation section, prunes the created sub-sequence candidates having different lengths to those which reduce an amount of data of the compressed feature sequence; and a sub-sequence re-creation section which determines upon a created sub-sequence which is actually to be used, using the created sub-sequence candidates which have been produced by the created sub-sequence selection section.

29. A signal retrieval device as described in claim 28, further comprising:

a distance re-calculation section embodied as computer executable instructions in a computer memory which, for the location in the database signal at which it has been decided by the signal detection decision section that the query signal is present, calculates the distance between the feature sequence which has been produced by the query feature extraction section and the feature sequence which has been produced by the database feature extraction section; and a signal detection re-decision section embodied as computer executable instructions in a computer memory which, by comparing together the distance which has been produced by the distance re-calculation section and the search threshold, again decides whether or not the query signal is present at the location of the database signal and wherein the processing of the feature matching section, the signal detection decision section, the distance re-calculation section, and the signal detection re-decision section is repeated while shifting the window upon which attention is focused, for some locations within the database signal, the distance from the query signal is calculated; and it is determined whether or not the query signal is present at the locations within the database signal.

30. A signal retrieval device as described in claim 28, further comprising a skip width calculation section embodied as computer executable instructions in a computer memory which, based upon the distance which has been calculated by the feature matching section, calculates a skip width for the window upon which attention is focused, and shifts the window upon which attention is focused by the skip width and wherein the processing of the feature matching section, the signal detection decision section, and the skip width calculation section is repeated while shifting the window upon which attention is focused; for some locations within the database signal, the distance from the query signal is calculated; and it is determined whether or not the query signal is present at the locations within the database signal.

* * * * *